(12) United States Patent
Xu et al.

(10) Patent No.: US 10,719,689 B2
(45) Date of Patent: Jul. 21, 2020

(54) ELECTRONIC DEVICE AND FINGERPRINT RECOGNITION METHOD

(71) Applicant: HUAWEI TECHNOLOGIES CO., LTD., Shenzhen (CN)

(72) Inventors: Zhe Xu, Shenzhen (CN); Huangwei Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 213 days.

(21) Appl. No.: 15/745,295

(22) PCT Filed: Dec. 15, 2015

(86) PCT No.: PCT/CN2015/097370
§ 371 (c)(1),
(2) Date: Jan. 16, 2018

(87) PCT Pub. No.: WO2017/100997
PCT Pub. Date: Jun. 22, 2017

(65) Prior Publication Data
US 2018/0196990 A1 Jul. 12, 2018

(51) Int. Cl.
*G06K 9/00* (2006.01)
*G06F 3/041* (2006.01)
(Continued)

(52) U.S. Cl.
CPC ......... *G06K 9/00087* (2013.01); *G06F 3/041* (2013.01); *G06F 3/0416* (2013.01);
(Continued)

(58) Field of Classification Search
CPC .. G06K 9/00; G06K 9/00006; G06K 9/00026; G06K 19/0718; G06F 21/32
See application file for complete search history.

(56) References Cited

U.S. PATENT DOCUMENTS 7,697,729 B2 * 4/2010 Howell .............. G06K 9/00013
345/156
8,810,367 B2 8/2014 Mullins
(Continued)

FOREIGN PATENT DOCUMENTS

CN 103440477 A 12/2013
CN 103605474 A 2/2014
(Continued)

OTHER PUBLICATIONS

Machine Translation and Abstract of Chinese Publication No. CN103605474, Feb. 26, 2014, 7 pages.
(Continued)

*Primary Examiner* — Nay A Maung
*Assistant Examiner* — Jose M Torres
(74) *Attorney, Agent, or Firm* — Conley Rose, P.C.

(57) ABSTRACT

An electronic device and a fingerprint recognition method are provided. The electronic device includes: a fingerprint recognition sensor configured to capture, according to a swipe mode or a press mode, a user fingerprint in an area displayed on a touchscreen; at least one memory configured to store a fingerprint template; at least one processor configured to determine and set a fingerprint recognition mode in a first display area; and the touchscreen configured to detect a first input in the first display area; where the processor is further configured to instruct the fingerprint recognition sensor to capture a user fingerprint according to the set mode and match the fingerprint captured by the fingerprint recognition sensor with the fingerprint template.

20 Claims, 22 Drawing Sheets

(51) Int. Cl.
*G06F 21/32* (2013.01)
*G06F 3/0488* (2013.01)
*G06F 21/83* (2013.01)

(52) U.S. Cl.
CPC ........ *G06F 3/0488* (2013.01); *G06F 3/04883* (2013.01); *G06F 21/32* (2013.01); *G06F 21/83* (2013.01); *G06K 9/00355* (2013.01); *G06K 9/00026* (2013.01)

(56) References Cited

U.S. PATENT DOCUMENTS

| | | | |
|---|---|---|---|
| 2009/0224874 A1* | 9/2009 | Dewar | G06F 21/32 340/5.53 |
| 2011/0013813 A1* | 1/2011 | Yamamoto | G06K 9/00026 382/124 |
| 2013/0076485 A1 | 3/2013 | Mullins | |
| 2014/0354556 A1* | 12/2014 | Alameh | G06F 21/32 345/173 |
| 2015/0070301 A1* | 3/2015 | Chia | G06K 9/00087 345/174 |
| 2015/0074615 A1* | 3/2015 | Han | G06K 9/00033 715/863 |
| 2015/0220767 A1* | 8/2015 | Yoon | G06K 9/00006 382/124 |
| 2015/0242859 A1 | 8/2015 | Viswanath et al. | |
| 2015/0371073 A1* | 12/2015 | Cho | G06F 3/0488 382/124 |
| 2016/0063230 A1* | 3/2016 | Alten | G06F 21/32 |
| 2017/0140201 A1* | 5/2017 | Li | G06F 3/0414 |
| 2017/0308732 A1* | 10/2017 | Wang | G06F 3/0488 |

FOREIGN PATENT DOCUMENTS

| | | |
|---|---|---|
| CN | 104156709 A | 11/2014 |
| CN | 204028944 U | 12/2014 |
| CN | 104598134 A | 5/2015 |
| CN | 105095876 A | 11/2015 |

OTHER PUBLICATIONS

Machine Translation and Abstract of Chinese Publication No. CN104598134, May 6, 2015, 9 pages.
Machine Translation and Abstract of Chinese Publication No. CN105095876, Nov. 25, 2015, 16 pages.
Foreign Communication From a Counterpart Application, Chinese Application No. 201580072281.4, Chinese Office Action dated Apr. 15, 2019, 6 pages.
International Search Report (including English translation) issued in corresponding International Application No. PCT/CN2015/097370, dated Sep. 20, 2016, 7 pages.

* cited by examiner

ELECTRONIC DEVICE AND FINGERPRINT RECOGNITION METHOD

CROSS-REFERENCE TO RELATED APPLICATIONS

This application is a National Stage of International Application No. PCT/CN2015/097370, filed on Dec. 15, 2015, which is hereby in cooperated by reference in its entirety.

TECHNICAL FIELD

The present invention relates to the field of fingerprint recognition technologies, and in particular, to an electronic device and a fingerprint recognition method.

BACKGROUND

Fingerprint recognition means that an electronic device captures a user fingerprint, and matches the captured fingerprint with a prestored fingerprint template; if the matching is successful, the fingerprint is authenticated successfully. By means of fingerprint recognition, user identity authentication may be implemented, and an illegal user may be prevented from using the electronic device.

Fingerprint recognition may be applied to various electronic devices, such as a mobile phone, a desktop computer, a tablet computer, a notebook computer, an electric book device, and a server. A fingerprint recognizer may be connected to or built in these electronic devices.

Another optional solution is as follows: A fingerprint recognition sensor is disposed on an upper, middle, or lower part of a touchscreen of an electronic device. When a user touches the touchscreen, the fingerprint recognition sensor captures a user fingerprint, and matches the captured fingerprint with a prestored fingerprint template to recognize the user fingerprint.

Currently, according to different modes in which a fingerprint sensor captures a fingerprint, fingerprint recognition may be classified into press-mode fingerprint recognition and swipe-mode fingerprint recognition.

The press-mode fingerprint recognition requires that the user should use a finger to press and hold the fingerprint recognition sensor for a period of time, and the fingerprint recognition sensor completes fingerprint capture in the press-and-hold period of the finger. The swipe-mode fingerprint recognition is to complete fingerprint capture in a sliding process of a finger of the user.

In addition, a user interface (User Interface, UI) is a medium for exchanging information between the electronic device and the user.

Some UIs receive slide operations of the user on the screen, but other UIs receive press operations of the user on the screen. For a UI that receives a slide operation, fingerprint capture can be hardly performed by using a press-mode fingerprint recognition sensor.

In summary, when some UIs are displayed on a touchscreen of an electronic device that has a fingerprint recognition function, the electronic device cannot capture a fingerprint successfully.

SUMMARY

Embodiments of the present invention provide an electronic device and a fingerprint recognition method, so that when some user interfaces UIs are displayed on a touchscreen of an electronic device that has a fingerprint recognition function, the electronic device can capture a fingerprint successfully.

According to a first aspect, an embodiment of the present invention provides an electronic device, including:

a fingerprint recognition sensor, configured to capture, according to a swipe mode or a press mode, a user fingerprint in an area displayed on a touchscreen;

at least one memory, configured to store a fingerprint template;

at least one processor, configured to determine that a fingerprint recognition mode in a first display area is a first fingerprint recognition mode, where the first fingerprint recognition mode is the swipe mode or the press mode, and set the fingerprint recognition mode in the first display area to the first fingerprint recognition mode; and the touchscreen, configured to display the first display area, and detect a first input of a user in the first display area; where the processor is further configured to: if the first fingerprint recognition mode is the swipe mode, instruct the fingerprint recognition sensor to capture a user fingerprint in the first display area according to the swipe mode, or if the first fingerprint recognition mode is the press mode, instruct the fingerprint recognition sensor to capture a user fingerprint in the first display area according to the press mode; and match the fingerprint corresponding to the first input and captured by the fingerprint recognition sensor with the fingerprint template.

The electronic device may flexibly set the fingerprint recognition mode, so that when different UIs are displayed on the touchscreen, the electronic device can capture a fingerprint successfully.

With reference to the first aspect, in a first possible implementation, the at least one processor is specifically configured to:

if the first display area is an area including a press-mode user interface UI widget, determine that the first fingerprint recognition mode is the press mode, where the press-mode UI widget uses the press mode to interact with the user; or if the first display area is an area including a swipe-mode UI widget, determine that the fingerprint recognition mode in the first display area is the swipe mode, where the swipe-mode UI widget uses the swipe mode to interact with the user.

The electronic device may flexibly set, according to different modes of interactions between the UI widget and the user, the fingerprint recognition mode in the area including the UI widget on the touchscreen.

With reference to the first aspect or the first possible implementation of the first aspect, in a second possible implementation, the at least one processor is further configured to:

in a process of matching the fingerprint captured by the fingerprint recognition sensor with the fingerprint template, prompt the user with progress of matching the fingerprint corresponding to the first input on the touchscreen.

This may prevent a finger of the user from leaving the first display area too early in a process of capturing the user fingerprint, or prevent the user from sliding a finger in the first display area when fingerprint recognition is performed in the press-mode fingerprint recognition mode; otherwise, work of the fingerprint recognition sensor in capturing the fingerprint is affected.

With reference to the first aspect, or the first or the second possible implementation of the first aspect, in a third possible implementation, the at least one processor is further configured to: before the touchscreen detects the first input of the user in the first display area, enable a fingerprint recognition function only in the first display area, and keep the fingerprint recognition function disabled in areas different from the first display area.

Because the fingerprint recognition function is enabled only in the first display area in which the user fingerprint needs to be captured, not only the user fingerprint can be captured successfully, but also power can be saved.

With reference to any one of the first aspect or the foregoing possible implementations of the first aspect, in a fourth possible implementation, the at least one processor is further configured to: after matching the fingerprint corresponding to the first input and captured by the fingerprint recognition sensor with the fingerprint template, disable the fingerprint recognition function in the first display area.

Power can be saved if the fingerprint recognition function is disabled in the first display area after fingerprint recognition.

With reference to any one of the first aspect or the foregoing possible implementations of the first aspect, in a fifth possible implementation, the at least one processor is further configured to: if determining that the first fingerprint recognition mode is the swipe mode, after the touchscreen detects the first input of the user in the first display area, determine a second display area according to the first input; and determine, according to the first input, that a fingerprint recognition mode in the second display area is a second fingerprint recognition mode, where the second fingerprint recognition mode is the swipe mode or the press mode;

the touchscreen is further configured to detect a second input of the user in the second display area; and the processor is further configured to: if the second fingerprint recognition mode is the swipe mode, instruct the fingerprint recognition sensor to capture, according to the swipe mode, a fingerprint corresponding to the second input in the second display area, or if the second fingerprint recognition mode is the press mode, instruct the fingerprint recognition sensor to capture, according to the press mode, a fingerprint corresponding to the second input in the second display area; and match the fingerprint corresponding to the second input and captured by the fingerprint recognition sensor with the fingerprint template.

According to the input operation in the previous step, the display area in which the fingerprint recognition function needs to be subsequently enabled is determined, and the fingerprint recognition mode in the display area is determined. Therefore, the display area in which the fingerprint recognition function needs to be enabled may be effectively predicted, fingerprint recognition is performed by using an appropriate fingerprint recognition mode, and effectiveness of fingerprint recognition is higher.

With reference to the fifth possible implementation of the first aspect, in a sixth possible implementation, the at least one processor is specifically configured to:

predict at least one first track according to the first input, and use a display area that the at least one first track passes through, as the second display area.

According to the input operation in the previous step, the display area in which the fingerprint recognition function needs to be subsequently enabled is determined. Therefore, the display area in which the fingerprint recognition function needs to be enabled may be effectively predicted, and effectiveness of fingerprint recognition is higher.

With reference to the fifth possible implementation of the first aspect, in a seventh possible implementation, the at least one processor is specifically configured to:

determine the second display area according to operation information about the first operation, where the operation information about the first operation includes at least one of the following information:

force of the first input applied to the touchscreen;
a moving speed of the first input;
a moving direction of the first input; or
duration of the first input.

This solution provides an optional implementation of determining the second display area by the electronic device.

With reference to the seventh possible implementation of the first aspect, in an eighth possible implementation, the at least one processor is specifically configured to:

determine the second display area according to the operation information about the first operation and at least one of the following information:

habit information recorded by the memory about operations performed by the user of the electronic device on the electronic device;

a direction in which the user holds the electronic device; or a layout of UI widgets in the second display area.

This solution provides an optional implementation of determining the second display area by the electronic device.

With reference to any one of the first aspect or the foregoing possible implementations of the first aspect, in a ninth possible implementation, the first display area includes an area including at least two unlocking points, the at least two unlocking points are unlocking points of a same UI widget, and the fingerprint recognition mode in the first display area is the press mode;

the touchscreen is specifically configured to detect the first input of the user in an area including a first unlocking point in the at least two unlocking points;

the at least one processor is further configured to: after the touchscreen detects the first input of the user in the area including the first unlocking point in the at least two unlocking points, disable the fingerprint recognition function in an area including another unlocking point, where the another unlocking point is an unlocking point different from the first unlocking point in the at least two unlocking points;

the at least one processor is specifically configured to: instruct the fingerprint recognition sensor to capture, according to the press mode, the fingerprint corresponding to the first input in the area including the first unlocking point, and match the fingerprint corresponding to the first input and captured by the fingerprint recognition sensor in the area including the first unlocking point, with the fingerprint template; and the at least one processor is further configured to: after matching the fingerprint corresponding to the first input and captured by the fingerprint recognition sensor with the fingerprint template, if the matching is successful, disable the fingerprint recognition function in the area including the first unlocking point.

When the display area includes multiple unlocking points, fingerprint recognition is performed in the press-mode fingerprint recognition mode to effectively capture the user fingerprint; and when fingerprint recognition is performed in the area including the first unlocking point, the fingerprint recognition function is disabled at other unlocking points to save power.

With reference to the ninth possible implementation of the first aspect, in a tenth possible implementation, the at least one processor is further configured to:

if the fingerprint corresponding to the first input and captured by the fingerprint recognition sensor in the area including the first unlocking point fails to match the fingerprint template, determine a next unlocking point after the first unlocking point according to a set unlocking sequence of the at least two unlocking points; and set a fingerprint recognition mode in an area including the determined next unlocking point to the press mode;

the touchscreen is further configured to detect a user input in the area including the next unlocking point; and the processor is further configured to: in the area including the next unlocking point, instruct the fingerprint recognition sensor to capture, according to the press mode, a fingerprint corresponding to the user input detected by the touchscreen in the area including the next unlocking point, and match the fingerprint corresponding to the user input in the area including the next unlocking point and captured by the fingerprint recognition sensor with the fingerprint template.

If the fingerprint corresponding to the first input and captured by the fingerprint recognition sensor in the area including the first unlocking point fails to match the fingerprint template, the next unlocking point after the first unlocking point is determined according to the set unlocking sequence of the at least two unlocking points, and fingerprint recognition is performed in the area including the determined next unlocking point. In this way, the user fingerprint may be recognized in an unlocking process, and user identity authentication may be performed according to a combination of an unlocking result and a fingerprint recognition result.

According to a second aspect, an embodiment of the present invention provides an electronic device, including:

a fingerprint recognition sensor, configured to capture, according to a swipe mode or a press mode, a user fingerprint in an area displayed on a touchscreen;

at least one memory, configured to store a fingerprint template;

the touchscreen, configured to detect a third input of a user in a third display area; and at least one processor, configured to determine a fourth display area according to the third input detected by the touchscreen, and determine, according to the third input, that a fingerprint recognition mode in the fourth display area is a third fingerprint recognition mode, where the third fingerprint recognition mode is the swipe mode or the press mode; where the touchscreen is further configured to detect a fourth input of the user in the fourth display area; and the at least one processor is further configured to: if the third fingerprint recognition mode is the swipe mode, instruct the fingerprint recognition sensor to capture, according to the swipe mode, a fingerprint corresponding to the fourth input in the fourth display area, or if the third fingerprint recognition mode is the press mode, instruct the fingerprint recognition sensor to capture, according to the press mode, a fingerprint corresponding to the fourth input in the fourth display area; and match the fingerprint corresponding to the fourth input and captured by the fingerprint recognition sensor with the fingerprint template.

According to the input operation in the previous step, a display area in which a fingerprint recognition function needs to be subsequently enabled is determined, and a fingerprint recognition mode in the display area is determined. Therefore, the display area in which the fingerprint recognition function needs to be enabled may be effectively predicted, fingerprint recognition is performed by using an appropriate fingerprint recognition mode, and effectiveness of fingerprint recognition is higher.

With reference to the second aspect, in a first possible implementation, the at least one processor is specifically configured to:

predict at least one second track according to the third operation, and use a display area that the at least one second track passes through or points to, as the fourth display area.

According to the input operation in the previous step, the display area in which the fingerprint recognition function needs to be subsequently enabled is determined. Therefore, the display area in which the fingerprint recognition function needs to be enabled may be effectively predicted, and effectiveness of fingerprint recognition is higher.

According to a third aspect, an embodiment of the present invention provides an electronic device, including:

a fingerprint recognition mode determining module, configured to determine that a fingerprint recognition mode in a first display area is a first fingerprint recognition mode, where the first fingerprint recognition mode is a swipe mode or a press mode;

a display module, configured to display the first display area;

a fingerprint recognition mode setting module, configured to set the fingerprint recognition mode in the first display area displayed by the display module to the first fingerprint recognition mode determined by the fingerprint recognition mode determining module;

an input detection module, configured to detect a first input of a user in the first display area; and a fingerprint recognition module, configured to: when the first fingerprint recognition mode is the swipe mode, recognize, according to the swipe mode set by the fingerprint recognition mode setting module, a fingerprint corresponding to the first input in the first display area; and when the first fingerprint recognition mode is the press mode, recognize, according to the press mode set by the fingerprint recognition mode setting module, a fingerprint corresponding to the first input in the first display area.

The electronic device may flexibly set the fingerprint recognition mode, so that when different UIs are displayed on a touchscreen, the electronic device can capture a fingerprint successfully.

With reference to the third aspect, in a first possible implementation, the fingerprint recognition mode determining module is specifically configured to:

when the first display area is an area including a press-mode user interface UI widget, determine that the first fingerprint recognition mode is the press mode, where the press-mode UI widget uses the press mode to interact with the user; or when the first display area is an area including a swipe-mode UI widget, determine that the fingerprint recognition mode in the first display area is the swipe mode, where the swipe-mode UI widget uses the swipe mode to interact with the user.

The electronic device may flexibly set, according to different modes of interactions between the UI widget and the user, the fingerprint recognition mode in the area including the UI widget on the touchscreen.

With reference to the third aspect or the first possible implementation of the third aspect, in a second possible implementation, the device further includes:

a fingerprint recognition progress indication module, configured to: in a process in which the fingerprint recognition module recognizes the fingerprint corresponding to the first input, prompt the user with progress of recognizing the fingerprint corresponding to the first input.

This may prevent a finger of the user from leaving the first display area too early in a process of capturing the user fingerprint, or prevent the user from sliding a finger in the first display area when fingerprint recognition is performed in the press-mode fingerprint recognition mode; otherwise, work of the fingerprint recognition sensor in capturing the fingerprint is affected.

With reference to the third aspect, or the first or the second possible implementation of the third aspect, in a third possible implementation, the device further includes:

a fingerprint recognition function enabling module, configured to: before the input detection module detects the first input of the user in the first display area, enable a fingerprint recognition function only in the first display area, and keep the fingerprint recognition function disabled in areas different from the first display area.

Because the fingerprint recognition function is enabled only in the first display area in which the user fingerprint needs to be captured, not only the user fingerprint can be captured successfully, but also power can be saved.

With reference to any one of the third aspect or the foregoing possible implementations of the third aspect, in a fourth possible implementation, the device further includes:

a fingerprint recognition function disabling module, configured to disable the fingerprint recognition function in the first display area after the fingerprint recognition module recognizes the fingerprint corresponding to the first input.

Power can be saved if the fingerprint recognition function is disabled in the first display area after fingerprint recognition.

With reference to any one of the third aspect or the foregoing possible implementations of the third aspect, in a fifth possible implementation, the device further includes:

a display area determining module, configured to: if the fingerprint recognition mode determining module determines that the first fingerprint recognition mode is the swipe mode, after the input detection module detects the first input of the user in the first display area, determine a second display area according to the first input; where the display module is configured to display the second display area;

the fingerprint recognition mode determining module is configured to determine, according to the first input, that a fingerprint recognition mode in the second display area is a second fingerprint recognition mode, where the second fingerprint recognition mode is the swipe mode or the press mode;

the input detection module is configured to detect a second input of the user in the second display area; and the fingerprint recognition module is configured to: when the second fingerprint recognition mode is the swipe mode, recognize, according to the swipe mode, a fingerprint corresponding to the second input in the second display area; and when the second fingerprint recognition mode is the press mode, recognize, according to the press mode, a fingerprint corresponding to the second input in the second display area.

According to the input operation in the previous step, the display area in which the fingerprint recognition function needs to be subsequently enabled is determined, and the fingerprint recognition mode in the display area is determined. Therefore, the display area in which the fingerprint recognition function needs to be enabled may be effectively predicted, fingerprint recognition is performed by using an appropriate fingerprint recognition mode, and effectiveness of fingerprint recognition is higher.

With reference to the fifth possible implementation of the third aspect, in a sixth possible implementation, the display area determining module includes:

a track prediction submodule, configured to predict at least one first track according to the first input; and a display area division submodule, configured to use a display area that the at least one first track predicted by the track prediction submodule passes through, as the second display area.

According to the input operation in the previous step, the display area in which the fingerprint recognition function needs to be subsequently enabled is determined. Therefore, the display area in which the fingerprint recognition function needs to be enabled may be effectively predicted, and effectiveness of fingerprint recognition is higher.

With reference to the fifth possible implementation of the third aspect, in a seventh possible implementation, the display area determining module is specifically configured to:

determine the second display area according to operation information about the first operation, where the operation information about the first operation includes at least one of the following information:

force of the first input applied to the touchscreen;

a moving speed of the first input;

a moving direction of the first input; or duration of the first input.

This solution provides an optional implementation of determining the second display area by the electronic device.

With reference to the seventh possible implementation of the third aspect, in an eighth possible implementation, the display area determining module is specifically configured to:

determine the second display area according to the operation information about the first operation and at least one of the following information:

recorded habit information about operations performed by the user of the electronic device on the electronic device;

a direction in which the user holds the electronic device; or a layout of UI widgets in the second display area.

This solution provides an optional implementation of determining the second display area by the electronic device.

With reference to any one of the third aspect or the foregoing possible implementations of the third aspect, in a ninth possible implementation, the first display area includes an area including at least two unlocking points, the at least two unlocking points are unlocking points of a same UI widget, and the fingerprint recognition mode in the first display area is the press mode;

the input detection module is specifically configured to detect the first input of the user in an area including a first unlocking point in the at least two unlocking points;

the fingerprint recognition function disabling module is configured to: after the input detection module detects the first input of the user in the area including the first unlocking point in the at least two unlocking points, disable the fingerprint recognition function in an area including another unlocking point, where the another unlocking point is an unlocking point different from the first unlocking point in the at least two unlocking points;

the fingerprint recognition module is specifically configured to recognize, according to the press mode, the fingerprint corresponding to the first input in the area including the first unlocking point; and the fingerprint recognition function disabling module is configured to: after the fingerprint recognition module recognizes, according to the press mode, the fingerprint corresponding to the first input in the area including the first unlocking point, if the fingerprint recognized by the fingerprint recognition module is authenticated successfully, disable the fingerprint recognition function in the area including the first unlocking point.

When the display area includes multiple unlocking points, fingerprint recognition is performed in the press-mode fingerprint recognition mode to effectively capture the user fingerprint; and when fingerprint recognition is performed in the area including the first unlocking point, the fingerprint recognition function is disabled at other unlocking points to save power.

With reference to the ninth possible implementation of the third aspect, in a tenth possible implementation, an unlocking point determining module is configured to determine a next unlocking point after the first unlocking point according to a set unlocking sequence of the at least two unlocking points if the fingerprint corresponding to the first input in the area including the first unlocking point is recognized according to the press mode but fails to be authenticated;

the fingerprint recognition mode determining module is configured to determine that a fingerprint recognition mode in an area including the next unlocking point determined by the unlocking point determining module is set to the press mode;

the fingerprint recognition mode setting module is configured to set the fingerprint recognition mode in the area including the next unlocking point to the press mode determined by the fingerprint recognition mode determining module;

the input detection module is configured to detect a user input in the area including the next unlocking point; and the fingerprint recognition module is configured to recognize, in the area including the next unlocking point, according to the press mode, a fingerprint corresponding to the detected user input in the area including the next unlocking point.

If the fingerprint corresponding to the first input and captured by the fingerprint recognition sensor in the area including the first unlocking point fails to match the fingerprint template, the next unlocking point after the first unlocking point is determined according to the set unlocking sequence of the at least two unlocking points, and fingerprint recognition is performed in the area including the determined next unlocking point. In this way, the user fingerprint may be recognized in an unlocking process, and user identity authentication may be performed according to an unlocking result and a fingerprint recognition result.

According to a fourth aspect, an embodiment of the present invention provides an electronic device, including:

an input detection module, configured to detect a third input of a user in a third display area;

a display area determining module, configured to determine a fourth display area according to the third input detected by the input detection module;

a fingerprint recognition mode determining module, configured to determine, according to the third input detected by the input detection module, that a fingerprint recognition mode in the fourth display area is a third fingerprint recognition mode, where the third fingerprint recognition mode is a swipe mode or a press mode; where the input detection module is further configured to detect a fourth input of the user in the fourth display area; and a fingerprint recognition module, configured to: when the third fingerprint recognition mode is the swipe mode, recognize, according to the swipe mode, a fingerprint corresponding to the fourth input in the fourth display area, or when the third fingerprint recognition mode is the press mode, recognize, according to the press mode, a fingerprint corresponding to the fourth input in the fourth display area.

According to the input operation in the previous step, a display area in which a fingerprint recognition function needs to be subsequently enabled is determined, and a fingerprint recognition mode in the display area is determined. Therefore, the display area in which the fingerprint recognition function needs to be enabled may be effectively predicted, fingerprint recognition is performed by using an appropriate fingerprint recognition mode, and effectiveness of fingerprint recognition is higher.

With reference to the fourth aspect, in a first possible implementation, the display area determining module includes:

a track prediction submodule, configured to predict at least one second track according to the third operation; and a display area division submodule, configured to use a display area that the at least one second track predicted by the track prediction submodule passes through or points to, as the fourth display area.

According to the input operation in the previous step, the display area in which the fingerprint recognition function needs to be subsequently enabled is determined. Therefore, the display area in which the fingerprint recognition function needs to be enabled may be effectively predicted, and effectiveness of fingerprint recognition is higher.

According to a fifth aspect, an embodiment of the present invention provides a fingerprint recognition method, where the method includes:

determining that a fingerprint recognition mode in a first display area is a first fingerprint recognition mode, where the first fingerprint recognition mode is a swipe mode or a press mode;

displaying the first display area, and setting the fingerprint recognition mode in the first display area to the first fingerprint recognition mode;

detecting a first input of a user in the first display area; and if the first fingerprint recognition mode is the swipe mode, recognizing, according to the swipe mode, a fingerprint corresponding to the first input in the first display area; or if the first fingerprint recognition mode is the press mode, recognizing, according to the press mode, a fingerprint corresponding to the first input in the first display area.

An electronic device may flexibly set a fingerprint recognition mode, so that when different UIs are displayed on a touchscreen, the electronic device can capture a fingerprint successfully.

With reference to the fifth aspect, in a first possible implementation, the determining that a fingerprint recognition mode in a first display area is a first fingerprint recognition mode includes:

if the first display area is an area including a press-mode user interface UI widget, determining that the first fingerprint recognition mode is the press mode, where the press-mode UI widget uses the press mode to interact with the user; or if the first display area is an area including a swipe-mode UI widget, determining that the fingerprint recognition mode in the first display area is the swipe mode, where the swipe-mode UI widget uses the swipe mode to interact with the user.

The electronic device may flexibly set, according to different modes of interactions between the UI widget and the user, the fingerprint recognition mode in the area including the UI widget on the touchscreen.

With reference to the fifth aspect or the first possible implementation of the fifth aspect, in a second possible implementation, the method further includes:

in a process of recognizing the fingerprint corresponding to the first input, prompting the user with progress of recognizing the fingerprint corresponding to the first input.

This may prevent a finger of the user from leaving the first display area too early in a process of capturing the user fingerprint, or prevent the user from sliding a finger in the first display area when fingerprint recognition is performed in the press-mode fingerprint recognition mode; otherwise, work of the fingerprint recognition sensor in capturing the fingerprint is affected.

With reference to the fifth aspect or the first possible implementation of the fifth aspect, in a second possible implementation, before the detecting a first input of a user in the first display area, the method further includes:

enabling a fingerprint recognition function only in the first display area, and keeping the fingerprint recognition function disabled in areas different from the first display area.

Because the fingerprint recognition function is enabled only in the first display area in which the user fingerprint needs to be captured, not only the user fingerprint can be captured successfully, but also power can be saved.

With reference to any one of the fifth aspect or the foregoing possible implementations of the fifth aspect, in a fourth possible implementation, after the recognizing a fingerprint corresponding to the first input, the method further includes:

disabling the fingerprint recognition function in the first display area.

Power can be saved if the fingerprint recognition function is disabled in the first display area after fingerprint recognition.

With reference to any one of the fifth aspect or the foregoing possible implementations of the fifth aspect, in a fifth possible implementation, if it is determined that the first fingerprint recognition mode is the swipe mode, after the detecting a first input of a user in the first display area, the method further includes:

determining a second display area according to the first input;

determining, according to the first input, that a fingerprint recognition mode in the second display area is a second fingerprint recognition mode, where the second fingerprint recognition mode is the swipe mode or the press mode;

detecting a second input of the user in the second display area; and if the second fingerprint recognition mode is the swipe mode, recognizing, according to the swipe mode, a fingerprint corresponding to the second input in the second display area; or if the second fingerprint recognition mode is the press mode, recognizing, according to the press mode, a fingerprint corresponding to the second input in the second display area.

According to the input operation in the previous step, the display area in which the fingerprint recognition function needs to be subsequently enabled is determined, and the fingerprint recognition mode in the display area is determined. Therefore, the display area in which the fingerprint recognition function needs to be enabled may be effectively predicted, fingerprint recognition is performed by using an appropriate fingerprint recognition mode, and effectiveness of fingerprint recognition is higher.

With reference to the fifth possible implementation of the fifth aspect, in a sixth possible implementation, the determining a second display area according to the first input includes:

predicting at least one first track according to the first input, and using a display area that the at least one first track passes through, as the second display area.

According to the input operation in the previous step, the display area in which the fingerprint recognition function needs to be subsequently enabled is determined. Therefore, the display area in which the fingerprint recognition function needs to be enabled may be effectively predicted, and effectiveness of fingerprint recognition is higher.

With reference to the fifth possible implementation of the fifth aspect, in a seventh possible implementation, the determining a second display area according to the first input includes:

determining the second display area according to operation information about the first operation, where the operation information about the first operation includes at least one of the following information:

force of the first input applied to the touchscreen;

a moving speed of the first input;

a moving direction of the first input; or duration of the first input.

This solution provides an optional implementation of determining the second display area by the electronic device.

With reference to the seventh possible implementation of the fifth aspect, in an eighth possible implementation, the second display area is determined according to the operation information about the first operation and at least one of the following information:

recorded habit information about operations performed by the user of the electronic device on the electronic device;

a direction in which the user holds the electronic device; or a layout of UI widgets in the second display area.

This solution provides an optional implementation of determining the second display area by the electronic device.

With reference to any one of the fifth aspect or the foregoing possible implementations of the fifth aspect, in a ninth possible implementation, the first display area includes an area including at least two unlocking points, the at least two unlocking points are unlocking points of a same UI widget, and the fingerprint recognition mode in the first display area is the press mode;

the detecting a first input of a user in the first display area includes: detecting the first input of the user in an area including a first unlocking point in the at least two unlocking points;

after the detecting the first input of the user in an area including a first unlocking point in the at least two unlocking points, the method further includes: disabling the fingerprint recognition function in an area including another unlocking point, where the another unlocking point is an unlocking point different from the first unlocking point in the at least two unlocking points;

the recognizing a fingerprint corresponding to the first input in the first display area includes: recognizing, according to the press mode, the fingerprint corresponding to the first input in the area including the first unlocking point; and after the recognizing, according to the press mode, the fingerprint corresponding to the first input in the area including the first unlocking point, the method further includes: if the recognized fingerprint is authenticated successfully, disabling the fingerprint recognition function in the area including the first unlocking point.

When the display area includes multiple unlocking points, fingerprint recognition is performed in the press-mode fingerprint recognition mode to effectively capture the user fingerprint; and when fingerprint recognition is performed in the area including the first unlocking point, the fingerprint recognition function is disabled at other unlocking points to save power.

With reference to the ninth possible implementation of the fifth aspect, in a tenth possible implementation, if the fingerprint corresponding to the first input in the area including the first unlocking point is recognized according to the press mode but fails to be authenticated, the method further includes:

determining a next unlocking point after the first unlocking point according to a set unlocking sequence of the at least two unlocking points;

setting a fingerprint recognition mode in an area including the determined next unlocking point to the press mode;

detecting a user input in the area including the next unlocking point; and recognizing, in the area including the next unlocking point, according to the press mode, a fingerprint corresponding to the detected user input in the area including the next unlocking point.

If the fingerprint corresponding to the first input and captured by the fingerprint recognition sensor in the area including the first unlocking point fails to match the fingerprint template, the next unlocking point after the first unlocking point is determined according to the set unlocking sequence of the at least two unlocking points, and fingerprint recognition is performed in the area including the determined next unlocking point. In this way, the user fingerprint may be recognized in an unlocking process, and user identity authentication may be performed according to an unlocking result and a fingerprint recognition result.

According to a sixth aspect, an embodiment of the present invention provides a fingerprint recognition method, including:

detecting a third input of a user in a third display area;

determining a fourth display area according to the third input;

determining, according to the third input, that a fingerprint recognition mode in the fourth display area is a third fingerprint recognition mode, where the third fingerprint recognition mode is a swipe mode or a press mode;

detecting a fourth input of the user in the fourth display area; and if the third fingerprint recognition mode is the swipe mode, recognizing, according to the swipe mode, a fingerprint corresponding to the fourth input in the fourth display area; or if the third fingerprint recognition mode is the press mode, recognizing, according to the press mode, a fingerprint corresponding to the fourth input in the fourth display area.

According to the input operation in the previous step, a display area in which a fingerprint recognition function needs to be subsequently enabled is determined, and a fingerprint recognition mode in the display area is determined. Therefore, the display area in which the fingerprint recognition function needs to be enabled may be effectively predicted, fingerprint recognition is performed by using an appropriate fingerprint recognition mode, and effectiveness of fingerprint recognition is higher.

With reference to the sixth aspect, in a first possible implementation, the determining the fourth display area according to the third input includes:

predicting at least one second track according to the third operation, and using a display area that the at least one second track passes through or points to, as the fourth display area.

According to the input operation in the previous step, the display area in which the fingerprint recognition function needs to be subsequently enabled is determined. Therefore, the display area in which the fingerprint recognition function needs to be enabled may be effectively predicted, and effectiveness of fingerprint recognition is higher.

DESCRIPTION OF EMBODIMENTS

Figure 1:
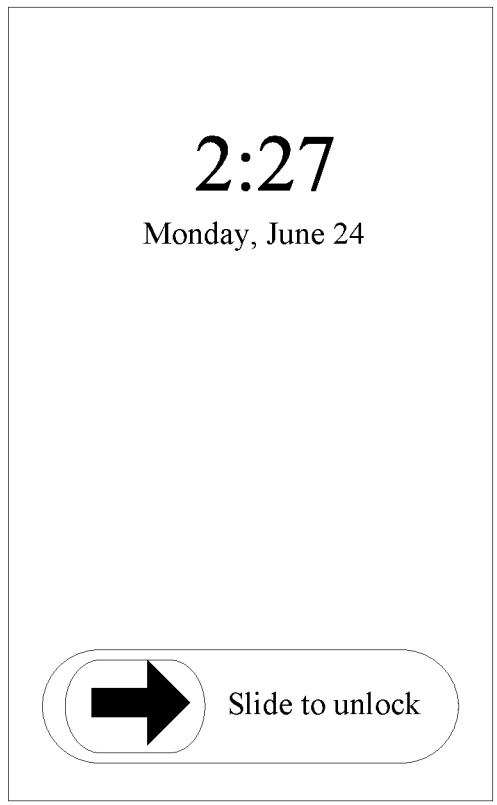
FIG. 1 is a schematic diagram of a UI widget for unlocking by a user.

To make the objectives, technical solutions, and advantages of this application more understandable, the following provides detailed descriptions. The detailed descriptions provide various implementations of a device and/or a method by using block diagrams, flowcharts, and/or examples. These block diagrams, flowcharts, and/or examples include one or more functions and/or operations. Persons skilled in the art may understand that each function and/or operation in the block diagrams, the flowcharts, and/or the examples can be performed independently and/or jointly by using various hardware, software, and firmware, and/or any combination thereof.

The following explains basic concepts in this application. It should be noted that, the explanations are intended to make this application more understandable, but not intended to limit the protection scope of this application.

1. Fingerprint Recognition Sensor

An electronic device performs fingerprint recognition by using a fingerprint recognition sensor. According to different design requirements of the electronic device, the fingerprint recognition sensor may be disposed in any position on the electronic device, for example, a front side, a rear side, or a lateral side. The fingerprint recognition sensor may also be integrated with keys or a touchscreen of the electronic device.

In embodiments of the present invention, the fingerprint recognition sensor may cover an upper part of the touchscreen of the electronic device; or is located in a middle of the touchscreen of the electronic device; or is located at a lower part of the touchscreen of the electronic device and covered by the touchscreen. When a user performs an operation on the touchscreen, the electronic device captures a user fingerprint by using the fingerprint recognition sensor, and implements a fingerprint recognition function.

When a finger of the user touches the touchscreen, the fingerprint recognition sensor captures the user fingerprint. The operation of touching the screen and an operation of user identity authentication that are originally separated are combined into one. This greatly improves user experience.

In the embodiments of the present invention, the fingerprint recognition function may be enabled in a display area on the touchscreen. Optionally, when the fingerprint recognition function is enabled in the display area, a fingerprint recognition sensor in the display area is enabled. In this way, the fingerprint recognition sensor in the display area may capture a fingerprint corresponding to a user input, and a processor authenticates the captured fingerprint to complete fingerprint recognition. Optionally, in other areas different from the display area on the touchscreen, the fingerprint recognition function may be disabled. In this way, even if the user performs an input operation in other areas, the fingerprint recognition sensor does not perform fingerprint recognition. One of advantages of this implementation is power saving.

2. Fingerprint Recognition Process

In the embodiments of the present invention, the fingerprint recognition sensor in the electronic device captures the user fingerprint, and matches the captured user fingerprint with a prestored fingerprint template. During matching, many algorithms may be used. Details are not described herein. If the matching is successful, it is determined that the recognized user fingerprint is authenticated successfully. Otherwise, it is determined that the recognized user fingerprint fails to be authenticated.

In the embodiments of the present invention, whether a user identity is authenticated successfully is determined according to whether the user fingerprint is authenticated successfully. In some optional solutions of some embodiments, if the recognized user fingerprint is authenticated successfully, it is determined that the user identity is authenticated successfully. In other optional solutions, in addition to considering whether the user fingerprint is authenticated successfully, another identity authentication mode (for example, unlocking a 9-point pattern lock) needs to be considered, and whether user identity authentication is successful is determined according to a combination thereof.

In the embodiments of the present invention, fingerprint recognition modes may be classified into a press mode and a swipe mode.

I. Press-Mode Fingerprint Recognition Mode

When the electronic device uses the press-mode fingerprint recognition mode, the fingerprint recognition sensor recognizes, according to the press mode, a fingerprint corresponding to a detected user input in the display area on the touchscreen.

Specifically, the user puts a finger in the display area, and presses and holds the display area for a period of time. When the finger of the user presses the screen, the fingerprint recognition sensor captures a user fingerprint, and then matches the captured user fingerprint with the fingerprint template prestored on the electronic device.

II. Swipe-Mode Fingerprint Recognition Mode

When the electronic device uses the swipe-mode fingerprint recognition mode, the fingerprint recognition sensor recognizes, according to the swipe mode, a fingerprint corresponding to a detected user input in the display area on the touchscreen.

Specifically, the user slides a finger in the display area. In a sliding process, the fingerprint recognition sensor captures at least one fingerprint segment of a user fingerprint. After the finger of the user completely swipes across the display area, the fingerprint recognition sensor splices all captured fingerprint segments, and matches the spliced user fingerprint with the prestored fingerprint template.

Regardless of whether the press-mode fingerprint recognition mode or the swipe-mode fingerprint recognition mode is used, fingerprint matching may be implemented by using a matching algorithm. Optionally, a press-mode matching algorithm may be the same as or different from a swipe-mode matching method.

In the embodiments of the present invention, the electronic device captures a user fingerprint in a display area of the touchscreen. When a fingerprint recognition mode is set, the mode may also be set for the display area.

For example, when a fingerprint recognition mode in a display area is set to the press mode, when the electronic device detects a user input in the display area, the fingerprint recognition sensor recognizes, according to the press-mode fingerprint recognition mode, a user fingerprint corresponding to the user input in the display area.

For another example, when a fingerprint recognition mode in a display area is set to the swipe mode, when the electronic device detects a user input in the display area, the fingerprint recognition sensor recognizes, according to the swipe-mode fingerprint recognition mode, a user fingerprint corresponding to the user input in the display area.

3. UI Widget

A user interface (User Interface, UI) is a medium for exchanging information between an operating system of the electronic device and the user. A UI widget (UI Widget) is a widget used for performing an interaction with the user on the UI. The electronic device receives an input operation of the user by using the UI widget, responds to an event generated by the input operation, and invokes a corresponding event processing function to process the event.

In the embodiments of the present invention, according to modes of interactions between UI widgets and the user, the UI widgets are classified into a press-mode UI widget and a swipe-mode UI widget.

I. Press-Mode UI Widget

By using the press-mode UI widget, the user may interact with the electronic device in the press mode. The user presses a position in which the UI widget is located. In a user operation process, basically there is no relative offset between a point of the UI widget that the finger of the user starts to touch on the touchscreen and a point at which the finger is raised when a user operation is completed.

Using an Android (Android) system as an example, a press-mode UI widget may be a button (Button) widget. The user presses the button widget on the touchscreen to complete an input operation. When the user operates the button widget in different modes, for example, tap, press and hold, touch, double-tap, and release, different events may be triggered. Different events may all be recognized by the Android system.

Other common press-mode UI widgets include but are not limited to: a radio button (RadioButton) widget, a check box (CheckBox) widget, and the like.

II. Swipe-Mode UI Widget

By using the swipe-mode UI widget, the user may interact with the electronic device in the swipe mode. The user slides, swipes, or drags in a position in which the UI widget is located. In a user operation process, there is a distance between a point of the UI widget that the finger of the user starts to touch on the touchscreen and a point at which the finger is raised when a user operation is completed.

Using an Android system as an example, a common press-mode UI widget is a Seekbar, for example, a Seekbar (Seekbar) used for adjusting volume, progress, or luminance or displaying progress on the screen.

When the user interacts with the swipe-mode UI widget, the finger of the user presses and holds the position in which the UI widget is located on the touchscreen, and after the finger slides for a distance on the touchscreen, the finger is raised to complete a compete input operation.

In a process from pressing the swipe-mode UI widget by the finger of the user and sliding for a distance on the swipe-mode UI widget to raising the finger, different events may be triggered, for example, pressing and sliding (progress) change, and different events may be recognized by the UI widget.

4. Screen Locking and Unlocking

Regardless of the type of the operating system of the electronic device, an unlocking interface is one of user interfaces that the user encounters most frequently, and the user may operate the unlocking interface to unlock the electronic device.

A common UI widget used for unlocking is shown in FIG. 1. To implement screen unlocking, the user slides a finger in a direction that an arrow points to.

Figure 2:
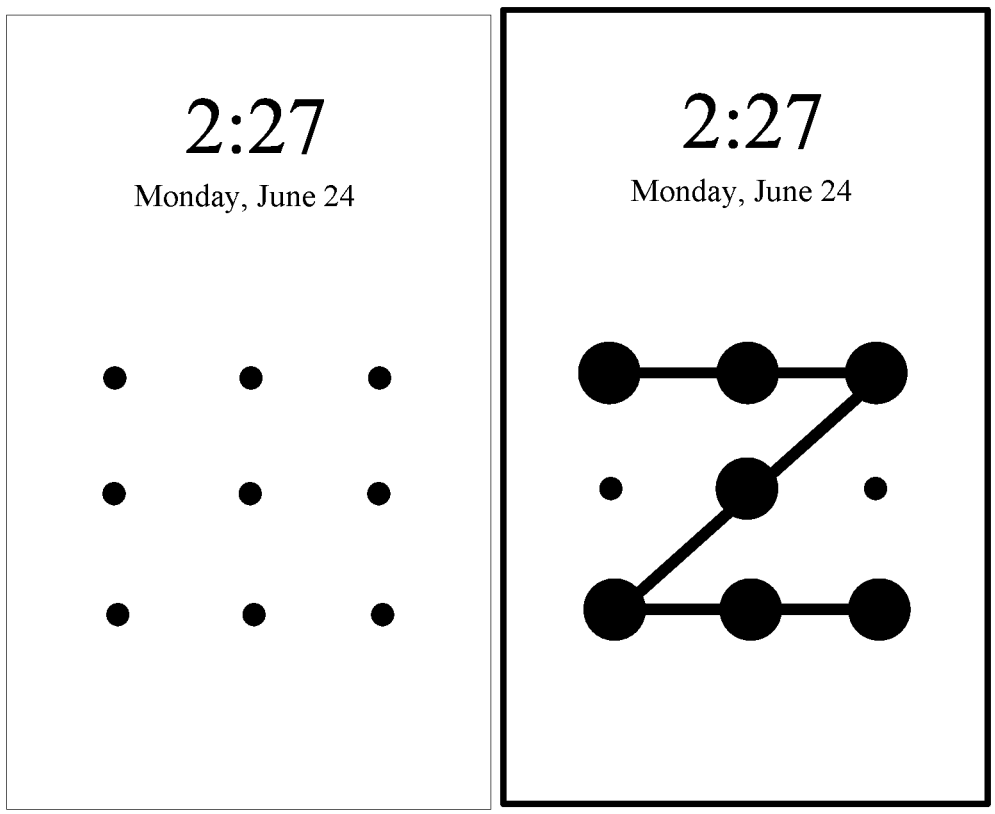
FIG. 2 is a schematic diagram of a 9-point pattern lock.

Another common UI widget used for unlocking is a UI widget including at least one unlocking point, for example, "a 9-point pattern lock" shown in FIG. 2. Unlocking points may be preset points displayed on a graphical unlocking interface or a track unlocking interface. The electronic device can be unlocked successfully only when a slide operation or a tap operation of the user passes through the preset points according to a preset sequence.

In the 9-point pattern lock shown in FIG. 2, each point is an unlocking point, and there are nine points in total. The user slides a finger between the unlocking points, and if a sliding path is consistent with a preset unlocking path, the screen can be unlocked successfully.

In some embodiments of the embodiments of the present invention, fingerprint recognition is performed in the press-mode fingerprint recognition mode in a display area including unlocking points, for example, in a display area that uses unlocking points as a center and uses a preset r value (r is greater than 0) as a radius on the touchscreen; or fingerprint recognition is performed in the swipe-mode fingerprint recognition mode in a display area including a path of unlocking points, for example, in a rectangular area that uses a path of unlocking points as a symmetric axis (a width d of the display area is a preset value, and d is greater than 0).

Both the area including the unlocking points and the display area including the path of the unlocking points may be considered as display areas including UI widgets. For another UI widget, for example, a button widget, a display area including the UI widget may be a circular display area that uses a button center as a center and uses a preset r' value (r' is greater than 0) as a radius. For another example, a display area including a Seekbar may be a display area that includes the Seekbar, uses the Seekbar as a center, and has a same shape as the Seekbar, and a scope of the display area may be preset.

Regardless of the type of the UI widget, the display area including the UI widget may be preset. During setting, one or more of multiple factors such as a screen area that the finger of the user touches, a shape of the area, and a size of the area, as long as it can be ensured that a user fingerprint can be successfully captured when the finger of the user performs an operation on the UI widget.

The embodiments of the present invention are hereinafter described with reference to accompanying drawings.

Embodiment 1

Figure 3:
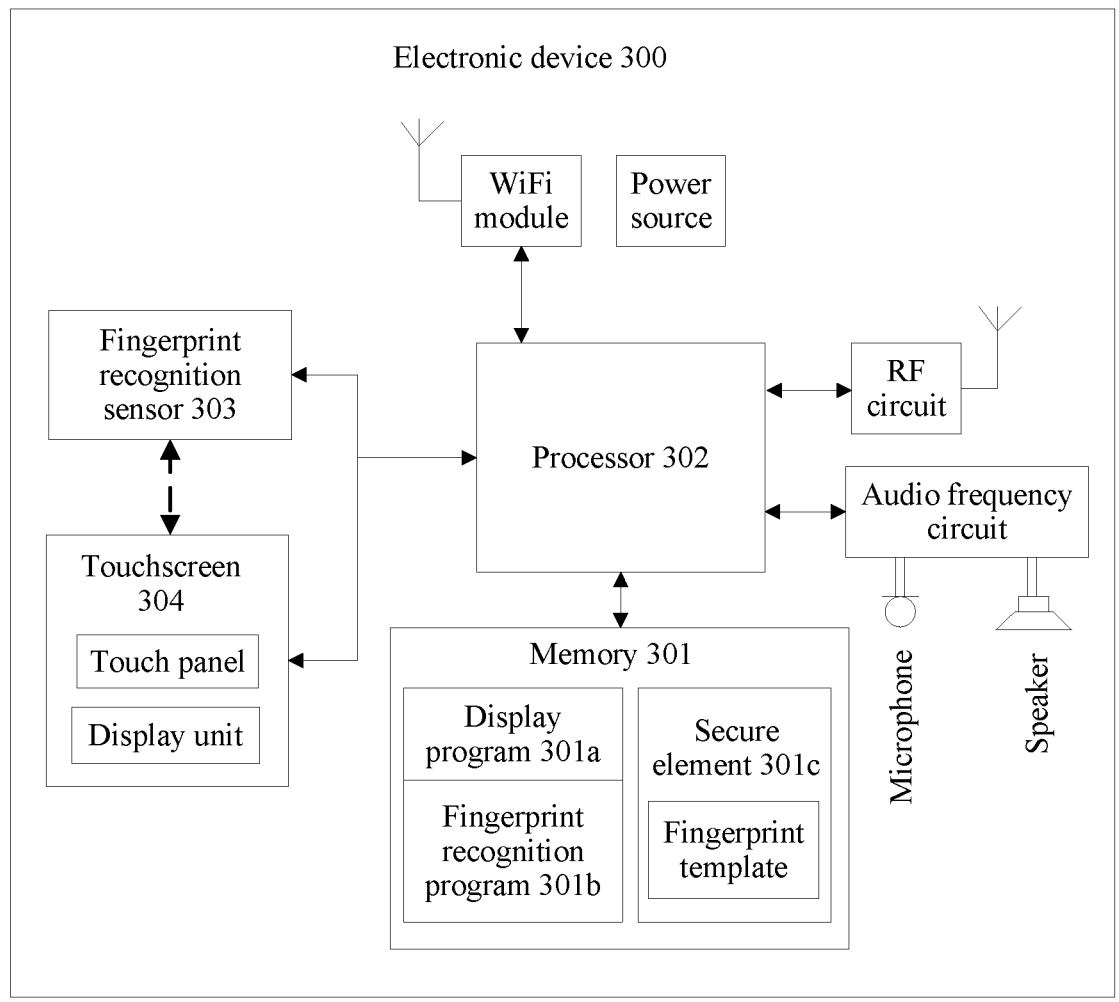
FIG. 3 is a schematic diagram of an internal structure of an electronic device according to Embodiment 1 of the present invention.

FIG. 3 shows an internal structure of an electronic device 300 according to this embodiment of the present invention. The electronic device 300 may include a mobile phone, a tablet computer, a personal digital assistant (Personal Digital Assistant, PDA), a point of sale (Point of Sales, POS), a vehicle-mounted computer, a desktop computer, a notebook computer, a server, or the like.

As shown in FIG. 3, the electronic device 300 may internally include: a processor 302, and a memory 301, a fingerprint recognition sensor 303, and a touchscreen 304 that are respectively connected to the processor 302, and optionally may further include external devices such as a speaker and a microphone. When the electronic device 300 communicates externally in a wireless mode, the electronic device 300 may further include a radio frequency (Radio Frequency, RF) circuit and a connected antenna, a Wireless Fidelity (Wireless Fidelity, WiFi) module and a connected antenna, and the like. In addition, the electronic device 300 further includes a power source supplying power for the electronic device 300.

It may be understood by persons skilled in the art that, the internal structure of the electronic device shown in FIG. 3 does not constitute a limitation on the electronic device. A quantity of components included may be greater or less than that shown in the figure, or some components are combined, or arrangements of components are different.

The following describes each component of the electronic device 300 in detail with reference to FIG. 3.

The memory 301 may be configured to store a program and data. The processor 302 performs various function applications and data processing of the electronic device 300 by running the program stored in the memory 301.

The memory 301 may mainly include a program storage area and a data storage area. The program storage area may store an operating system (for example, an Android operating system, abbreviated to "Android system" or iOS operating system, "iOS system" for short, where the operating system may also be referred to as "the system" for short), an application program required by at least one function (such as an audio playing function or an image playing function), or the like. The data storage area may store data (such as audio data or a phone book) that is created according to use of the electronic device 300, or the like.

By running the operating system stored in the memory 301, the processor 302 invokes the application program to implement a function provided by the application program. In addition, the operating system may further control the touchscreen 304 or the fingerprint recognition sensor 303.

In this embodiment of the present invention, the operating system in the electronic device 300 invokes a display program 301a and a fingerprint recognition program 301b to control the fingerprint recognition sensor 303 and the touchscreen 304 and the like to jointly complete a fingerprint recognition procedure provided by this embodiment of the present invention.

In addition, the memory 301 may include a high-speed random access memory, and may further include a non-volatile memory, for example, at least one magnetic disk storage, a flash memory, or another volatile solid state memory.

The memory 301 may further store a fingerprint template. The fingerprint template is used for comparison with a user fingerprint captured by the fingerprint recognition sensor 303 in a fingerprint recognition process of the electronic device 300. The electronic device 300 determines, according to a comparison result, whether the fingerprint is authenticated successfully.

Optionally, the fingerprint template may be stored in a secure element (secure element or secure enclave, SE) 301c. The secure element may exist independently of other memories in the memory 301. Because confidentiality of the secure element is higher than an ordinary memory, it may be effectively ensured that the fingerprint template is stored securely.

The program storage area in the memory 301 may store the display program 301a and the fingerprint recognition program 301b.

The display program 301a is configured to display the foregoing display area on the touchscreen 304.

The fingerprint recognition program 301b is configured to: determine a fingerprint recognition mode in a display area on the touchscreen 304, set the fingerprint recognition mode in the display area, instruct the fingerprint recognition sensor 303 to capture a user fingerprint in the display area according to the set fingerprint recognition mode (for example, send a control instruction to the fingerprint recognition sensor 303, where the control instruction is used to control the fingerprint recognition sensor 303 to capture the user fingerprint in the display area according to the set fingerprint recognition mode), and match the user fingerprint captured by the fingerprint recognition sensor 303 with the prestored fingerprint template.

The processor 302 runs the fingerprint recognition program 301b, controls the fingerprint recognition sensor 303 to enable or disable a fingerprint recognition function, and after the fingerprint recognition sensor 303 enables the fingerprint recognition function, receives the user fingerprint captured by the fingerprint recognition sensor 303. After the fingerprint recognition function is enabled, the fingerprint recognition sensor 303 captures the user fingerprint by using an electrode, and sends the captured user fingerprint to the processor 302. The processor 302 matches the received user fingerprint with the fingerprint template to complete fingerprint recognition.

FIG. 3 shows that the fingerprint recognition program 301b is stored in the memory 301. Actually, there is another optional implementation. In this implementation, the fingerprint recognition program 301b may include two parts. One part may be stored in the memory 301, and configured to determine a fingerprint recognition mode in a display area on the touchscreen 304, set the fingerprint recognition mode in the display area, and instruct the fingerprint recognition sensor 303 to capture a user fingerprint in the display area according to the set fingerprint recognition mode. This part may be referred to as "a second fingerprint recognition program".

The other part may be stored on the fingerprint recognition sensor 303, and configured to control, according to a fingerprint recognition mode set by a first fingerprint recognition program, the fingerprint recognition sensor 303 to capture a user fingerprint in the foregoing display area, and match the captured user fingerprint with the prestored fingerprint template. This part may be referred to as "the first fingerprint recognition program".

When the fingerprint recognition sensor 303 stores the first fingerprint recognition program, the fingerprint recognition sensor 303 may further include a dedicated processor. The dedicated processor executes the first fingerprint recognition program, performs a fingerprint recognition process to capture and match a fingerprint, and notifies the processor 302 of a fingerprint recognition result.

In this embodiment of the present invention, the fingerprint recognition sensor 303 may include several electrodes. As described above, the electrodes may cover an upper part of the touchscreen 304, or are integrated in a middle of the touchscreen 304, or are located at a lower part of the touchscreen 304 and covered by the touchscreen 304.

The touchscreen 304 may include a touch panel, a display unit, and the like.

The touch panel, also referred to as a touchscreen, may capture a touch operation of a user on or near the touch panel (for example, an operation performed by the user by using any appropriate object or accessory such as a finger or a stylus on the touch panel or near the touch panel), and drive a corresponding connection apparatus according to a preset program.

Optionally, the touch panel may include two parts: a touch detection apparatus and a touch controller.

The touch detection apparatus detects a touch direction of the user, detects a signal generated by the touch operation, and transmits the signal to the touch controller. The touch controller receives touch information from the touch detection apparatus, converts the touch information into touch point coordinates, and transmits the touch point coordinates to the processor 302, and can receive a command transmitted by the processor 302 and execute the command.

In addition, the touch panel may be implemented by using multiple types such as resistive, capacitive, infrared, and surface acoustic wave.

The display unit may be configured to display information input by the user or information provided for the user and various menus of the electronic device 300. Optionally, the display unit may be configured in a form of a liquid crystal display (Liquid Crystal Display, LCD), an organic light-emitting diode (Organic Light-Emitting Diode, OLED), or the like. Further, the touch panel may cover the display unit. When the touch panel detects a touch operation on or near the touch panel, the touch panel transmits the touch operation to the processor 302 to determine a type of a touch event. Afterward, the processor 302 provides a corresponding visual output on the display unit according to the type of the touch event.

As shown in FIG. 3, the touch panel and the display unit may be integrated into the touchscreen 304 and used to implement input and output functions of the electronic device 300, or the touch panel and the display unit may be used as two independent components to implement input and output functions of the electronic device 300 respectively. This is not limited in this embodiment of the present invention.

Using the structure shown in FIG. 3 as an example, in this embodiment of the present invention, optionally, the processor 302 invokes the fingerprint recognition program 301b stored in the memory 301 to determine a fingerprint recognition mode in a display area, set the fingerprint recognition mode in the display area to the determined mode, and instruct the fingerprint recognition sensor 303 to capture a user fingerprint according to the set fingerprint recognition mode.

The processor 302 invokes the display program 301a stored in the memory 301 to control the display unit in the touchscreen 304 to display the display area.

The touch panel in the touchscreen 304 detects an input operation of the user on the touchscreen 304 by using the touch detection apparatus of the touch panel (a chip for implementing the touch detection apparatus may be integrated on a main board of the electronic device 300), and sends a signal generated by the input operation to the touch controller of the touch panel (a chip for implementing the touch controller may also be integrated on the main board of the electronic device 300.

Further, the touch detection apparatus and the touch controller may be implemented in one chip). A signal received by the touch controller is converted into information about the input (for example, an input position, a type of the input operation, duration of the input, a quantity of touch points of the touchscreen 304 that are touched by the user and correspond to the input, and the like), and the generated information about the input is sent to the processor 302.

After receiving the information about the operation, the processor 302 instructs, by using the fingerprint recognition program 301b stored in the memory 301, the fingerprint recognition sensor 303 to perform fingerprint recognition according to the fingerprint recognition mode previously set by the processor 302.

Alternatively, in another optional implementation, the touch panel directly triggers (instructs), by using a communications circuit between the touch panel and the fingerprint recognition sensor 303, the fingerprint recognition sensor 303 to perform fingerprint recognition. After receiving the instruction, the fingerprint recognition sensor 303 performs fingerprint recognition according to the fingerprint recognition mode previously set by the processor 302.

If the set fingerprint recognition mode is the press mode, the processor 302 performs the following operations by invoking the fingerprint recognition program 301b:

within duration of pressing the touchscreen 304 by the finger of the user (specifically, the touch panel may notify the fingerprint recognition sensor 303 whether the finger of the user leaves the touchscreen 304), controlling the fingerprint recognition sensor 303 to capture the user fingerprint, and matching the user fingerprint captured by the fingerprint recognition sensor 303 with the fingerprint template stored in the memory 301 to compete fingerprint recognition of the user.

If the set fingerprint recognition mode is the swipe mode, the processor 302 performs the following operations by invoking the fingerprint recognition program 301b:

in a process of sliding the finger of the user on the touchscreen 304 (specifically, the touch panel may notify the fingerprint recognition sensor 303 whether the finger of the user leaves the touchscreen 304), instructing the fingerprint recognition sensor 303 to capture user fingerprint segments for multiple times, splicing the multiple user fingerprint segments captured by the fingerprint recognition sensor 303, and matching the spliced user fingerprint with the fingerprint template stored in the memory 301 to complete fingerprint recognition.

The RF circuit may be configured to receive or transmit signals in an information reception or transmission or call process, and in particular, after receiving downlink information from a base station, transmit the downlink information to the processor 302 for processing, and in addition, transmit uplink data to the base station.

Generally, the RF circuit includes but is not limited to an antenna, at least one amplifier, a transceiver, a coupler, a low noise amplifier (Low Noise Amplifier, LNA), a duplexer, or the like.

In addition, the RF circuit may further communicate with a network and other devices through wireless communication.

The wireless communication may use any communications standard or protocol, including but not limited to:

the Global System for Mobile Communication (Global System of Mobile communication, GSM), general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), E-mail, short messaging service (Short Messaging Service, SMS), and the like.

In FIG. 3, an audio frequency circuit, the speaker, and the microphone may provide an audio interface between the user and the electronic device 300.

The audio frequency circuit may transmit an electrical signal converted from received audio data to the speaker, and the speaker converts the electrical signal into an audio signal for outputting. On the other hand, the microphone converts a captured audio signal into an electrical signal, and the audio frequency circuit converts the received electrical signal into audio data, and then outputs the audio data to the RF circuit; then the audio data is transmitted to another electronic device, for example, a mobile phone, or the audio data is output to the memory 301 for further processing.

WiFi is a short-range wireless transmission technology. By using the WiFi module, the electronic device 300 may help the user send or receive e-mails, browse web pages, access streaming media, and the like. It provides wireless broadband Internet access for the user.

Although FIG. 3 shows the WiFi module, it may be understood that, the WiFi module is not a necessary component of the electronic device 300, and may be completely omitted according to a requirement without changing the essence of the embodiments of the present invention.

The processor 302 is a control center of the electronic device 300. The processor 302 uses various interfaces and lines to connect all parts of the entire mobile phone, and executes various functions and data processing of the electronic device 300 by running or executing the program (or referred to as "a module") stored in the memory 301 and invoking data stored in the memory 301, thereby performing overall monitoring on the electronic device 300.

Optionally, the processor 302 may include at least one processing unit. Optionally, the processor 302 may integrate an application processor and a modem processor. The application processor mainly processes the operating system, a user interface, an application program, and the like. The modem processor mainly processes wireless communication. It may be understood that the modem processor may also not be integrated with the processor 302.

The electronic device 300 further includes a power source (such as a battery) supplying power to each component. Optionally, the power source may be logically connected to the processor 302 by using a power management system, so as to implement functions such as charge and discharge management and power consumption management by using the power management system.

Although not shown, the electronic device 300 may further include other sensors (such as a light sensor, a motion sensor, and the like) different from the fingerprint recognition sensor 303.

Specifically, the light sensor may include an ambient light sensor and a proximity sensor.

The ambient light sensor may adjust luminance of the display unit according to brightness of ambient light. The proximity sensor may turn off the display unit and/or backlight when the electronic device 300 moves to an ear.

As a motion sensor, an accelerometer sensor may detect acceleration magnitudes in all directions (generally three axes), and when the accelerometer sensor is stationary, may detect a magnitude and a direction of gravity, and may be configured to recognize a posture application of the mobile phone (such as switching between landscape and portrait, related games, and magnetometer posture calibration), vibration recognition related functions (such as a pedometer and a stroke), and the like.

As regards other sensors that can be configured for the electronic device 300, such as a gyroscope, a barometer, a hygrometer, a thermometer, and an infrared sensor, details are not described herein.

In addition, the electronic device 300 may further include a camera, a Bluetooth module, and the like. Details are not described herein.

The following Embodiment 2 to Embodiment 6 separately describe various fingerprint recognition procedures provided by the embodiments of the present invention.

In the description, it is assumed that the procedures should be performed by the electronic device 300 provided by Embodiment 1. However, it should be understood that the procedures may be applied to various electronic devices that have a touchscreen and a fingerprint recognition sensor, to implement fingerprint recognition.

The fingerprint recognition procedures provided by the following Embodiment 2 to Embodiment 6 may be completed by the operating system in the electronic device 300 by invoking the display program 301a and the fingerprint recognition program 301b stored in the memory 301 to control the touchscreen 304 and the fingerprint recognition sensor 303.

Embodiment 2

Embodiment 2 describes a first fingerprint recognition procedure provided by this embodiment of the present invention. The procedure may be applied to an electronic device 300 provided by Embodiment 2.

In this procedure, first, the electronic device 300 determines a fingerprint recognition mode in a first display area, and then a fingerprint recognition sensor 303 of the electronic device 300 recognizes, according to the fingerprint recognition mode determined by the electronic device 300, a fingerprint corresponding to a user input in the first display area.

Herein "the first display area" is used for distinguishing from another display area mentioned in this embodiment, namely, a second display area. The first display area may be at least one any display area on a touchscreen 304.

Figure 4:
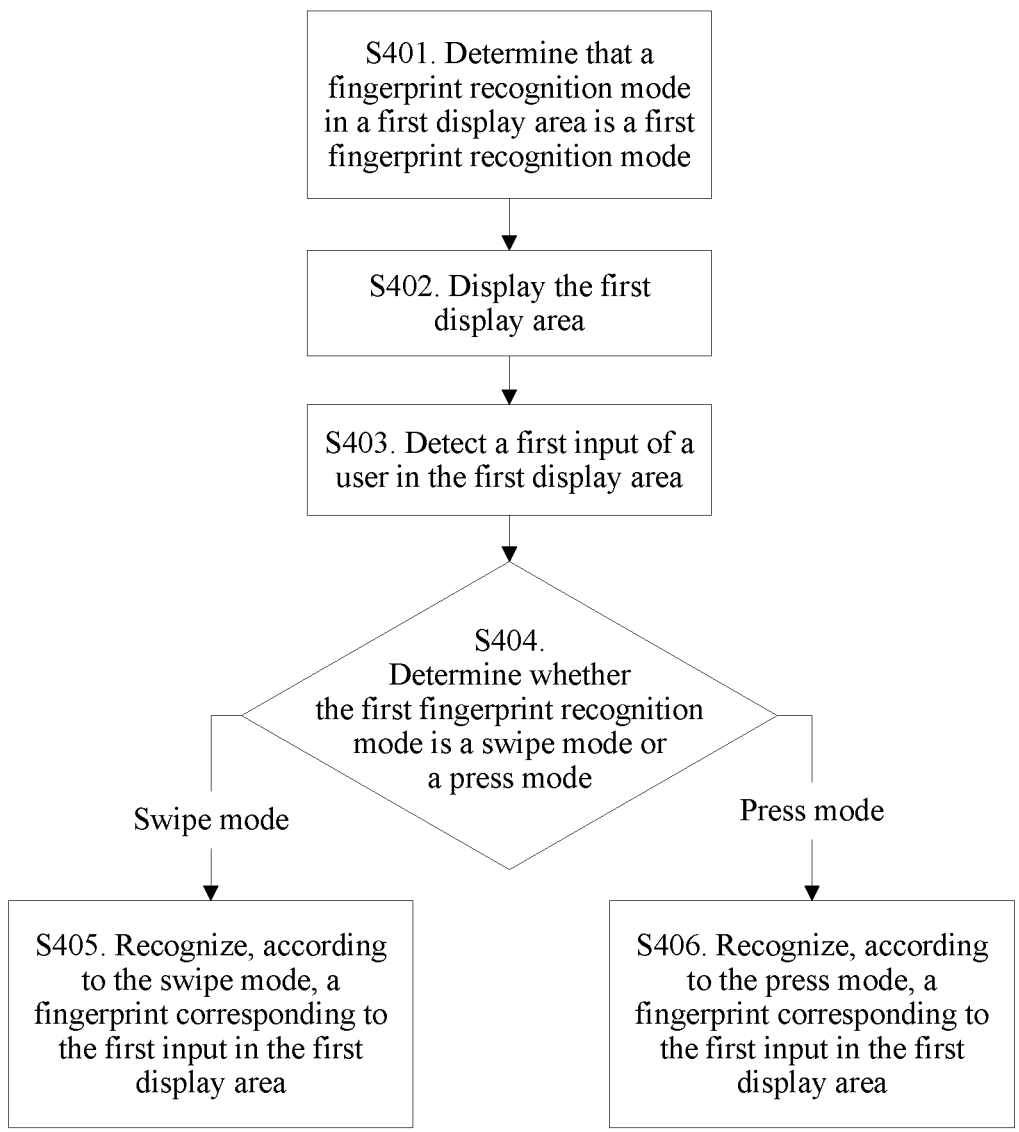
FIG. 4 is a flowchart of a fingerprint recognition procedure according to Embodiment 2 of the present invention.

With reference to FIG. 4, the following describes in detail an optional procedure provided by Embodiment 2. As shown in FIG. 4, a procedure performed by the electronic device 300 includes the following steps.

S401. Determine that a fingerprint recognition mode in a first display area is a first fingerprint recognition mode, where the first fingerprint recognition mode is a swipe mode or a press mode.

Optionally, a processor 302 in the electronic device 300 invokes a fingerprint recognition program 301b to determine that the fingerprint recognition mode in the first display area is the first fingerprint recognition mode.

S402. Display the first display area, and set the fingerprint recognition mode in the first display area to the first fingerprint recognition mode.

Optionally, the processor 302 in the electronic device 300 invokes a display program 301a to display the first display area on the touchscreen 304.

S403. Detect a first input of a user in the first display area.

Optionally, the touchscreen 304 of the electronic device 300 may detect the first input, and send information about the detected first input to the processor 302; and the processor 302 may perform step S404 after receiving the information about the first input.

S404. Determine the first fingerprint recognition mode, and if the first fingerprint recognition mode is the swipe mode, perform step S405, or else, perform step S406.

S405. Recognize, according to the swipe mode, a fingerprint corresponding to the first input in the first display area.

Optionally, the processor 302 controls the fingerprint recognition sensor 303 to capture, according to the swipe mode, the fingerprint corresponding to the first input in the first display area, and compares the fingerprint captured by the fingerprint recognition sensor 303 with a fingerprint template stored in a memory 301.

S406. Recognize, according to the press mode, a fingerprint corresponding to the first input in the first display area.

Optionally, the processor 302 controls the fingerprint recognition sensor 303 to capture, according to the press mode, the fingerprint corresponding to the first input in the first display area, and compares the fingerprint captured by the fingerprint recognition sensor 303 with the fingerprint template stored in the memory 301.

Other UI widgets may also be displayed with the first display area. For a specific display method, refer to a conventional method for displaying a display area on a touchscreen by an electronic device, for example, a method for displaying a user interface. The first display area may include at least one display area.

A sequence of performing step S402 and step S401 is not limited, that is, step S402 may precede step S401, or step S401 may precede step S402.

In step S401, multiple manners including the following manners may be used to determine the fingerprint recognition mode in the first display area.

Manner 1: Determine the Fingerprint Recognition Mode According to Configuration Description Information of a UI Widget.

In the manner 1, the first display area is an area including the UI widget, and the fingerprint recognition mode in the area including the UI widget may be predefined in the configuration description information of the UI widget. The configuration description information of the UI widget may be a description document for defining a UI widget layout of an application program by using a markup language such as XML.

For example, a fingerprint recognition mode in configuration description information of a button widget may be preset to the press mode. For another example, a fingerprint recognition mode in configuration description information of a Seekbar may be preset to the swipe mode.

In the manner 1, during the setting of the fingerprint recognition mode, the configuration description information of the UI widget in the first display area may be first read to obtain the preset fingerprint recognition mode in the configuration description information, and then the fingerprint recognition mode in the first display area is set to the fingerprint recognition mode set in the configuration description information.

Manner 2: Determine the Fingerprint Recognition Mode According to a Type of a UI Widget.

For example, if the first display area is an area including a press-mode user interface UI widget, it is determined that the first fingerprint recognition mode is the press mode.

For another example, if the first display area is an area including a swipe-mode UI widget, it is determined that the fingerprint recognition mode in the first display area is the swipe mode.

Manner 3: Determine the Fingerprint Recognition Mode According to a User Input.

Optionally, before the first input of the user in the first display area is detected in step S403, another input of the user is detected in another display area different from the first display area on the touchscreen 304 of the electronic device 300, and the fingerprint recognition mode in the first display area is predicted according to the another input.

For example, when the user slides a finger in the another display area, the electronic device 300 may determine that the finger of the user will enter the first display area. In this case, the fingerprint recognition mode in the first display area is determined according to a speed of an input operation performed by the finger of the user on the touchscreen 304. When the speed is greater than a speed threshold, it is determined that the fingerprint recognition mode in the first display area is the swipe mode; or when the speed is not greater than a speed threshold, it is determined that the fingerprint recognition mode in the first display area is the press mode.

In step S401, a manner of determining the fingerprint recognition mode is not limited to the foregoing three manners. Before the fingerprint recognition, the fingerprint recognition mode in the display area is preset. The fingerprint recognition mode may be set flexibly according to different display areas, different user input operations, and/or different UI widgets.

In this embodiment of the present invention, whichever operating system is used in the electronic device 300, principles of displaying the first display area and setting the fingerprint recognition mode in the first display area by the electronic device 300 are the same.

Using an Android system and an iOS system as an example, when an application (namely, an application program) is run, the application may move from a foreground of the system to a background of the system, and may be loaded from the background of the system to the foreground of the system again. When the application is loaded to the foreground of the system, a layout of the application may be loaded again. Upon completion of loading, the application is displayed on the foreground of the system. The fingerprint recognition mode in the first display area may be adjusted correspondingly when the application is displayed on the foreground of the system. For example, the first display area is displayed, and one of the foregoing manners may be used during displaying to set the fingerprint recognition mode in the first display area.

The foregoing manner 1 and manner 3 may be used to set, according to different UI widgets, the fingerprint recognition mode in the first display area including the UI widgets. For example, the UI widget is a button, a sliding block, or the like. In the two manners, when the user taps the button or pulls the sliding block for a distance, an operation on a UI may be implemented.

Therefore, fingerprint recognition modes corresponding to different UI widgets may be preset. For a press-mode UI widget, a press-mode fingerprint recognition mode is configured. For a swipe-mode UI widget, a swipe-mode fingerprint recognition mode is configured. That is, the fingerprint recognition mode of the UI widget is prescribed, so that corresponding to different UI widgets, the fingerprint recognition sensor 303 works in a most appropriate fingerprint recognition mode.

Figure 5:
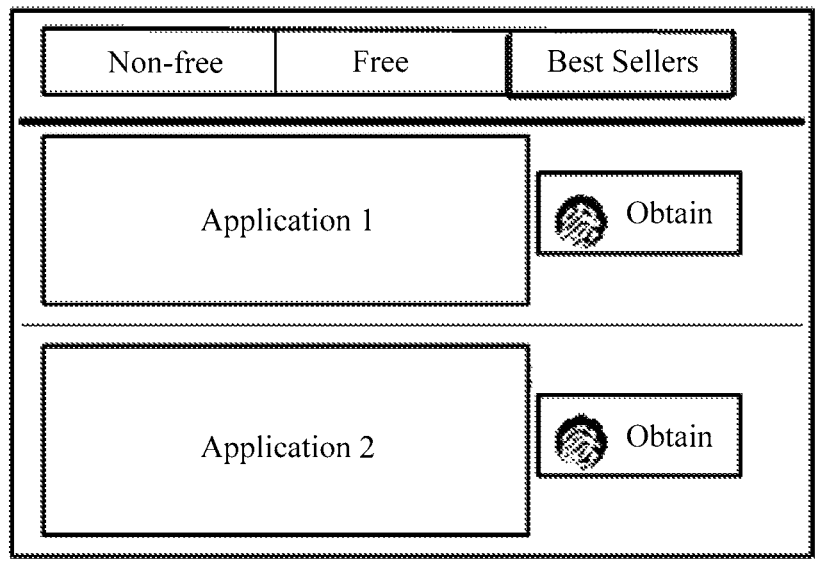
FIG. 5 is a schematic diagram of performing fingerprint recognition in a press-mode fingerprint recognition mode.

FIG. 5 is a schematic diagram of performing fingerprint recognition in the press-mode fingerprint recognition mode in the first display area including a UI widget by the electronic device 300.

As shown in FIG. 5, an application list is displayed in an application store (app store), and the user may view information about a non-free application. When the user decides to buy an application, the user may tap an Obtain button.

Herein the fingerprint recognition mode in the first display area including the Obtain button may be set to the press mode.

Optionally, when the touchscreen 304 detects that the user taps the Obtain button on the touchscreen 304, the touchscreen 304 notifies the processor 302 that a user input is detected. The processor 302 instructs the fingerprint recognition sensor 303 to enable a fingerprint recognition function in the first display area including the Obtain button (for example, a display area in a block including the Obtain button in FIG. 5).

When a finger of the user touches the touchscreen 304, the fingerprint recognition sensor 303 captures a user fingerprint according to the press-mode fingerprint recognition mode set by the processor 302, and sends the captured user fingerprint to the processor 302. The processor 302 performs user identity authentication according to the user fingerprint captured by the fingerprint recognition sensor 303. After the user fingerprint is authenticated successfully (for example, the fingerprint captured by the fingerprint recognition sensor 303 matches the fingerprint template successfully), the user is authorized to download and use the application.

In this way, when the user taps the Obtain button, fingerprint recognition may be performed. This avoids repeated steps in which the user first presses the Obtain button and then the user is prompted that fingerprint recognition is to be performed. Therefore, the user operation is simplified.

Figure 6:
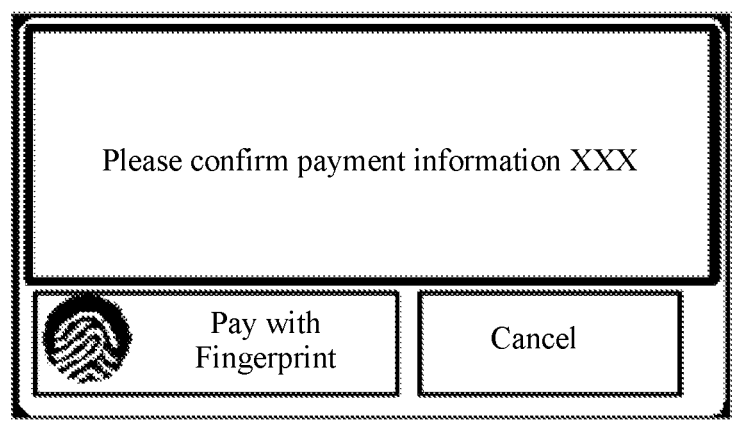
FIG. 6 is another schematic diagram of performing fingerprint recognition in a press-mode fingerprint recognition mode.

FIG. 6 is a schematic diagram of performing fingerprint recognition in the press-mode fingerprint recognition mode in the first display area including a UI widget by the electronic device 300.

If identity authentication is required in a process of performing payment, transfer, or commodity browse by the user, the fingerprint recognition mode in the first display area (for example, a circular area that uses a circular area of a displayed fingerprint in FIG. 6 as a center and whose radius is greater than a radius of the circular area, or is a display area in a block including a Pay with Fingerprint button) including a Confirm button (such as "Pay with Fingerprint" in FIG. 6) may be set to the press mode, and a fingerprint corresponding to a user input is recognized in the first display area according to the press-mode fingerprint recognition mode. For a specific implementation, refer to the implementation shown in FIG. 5.

In addition, in the first display area in which fingerprint recognition is configured, a prompt effect may be added to prompt the user that the fingerprint recognition function is already enabled the area, and prompt the user that fingerprint recognition will be performed when a button is pressed in the first display area.

Further, the user may also be prompted of the fingerprint recognition mode in the first display area, so that the user uses the corresponding mode to perform an operation.

For example, for the press-mode fingerprint recognition mode, the user may keep a press state in the first display area for some time; for the swipe-mode fingerprint recognition mode, the user may slide a finger continuously in the first display area.

Because a fingerprint recognition process needs to take some time, a prompt effect may be further added to prompt the user with progress of fingerprint recognition. This may prevent a finger of the user from leaving the first display area too early in a process of capturing the user fingerprint by the fingerprint recognition sensor 303, or prevent the user from sliding a finger in the first display area when fingerprint recognition is performed in the press-mode fingerprint recognition mode; otherwise, work of the fingerprint recognition sensor 303 is affected.

Optionally, in step S405 and step S406, in a process of recognizing the fingerprint corresponding to the first input, the electronic device 300 may prompt the user with progress of fingerprint recognition.

Figure 7:
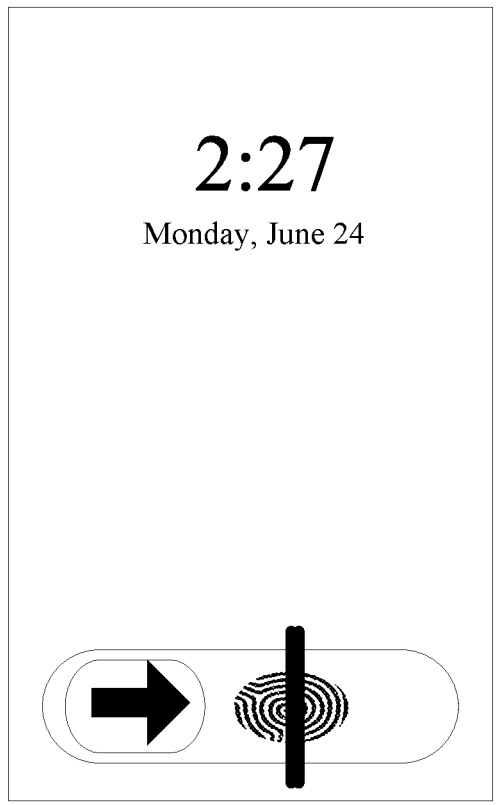
FIG. 7 is a schematic diagram of an unlocking interface.

Referring to an unlocking interface shown in FIG. 7, a current implementation is generally: the user slides a UI widget on the unlocking interface, and slides for a distance from a fixed start position to an end position. If the whole process is completed successfully, it is considered that system unlocking is successful.

Because an area and a path in which the user slides a finger are fixed in the unlocking process, the fingerprint recognition mode in the first display area including any position in the path that the sliding finger of the user needs to pass through may be set to the swipe mode. The fingerprint recognition function may be enabled in the first display area when the UI widget is loaded, or the fingerprint recognition sensor 303 may be enabled in the first display area after it is detected that the finger of the user touches the screen.

A flag indicating that fingerprint recognition ends is: the finger of the user slides and swipes across the first display area, or user fingerprint recognition is completed in the swipe mode.

Fingerprint recognition is performed in the first display area including the area that the foregoing sliding block slides through. Therefore, fingerprint recognition may be completed in the process of operating the sliding block by the user, and the user operation is simplified.

In addition, fingerprint recognition may be performed before some setting options are enabled, for example, in a system setting menu. User identity authentication is performed according to a fingerprint recognition result. The fingerprint recognition mode in the first display area in which switches used to enable or disable some functions are located may be set to the press mode or the swipe mode.

Optionally, before the first input of the user in the first display area is detected in step S403, the fingerprint recognition function is enabled only in the first display area, and the fingerprint recognition function is kept disabled in areas different from the first display area.

Optionally, after step S405 and step S406, a process of user identity authentication may be further included. For example, for screen unlocking, user identity authentication may be performed according to a combination of fingerprint recognition and graphical unlocking.

For example, it is determined that user identity authentication is successful only when the recognized fingerprint is authenticated successfully (for example, the user fingerprint captured by the fingerprint recognition sensor 303 matches the prestored fingerprint template) and graphical unlocking is successful.

Optionally, user identity authentication may also be performed only based on fingerprint recognition. For example, when the recognized fingerprint is authenticated successfully, it is determined that user identity authentication is successful.

Optionally, user identity authentication may also be performed only based on graphical unlocking. When graphical unlocking is successful, it is determined that user identity authentication is successful.

Optionally, after the fingerprint corresponding to the first input is recognized in step S405 and/or step S406, the fingerprint recognition function is disabled in the first display area.

If it is determined that the first fingerprint recognition mode is the swipe mode in step S404, after the first input of the user in the first display area is detected in step S403, the method may further include the following steps:

determining a second display area according to the first input;

determining, according to the first input, that a fingerprint recognition mode in the second display area is a second fingerprint recognition mode, where the second fingerprint recognition mode is the swipe mode or the press mode;

detecting a second input of the user in the second display area; and determining the second fingerprint recognition mode, and if the second fingerprint recognition mode is the swipe mode, obtaining, by the fingerprint recognition sensor 303 according to the swipe mode, a fingerprint corresponding to the second input in the second display area, or if the second fingerprint recognition mode is the press mode, obtaining, by the fingerprint recognition sensor 303 according to the press mode, a fingerprint corresponding to the second input in the second display area.

Multiple optional manners including but not limited to the following manners may be used to determine the second display area.

Manner 1

At least one first track may be predicted according to the first input, and a display area that the at least one first track passes through is used as the second display area.

For example, the processor 302 of the electronic device 300 may predict the at least one first track according to at least one of the following track prediction reference information:

habit information recorded by the memory 301 about operations performed by the user of the electronic device 300 on the electronic device 300, for example, a moving speed of the finger when the user performs an operation on a UI widget, a moving distance of the user on a UI widget, duration, or the like;

force of the first input applied to the touchscreen 304;
a moving speed of the first input;
a moving direction of the first input;
duration of the first input;
a direction in which the user holds the terminal; or
a layout of UI widgets in the second display area.

For example, when the force of the first input applied to the touchscreen 304 is greater, a length and a width of the predicted first track are greater. For another example, when the moving speed of the first input is higher, a length of the predicted first track is greater.

For another example, when the duration of the first input is longer, a length of the predicted first track is greater. For another example, the predicted first track is located in a UI widget in the second display area, or the predicted first track points to a UI widget in the second display area. For another example, a direction that the predicted first track points to is consistent with the moving direction of the first input.

Manner 2

The second display area may be determined directly according to at least one of the foregoing track prediction reference information in the manner 1, and the first track does not need to be predicted first.

Using unlocking points as an example, the following describes an optional procedure for setting a fingerprint recognition mode in a display area, detecting a user input in the display area, performing fingerprint recognition, and performing user identity authentication by the electronic device 300.

The first display area includes an area including at least two unlocking points. The at least two unlocking points are unlocking points of a same UI widget (for example, nine unlocking points in a 9-point pattern lock shown in FIG. 2). The fingerprint recognition mode in the first display area is the press mode. The at least two unlocking points may be all unlocking points of the same UI widget (for example, the 9-point pattern lock).

Figure 8:
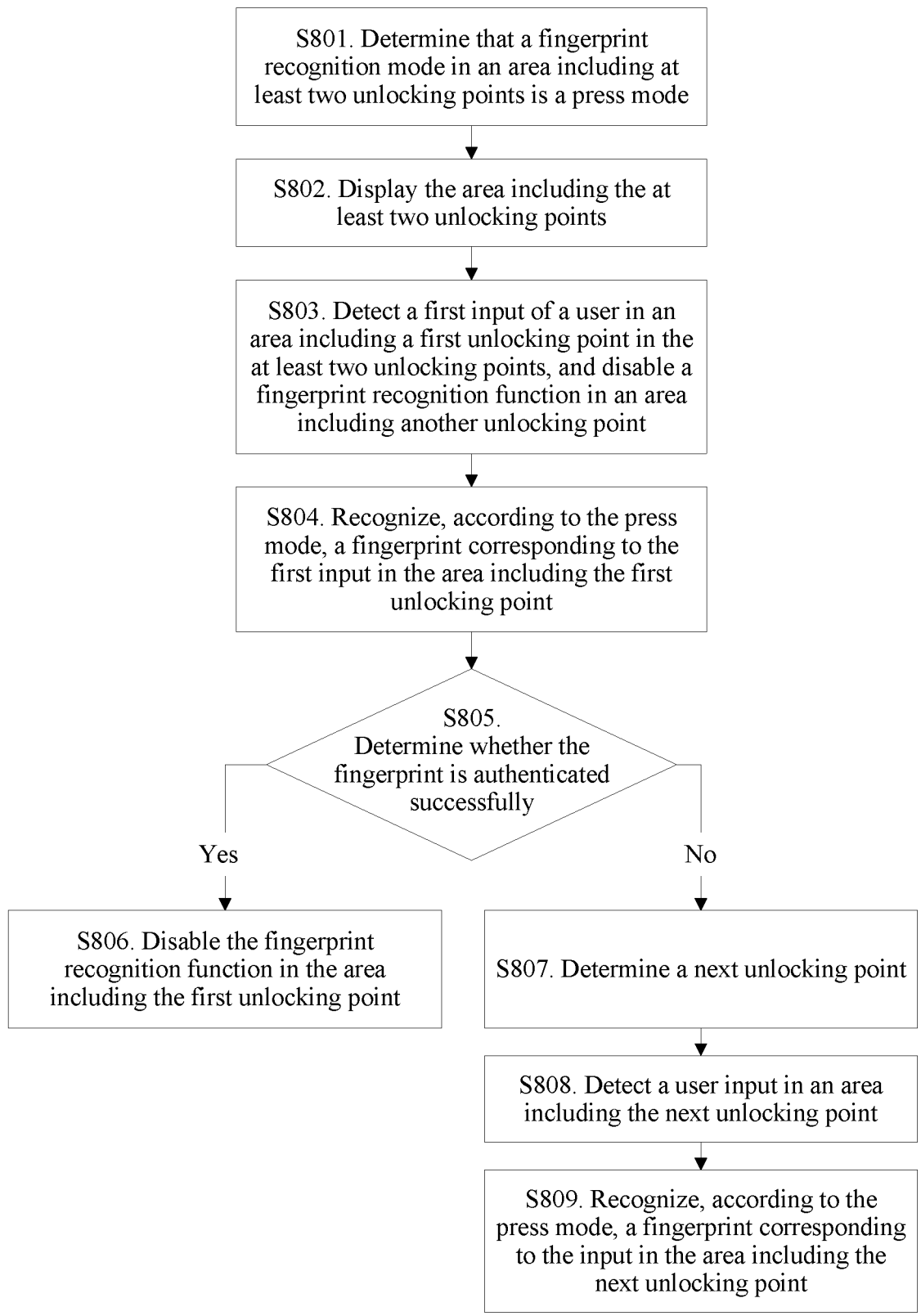
FIG. 8 is a flowchart of another fingerprint recognition procedure according to Embodiment 2 of the present invention.

Referring to FIG. 8, the procedure includes the following steps.

S801. Determine that a fingerprint recognition mode in an area including the at least two unlocking points is the press mode.

Optionally, by invoking the fingerprint recognition program 301b, the processor 302 of the electronic device 300 determines that the fingerprint recognition mode in the area including the at least two unlocking points is the press mode.

S802. Control the touchscreen 304 to display the area including the at least two unlocking points.

Optionally, by invoking the display program 301a, the processor 302 of the electronic device 300 controls the touchscreen 304 to display the area including the at least two unlocking points.

S803. Detect the first input of the user in an area including a first unlocking point in the at least two unlocking points, and disable the fingerprint recognition function in an area including another unlocking point (the another unlocking point is an unlocking point different from the first unlocking point in the at least two unlocking points).

Optionally, the touchscreen 304 of the electronic device 300 detects the first input of the user in the area including the first unlocking point in the at least two unlocking points, and the processor 302 of the electronic device 300 controls the fingerprint recognition sensor 303 to disable the fingerprint recognition function in the area including the another unlocking point.

S804. The fingerprint recognition sensor 303 of the electronic device 300 recognizes, according to the press mode, the fingerprint corresponding to the first input in the area including the first unlocking point.

Optionally, by invoking the fingerprint recognition program 301b, the processor 302 of the electronic device 300 controls the fingerprint recognition sensor 303 to recognize, according to the press mode, the fingerprint corresponding to the first input in the area including the first unlocking point.

S805. Determine whether the fingerprint recognized in step S804 is recognized successfully, and if the recognition is successful, perform step S806, or if the recognition fails, perform step S807 to step S809.

S806. Disable the fingerprint recognition function in the area including the first unlocking point.

Optionally, the processor 302 of the electronic device 300 controls the fingerprint recognition sensor 303 to disable the fingerprint recognition function in the area including the first unlocking point.

S807. Determine a next unlocking point after the first unlocking point according to a set unlocking sequence of the at least two unlocking points.

Optionally, the processor 302 determines the next unlocking point after the first unlocking point according to the set unlocking sequence of the at least two unlocking points.

S808. The touchscreen 304 of the electronic device 300 detects a user input in an area including the next unlocking point.

S809. The fingerprint recognition sensor 303 of the electronic device 300 recognizes, according to the press mode, a fingerprint corresponding to the input in the area including the next unlocking point.

Alternatively, after determining that authentication of the fingerprint is not successful in step S805, the electronic device 300 does not perform step S807 to step S809, but performs the following steps, or first performs the following steps and then performs step S807 to step S809:

the touchscreen 304 detects a third input of the user in a third display area, where the third display area includes an area including a path from the first unlocking point to at least one unlocking point in the at least two unlocking points;

set a fingerprint mode in the third display area to the swipe mode; and the fingerprint recognition sensor 303 recognizes, according to the swipe mode, a fingerprint corresponding to the third input in the third display area.

Embodiment 2 describes the fingerprint recognition procedure provided by this embodiment of the present invention. In this procedure, first, the fingerprint recognition mode in the display area is determined, and then the fingerprint corresponding to the user input is recognized in the display area according to the determined fingerprint recognition mode. Therefore, objectives of flexibly setting the fingerprint recognition mode and performing fingerprint recognition are achieved.

In Embodiment 2, after it is determined that the first fingerprint recognition mode is the swipe mode in step S404, an optional procedure may be determining a fingerprint recognition mode in a next display area and the fingerprint recognition mode in the next display area according to an input in a display area. Therefore, an objective of flexibly implementing a subsequent fingerprint recognition process according to a previous input is achieved.

Embodiment 2 provides optional manners of setting the fingerprint recognition mode, specific implementation solutions used when different operating systems perform fingerprint recognition, optional solutions to prompting the user that the fingerprint recognition function is enabled, optional solutions to prompting the user with progress of fingerprint recognition, and optional processes of user identity authentication with reference to fingerprint recognition. These are also applicable to other embodiments of the present invention.

Embodiment 3

In Embodiment 3, an Android system (hereinafter referred to as "the system") is used as an example, and a fingerprint recognition mode is determined according to configuration description information of a UI widget. In the following description, each step performed by the system is actually performed by a processor 302 by invoking an operating system stored in a memory 301.

Figure 9:
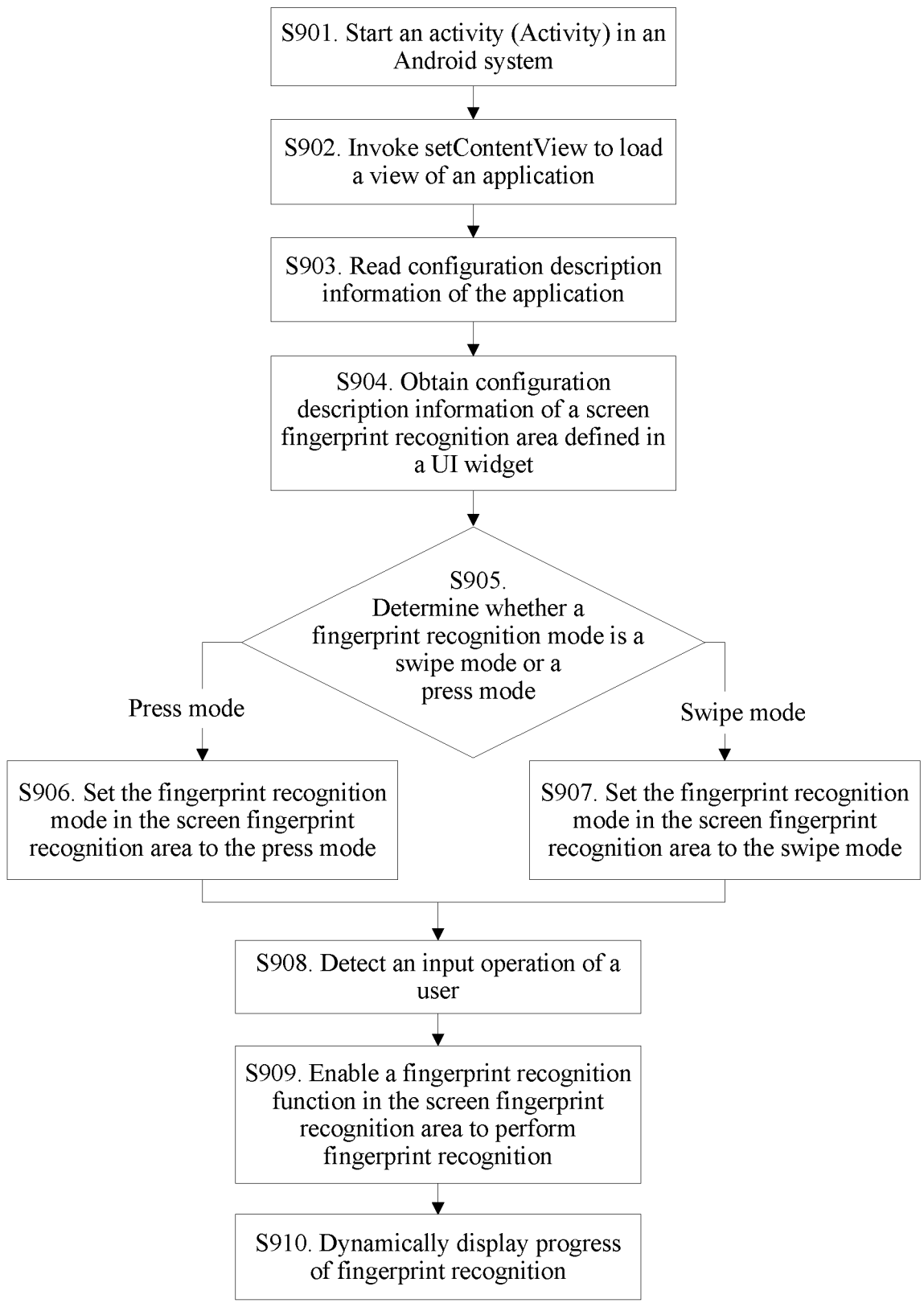
FIG. 9 is a flowchart of a fingerprint recognition procedure according to Embodiment 3 of the present invention.

As shown in FIG. 9, a fingerprint recognition procedure provided by Embodiment 3 includes the following steps.

S901. A system starts an application, and creates a new activity (activity) object of the application; and the system starts loading an application data file.

S902. The system invokes a setContentView method in an onCreate method of the application to load a current page or view of the application.

S903. The system reads configuration description information of the application.

The configuration description information includes a definition of a UI widget in the current view or page about the application. The definition of the UI widget may include a definition and description used for displaying a UI, and may further include configuration description information of a screen fingerprint recognition area (namely, the foregoing "display area", where the "screen fingerprint recognition area" in all other parts of this embodiment of the present invention indicates a display area on a touchscreen 304, and a fingerprint recognition function may be enabled in the display area) associated with the UI.

S904. The system obtains configuration description information of a screen fingerprint recognition area defined in a UI widget.

The configuration description information may include:
information such as a fingerprint recognition mode (a swipe mode or a press mode) in the screen fingerprint recognition area, a position in which a UI widget applying fingerprint recognition is located on the touchscreen 304, a size of the screen fingerprint recognition area for performing fingerprint recognition, a relative position relationship between the screen fingerprint recognition area using fingerprint recognition and other adjacent UI widgets, a threshold used for biological feature recognition, and whether the fingerprint recognition function is enabled in the screen fingerprint recognition area.

Using a button as an example, a button that a user needs to use for confirmation has an additional fingerprint recognition function on the touchscreen 304. When the user taps the button to complete confirmation, press-mode fingerprint recognition may be performed in a display area including the button, and whether the user is authorized to perform an operation is authenticated according to a fingerprint recognition result. The fingerprint recognition mode in the screen fingerprint recognition area included in the configuration description information matches the operation on the UI widget included in the screen fingerprint recognition area.

For example, when a UI widget having the fingerprint recognition function is defined, when a position in which the UI widget is located on the touchscreen 304 is defined, a position in which a screen fingerprint recognition area associated with the UI widget is located may be defined. It may be defined that the screen fingerprint recognition area is located in the position of the associated UI widget and coincides with the position of the UI widget; or it is defined that the screen fingerprint recognition area is located near the UI widget.

Alternatively, coverage of the UI widget on the touchscreen 304 includes coverage of the screen fingerprint recognition area, and screen coverage of the UI widget on the touchscreen 304 partly overlaps coverage of the screen fingerprint recognition area, or coverage of the UI widget on the touchscreen 304 is smaller than the screen fingerprint recognition area, or the like.

When the position in which the screen fingerprint recognition area is located is defined, the position may be defined as a relative position relationship with the UI widget, and the UI widget is marked as having the fingerprint recognition function. According to the position in which the UI widget is located on the touchscreen 304, the system automatically sets the position in which the screen fingerprint recognition area is located. A size and shape of the screen fingerprint recognition area may be the same as or different from a size and shape of coverage of the UI widget on the touchscreen 304.

If the position in which the screen fingerprint recognition area is located is defined as a position relative to the UI widget, when a user operation causes the position, shape, and/or size of the UI widget to change, the position, shape, and/or size of the corresponding screen fingerprint recognition area may also change correspondingly, so as to keep a relative relationship between the sizes, shapes, and positions of the screen fingerprint recognition area and the UI widget unchanged.

The configuration description information may further include a template match threshold (used to measure a similarity between a captured user fingerprint and a fingerprint template) and an attempt quantity threshold (for example, it is determined that user identity authentication fails if fingerprint authentication fails for a specific quantity of times) when fingerprint recognition is performed in the screen fingerprint recognition area.

For example, if the UI widget included in the screen fingerprint recognition area is related to payment, the template match threshold may be set to a larger numeric value. In this case, it is determined that the recognized fingerprint is authenticated successfully only when the captured user fingerprint is highly similar to the fingerprint template.

In addition, the attempt quantity threshold may be set to a small numeric value. When the UI widget included in the screen fingerprint recognition area is related to payment, the user is provided with a small quantity of fingerprint authentication times.

In the configuration description information, whether the fingerprint recognition function is in an enabled state in the screen fingerprint recognition area when the page of the UI widget included is loaded may also be set.

For a swipe-mode UI widget, for example, a progress bar, a list view, a knob, a sliding switch, or a sliding block, a fingerprint recognition mode in a screen fingerprint recognition area including the UI widget may be defined as the swipe mode in the configuration description information.

S905. The system determines whether a fingerprint recognition mode in the screen fingerprint recognition area defined in the configuration description information is a press mode or a swipe mode, and if the mode is defined as the press mode, performs step S906, or if the mode is defined as the swipe mode, performs step S907.

S906. The system sets the fingerprint recognition mode in the screen fingerprint recognition area to the press mode.

S907. The system sets the fingerprint recognition mode in the screen fingerprint recognition area to the swipe mode.

S908. A touchscreen 304 detects an input operation of a user in the screen fingerprint recognition area.

S909. When the input operation is detected in step S908, the system controls a fingerprint recognition sensor 303 to enable a fingerprint recognition function in the screen fingerprint recognition area to perform fingerprint recognition.

S910. The system may invoke a display program 301a to dynamically display progress of fingerprint recognition in the fingerprint recognition process in step S909.

Embodiment 3 provides an optional procedure for performing fingerprint recognition by the electronic device 300 using the Android system. In Embodiment 3, in addition to concepts related to the Android system, other concepts and procedures are also applicable to an electronic device 300 using another operating system.

In Embodiment 3, when the user performs an operation on a UI widget, a position and/or a direction in which the UI widget receives the input operation of the user are/is definite. When the user performs the operation on the UI widget, the position pressed by the user is definite, or a sliding direction is definite and is a fixed path. Therefore, the input operation may be considered as a static UI operation, and the UI widget may be considered as a static UI widget.

However, for some slide operations of the user on the touchscreen 304, before the user performs an operation on a UI widget, a sliding direction of the input operation of the user may not be determined in advance, but the sliding direction may be determined in the user operation process. Therefore, the input operation may be considered as a dynamic UI operation, and the UI widget may be considered as a dynamic UI widget.

In Embodiment 4 described hereinafter, for the dynamic UI widget, the electronic device 300 may set the swipe-mode fingerprint recognition mode, and determine the screen fingerprint recognition area dynamically according to the sliding direction of the input operation of the user on the touchscreen 304. The dynamic UI widget may include sliding to unlock, a 9-point pattern lock, or the like in the Android system.

Embodiment 4

Figure 10A:
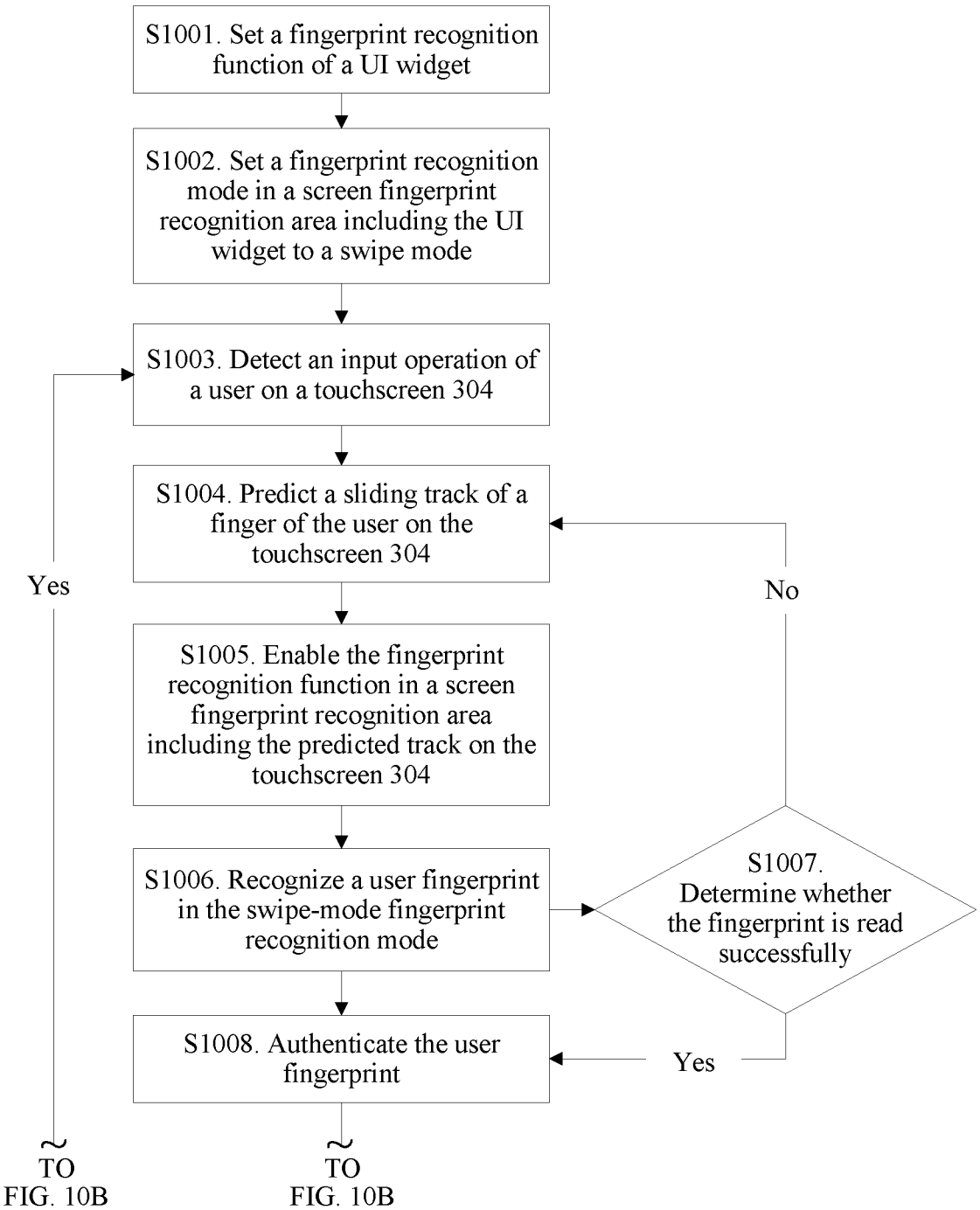
FIG. 10A and FIG. 10B are a flowchart of a fingerprint recognition procedure according to Embodiment 4 of the present invention.
Figure 10B:
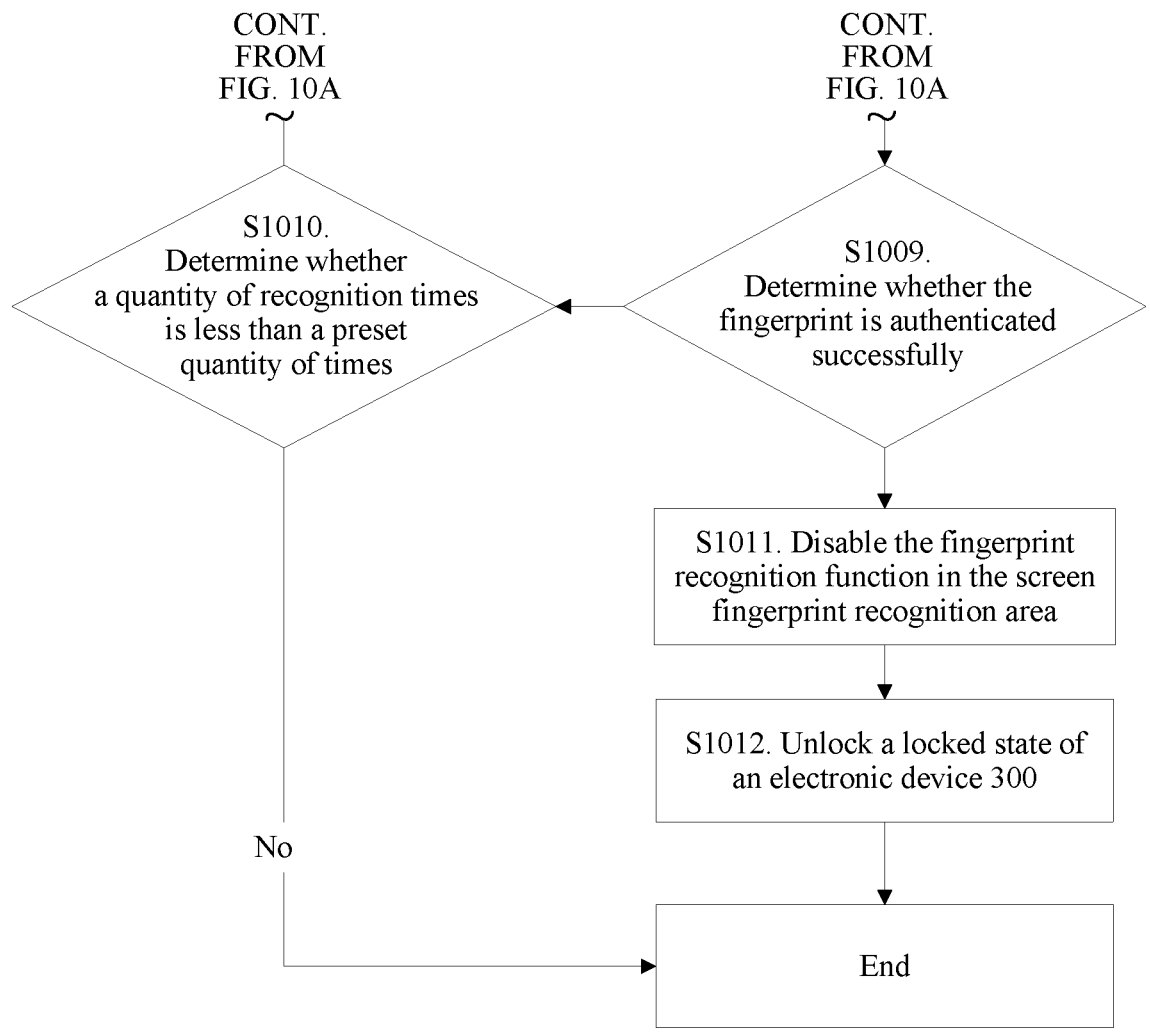

As shown in FIG. 10A and FIG. 10B, a fingerprint recognition procedure provided by Embodiment 4 includes the following steps.

S1001. Set a fingerprint recognition function of a UI widget, and enable the fingerprint recognition function in a screen fingerprint recognition area including the UI widget on a touchscreen 304.

Optionally, a processor 302 of an electronic device 300 sets the fingerprint recognition function of the UI widget by invoking a fingerprint recognition program 301b, and enables the fingerprint recognition function in the screen fingerprint recognition area including the UI widget on the touchscreen 304.

S1002. Because the UI widget is the foregoing dynamic UI widget, and in a position touched by a finger of a user on the touchscreen 304, a sliding direction of an input operation of the user is not determined, set a fingerprint recognition mode in the screen fingerprint recognition area including the UI widget to a swipe mode.

S1003. The touchscreen 304 detects the input operation of the user on the touchscreen 304.

Optionally, after detecting the input operation, the touchscreen 304 sends generated information about the input operation to the processor 302.

S1004. Predict a sliding track of the finger of the user on the touchscreen 304.

Optionally, after receiving the information about the input operation that is sent by the touchscreen 304, the processor 302 predicts the sliding track of the finger of the user on the touchscreen 304 according to the received information about the input operation.

Optionally, the processor 302 may predict a sliding distance and a possible track according to a sliding speed and direction after the user touches the UI widget and according to the sliding speed and direction of the finger of the user, and enable the fingerprint recognition function in the screen fingerprint recognition area that the finger possibly slides to on the touchscreen 304.

Optionally, the fingerprint recognition mode in the screen fingerprint recognition area may be set to the swipe mode or a press mode.

The predicted track may be a line segment in the sliding direction of the finger and having a width. A length of the line segment is related to the sliding speed. Within a same touch time, if the sliding speed is higher, the sliding track is longer, and the line segment is longer. The width may be related to a scope of the screen touched by the finger, and if a touched area is greater, the width is greater. The width may also be related to the sliding speed of the finger. If the sliding speed is higher, the width is set to a larger value. A direction of the line segment may be a direction of a tangent line of a last sliding track before the finger leaves the screen.

The predicted track may also be in another shape, for example, a circle or a rectangle enclosing a touch point currently touched on the touchscreen 304 by the finger of the user, so as to ensure that the screen fingerprint recognition area can be touched when the finger of the user slides in any direction in a current position. A size of a shape of the screen fingerprint recognition area may be related to the sliding speed of the finger of the user, and may be predefined in configuration description information, or may be determined by the system in an execution process according to configuration description information.

Optionally, the method for predicting the first track in Embodiment 1 may be used to predict the sliding track of the finger of the user. For example, the processor 302 predicts the track according to at least one of the following track prediction reference information:

habit information recorded by a memory 301 about operations performed by the user of the electronic device 300 on the terminal, for example, a moving speed of the finger when the user performs an operation on a UI widget, a moving distance of the user on a UI widget, duration, or the like;

force of the input detected in step S1003, applied to the touchscreen 304;

a moving speed of the input;

a moving direction of the input;

duration of the input;

a direction in which the user holds the terminal; or a layout of UI widgets in a second display area.

For example, when the force of the input applied to the touchscreen 304 is greater, the length and width of the predicted track are greater.

For another example, when the moving speed of the input is higher, the length of the predicted track is greater.

For another example, when the duration of the input is longer, the length of the predicted track is greater.

For another example, the predicted track is located within a UI widget in a display area.

Alternatively, the predicted track points to a UI widget in a display area. For example, a direction that the predicted track points to is consistent with the moving direction of the input.

S1005. A fingerprint recognition sensor 303 enables the fingerprint recognition function in a screen fingerprint recognition area including the predicted track on the touchscreen 304.

Optionally, the processor 302 controls the fingerprint recognition sensor 303 to enable the fingerprint recognition function in the screen fingerprint recognition area including the predicted track on the touchscreen 304.

Alternatively, in step S1004, the processor 302 may directly determine, according to at least one of the foregoing track prediction reference information, the screen fingerprint recognition area in which the fingerprint recognition function needs to be enabled, without first predicting the track and then using the predicted estimated display area as the screen fingerprint recognition area.

The fingerprint recognition function may be enabled, according to the length of the line segment of the predicted track, in the screen fingerprint recognition area including the line segment. Optionally, the fingerprint recognition mode in the screen fingerprint recognition area may be defined in the configuration description information of the UI widget.

Because the UI widget is a dynamic UI widget, the screen fingerprint recognition area needs to be determined according to the predicted track. The configuration description information may not include a specific definition of the screen fingerprint recognition area, and the screen fingerprint recognition area is determined only when the user performs the input operation; or multiple screen fingerprint recognition areas are predefined in the configuration description information, and when the user performs the input operation, one of the multiple predefined screen fingerprint recognition areas is selected as an actual screen fingerprint recognition area.

S1006. When the user slides the finger to the screen fingerprint recognition area, time setting may be enabled according to a position of the screen fingerprint recognition area in configuration description information, the screen fingerprint recognition function is enabled in the predefined position, and a user fingerprint is recognized in the swipe-mode fingerprint recognition mode. In step S1006, the fingerprint recognition sensor 303 captures the user fingerprint.

S1007. Determine whether the user fingerprint captured by the fingerprint recognition sensor 303 is read successfully (that is, whether the user fingerprint is complete, and whether valid data is included), and whether the user fingerprint can be used for fingerprint matching; and if yes, perform step S1008, or else, return to step S1004.

S1008. Authenticate the user fingerprint, and match the captured user fingerprint with a prestored fingerprint template.

S1009. Determine a matching result, and if the matching is successful, perform step S1011, or else, perform step S1010.

S1010. Determine whether a current quantity of fingerprint identity authentication attempts is less than a preset allowed quantity of times of incorrect fingerprint matching, and if yes, return to step S1003, or else, end the whole fingerprint recognition procedure.

In addition, additional security measures may be taken. For example, other unlocking modes are provided for the user; or the electronic device 300 is locked for preset duration, and within the preset duration, the user is not allowed to perform fingerprint recognition and other unlocking operations.

S1011. Disable the fingerprint recognition function in the screen fingerprint recognition area.

S1012. Unlock a locked state of an electronic device 300. The procedure ends.

The following is a specific example of fingerprint recognition implemented by using Embodiment 4. For an effect of the implementation thereof, refer to FIG. 11. Referring to a left figure in FIG. 11, in this case, the electronic device 300 is in the locked state. The swipe-mode fingerprint recognition mode is set in a screen fingerprint recognition area including a UI widget used for unlocking.

Figure 11:
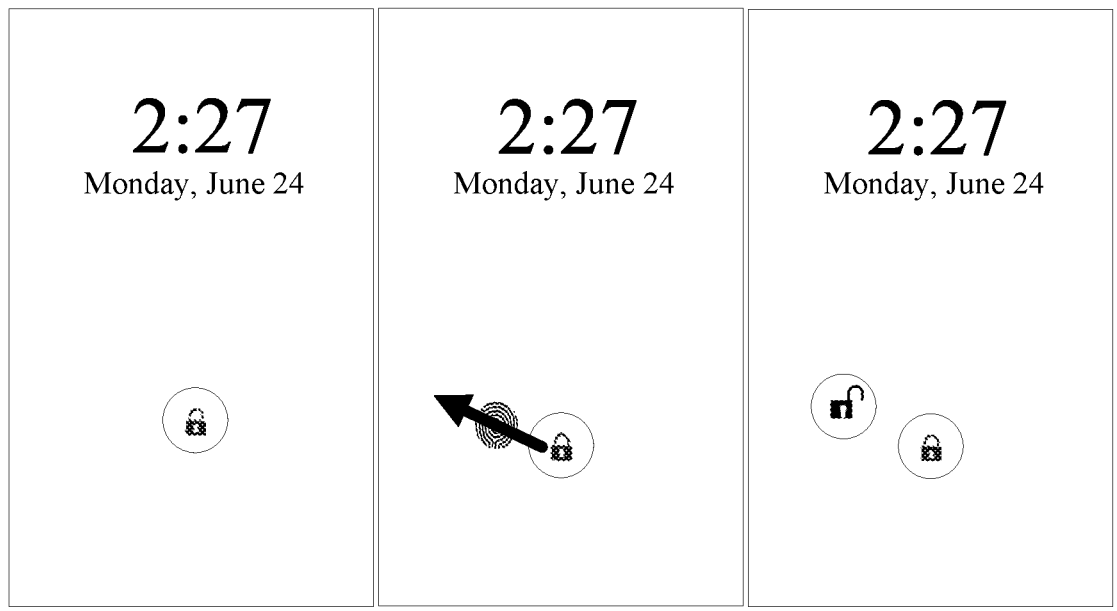
FIG. 11 is an effect diagram of implementing fingerprint recognition according to Embodiment 4 of the present invention.

Referring to a middle figure in FIG. 11, when it is detected that a finger of the user touches the UI widget on the touchscreen 304, a sliding direction of the finger of the user is determined, and a sliding track of the finger of the user is predicted. In a screen fingerprint recognition area including the sliding track, the swipe-mode fingerprint recognition mode is set, and the fingerprint recognition function is enabled in the screen fingerprint recognition area.

A user fingerprint is captured in a sliding process of the finger of the user in the screen fingerprint recognition area, and the captured user fingerprint is matched with the prestored fingerprint template.

If the matching is successful, the system is unlocked (referring to a right figure in FIG. 11). If a user fingerprint fails to be captured, track prediction may be performed again when the user continues to slide the finger. The fingerprint recognition function is enabled in a screen fingerprint recognition area including a re-predicted track, and a user fingerprint is recognized in the swipe-mode fingerprint recognition mode.

Track prediction may be performed for multiple times in the sliding process of the finger of the user to capture a user fingerprint for multiple times and attempt to perform user fingerprint matching. If the matching is successful, the electronic device 300 may be unlocked, and the fingerprint recognition procedure ends.

Considering that the fingerprint matching may fail for multiple times, the foregoing fingerprint identity attempt quantity threshold may be set.

A fingerprint may not be recognized in the fingerprint recognition process of the user. Setting the fingerprint identity attempt quantity threshold may provide an opportunity for the user to perform fingerprint recognition for multiple times.

If a quantity of fingerprint identity authentication attempts reaches the threshold but user identity authentication still cannot be completed, other unlocking modes may be provided for the user.

For example, the user is required to enter a password, a personal identification number (Personal Identification Number, PIN), or the like; or the electronic device 300 is locked for preset duration, and within the preset duration, the user is not allowed to perform fingerprint recognition and other unlocking operations.

The following is another specific example of fingerprint recognition implemented by using Embodiment 4. For an effect of the implementation thereof, refer to FIG. 12.

Figure 12:
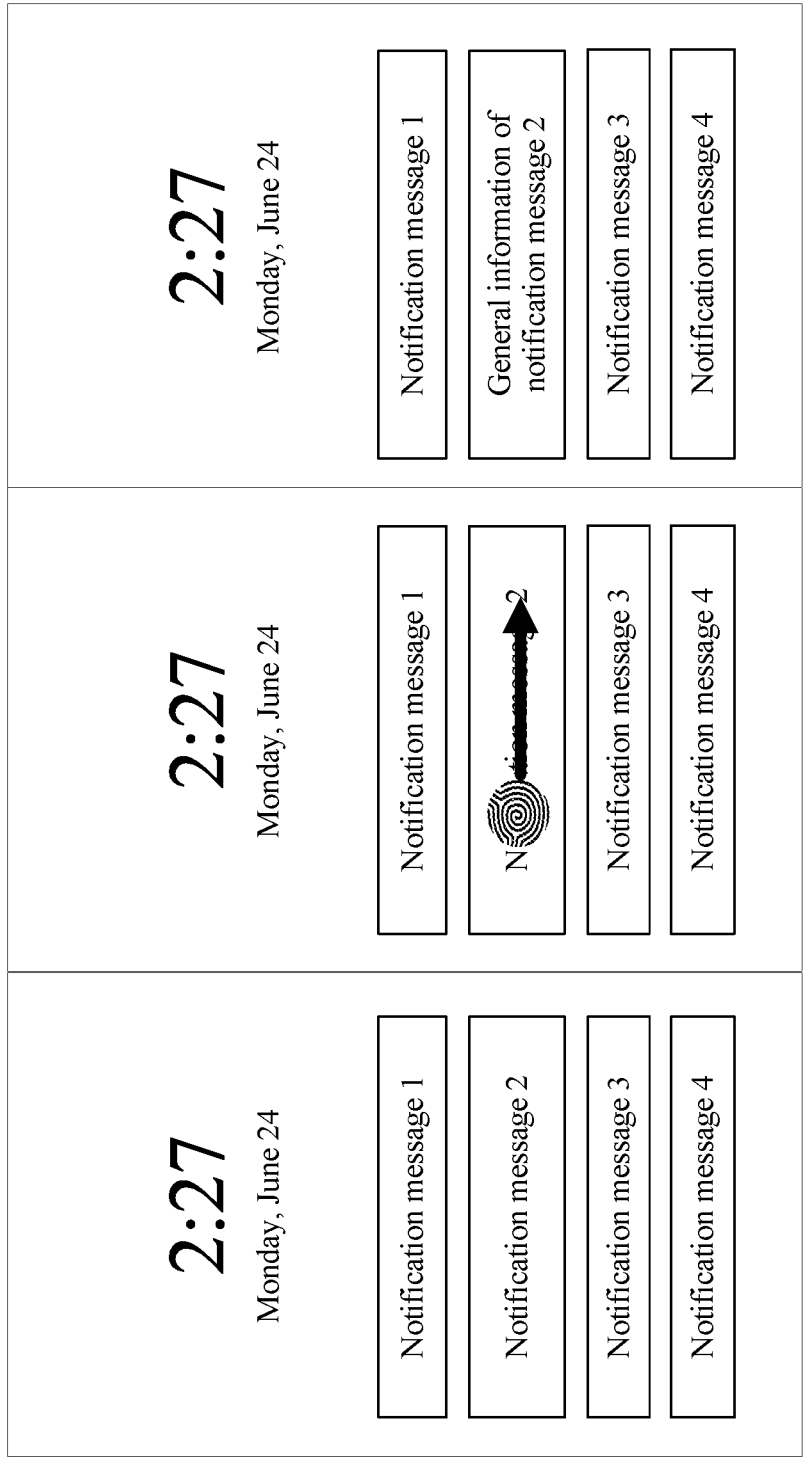
FIG. 12 is another effect diagram of implementing fingerprint recognition according to Embodiment 4 of the present invention.

FIG. 12 shows a screen locking interface including notification messages. When receiving the notification messages, the electronic device 300 displays the notification messages on the screen locking interface in sequence. Herein a notification message 1, a notification message 2, a notification message 3, and a notification message 4 are illustrated.

If the user presets to display only the notifications when the electronic device 300 is not unlocked, general information of the notifications is not displayed (as shown in a left figure in FIG. 12).

For example, "receive a new message", "unlock to view the new message", "a new message sent by somebody", and "receive a new message of an XX application" are displayed.

Optionally, the messages may be further displayed with different display effects such as a frosted glass effect or a mist effect, so that the user cannot see specific content of the notifications when the device is not unlocked.

When seeing the notifications, the user may unlock the electronic device 300 (referring to a middle figure in FIG. 12) by using a fingerprint recognition function provided in a screen fingerprint recognition area. After unlocking, the notifications on the screen locking interface change to general information of the notifications (referring to a right figure in FIG. 12, for example, general information of the notification message 2). In this case, the user may directly view the general information of the notification on the screen locking interface.

Optionally, in a user fingerprint recognition process, the swipe-mode fingerprint recognition mode is used to perform fingerprint recognition. If it is determined that the user identity is authenticated successfully in a sliding process of the finger of the user on the touchscreen 304, specific content of the notification may be displayed gradually in the sliding process of the finger of the user. A gradual change process may reflect a process of transition from displaying the general information of the notification to displaying the specific content of the notification.

For example, there is a change from hiding the notification to clearly displaying the specific content of the notification. Further, an effect such as an effect of wiping the frosted glass or mist may be added, so that the user can finally see the specific content of the notification clearly.

The notification message 2 in FIG. 12 is used as an example.

Assuming that the notification message 2 prompts the user to view a new email, the fingerprint recognition function is enabled in a screen fingerprint recognition area including a UI widget on a notification bar of the notification message 2, and the fingerprint recognition mode is set to the swipe mode. When a position of the UI widget touched by the finger of the user is detected, the fingerprint recognition function is enabled.

A sliding track, speed, and the like of the finger of the user are predicted. The fingerprint recognition function is enabled in a screen fingerprint recognition area including the predicted sliding track, and a user fingerprint is recognized according to the swipe mode.

After the recognized fingerprint is authenticated successfully, the electronic device 300 is unlocked, and the user may view the general information of the notification message 2.

In Embodiment 4 and Embodiment 5, a single fingerprint recognition mode is used to perform fingerprint recognition, that is, either the press-mode fingerprint recognition mode is used, or the swipe-mode fingerprint recognition mode is used. In Embodiment 5 and Embodiment 7, in an input operation process of the user, two fingerprint recognition modes, namely, the press-mode and the swipe-mode, are used to perform fingerprint recognition.

Embodiment 5

A first optional implementation provided by Embodiment 5 includes:

using a press-mode fingerprint recognition mode by default;

if a fingerprint recognized in the press-mode fingerprint recognition mode fails to be authenticated, in a sliding process of a finger of a user on a touchscreen 304, using a swipe-mode fingerprint recognition mode to perform fingerprint recognition; and optionally, in the sliding process of the finger of the user, if the finger pauses or a sliding speed of a mobile phone is reduced gradually, predicting, according to the sliding speed and direction of the finger of the user, a finger pause point at which the speed is reduced to 0, and in a screen fingerprint recognition area including the predicted finger pause point, using the press-mode fingerprint recognition mode to perform fingerprint recognition.

A second optional implementation provided Embodiment 5 is applied to a UI widget including at least one unlocking point, for example, "a 9-point pattern lock" shown in FIG. 2.

An optional implementation of the 9-point pattern lock is: a hash (hash) value of an unlocking pattern is prestored, position and sequence information of unlocking points is not stored, and every time a user connects the unlocking points on a touchscreen 304, whether unlocking is successful is determined according to hash computation. For a hash computation method, refer to a conventional 9-point pattern lock solution. Details are not described herein.

In the second optional implementation, a fingerprint recognition function is enabled in a screen fingerprint recognition area including all possible unlocking points in a next step after a position of a current unlocking point touched by the user.

In a screen fingerprint recognition area including a path between unlocking points, the swipe-mode fingerprint recognition mode is used to perform fingerprint recognition. In a screen fingerprint recognition area including an unlocking point, the press-mode fingerprint recognition mode is used to perform fingerprint recognition.

Figure 13A:
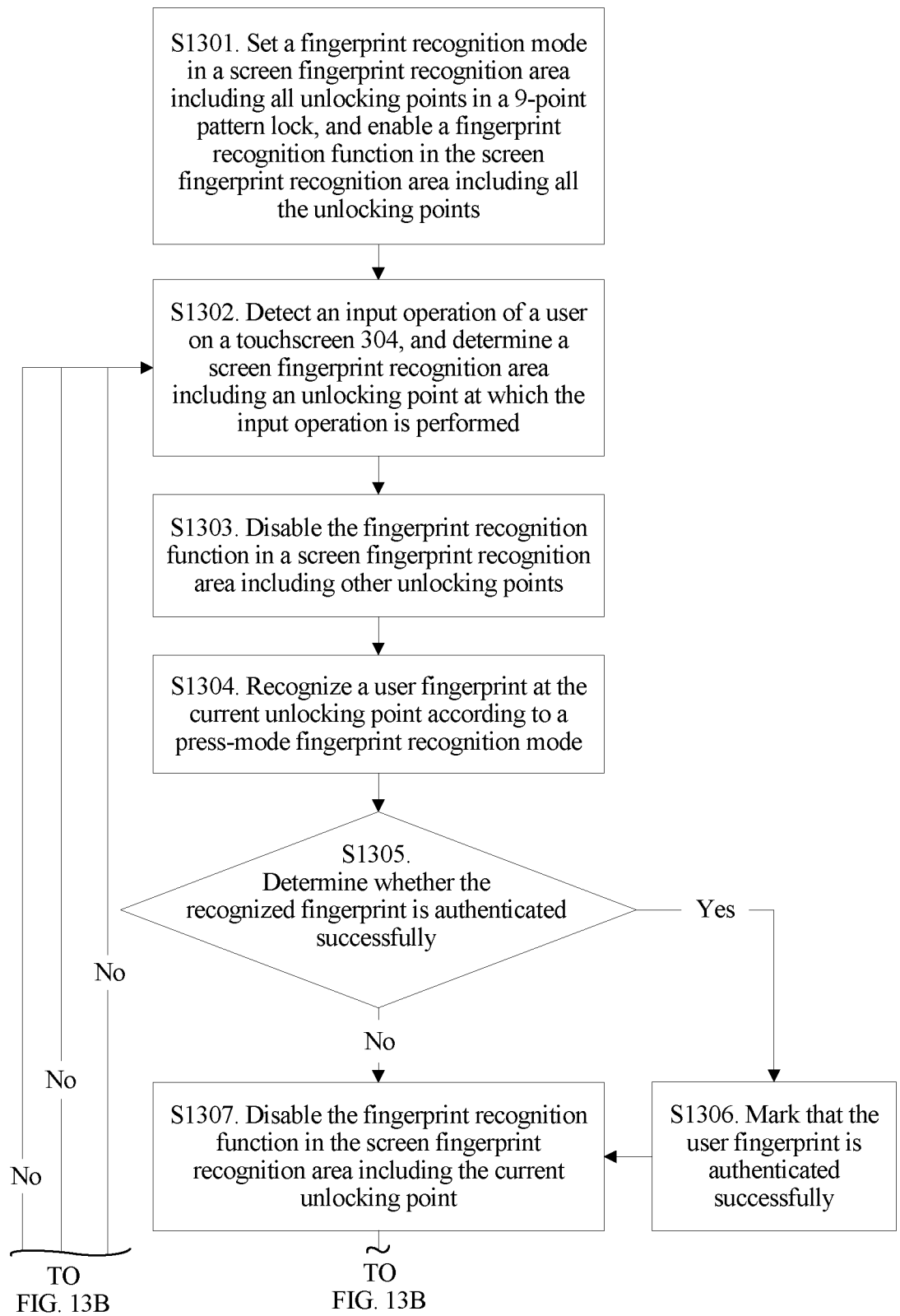
FIG. 13A, FIG. 13B, and FIG. 13C are a flowchart of a fingerprint recognition procedure according to Embodiment 5 of the present invention.
Figure 13B:
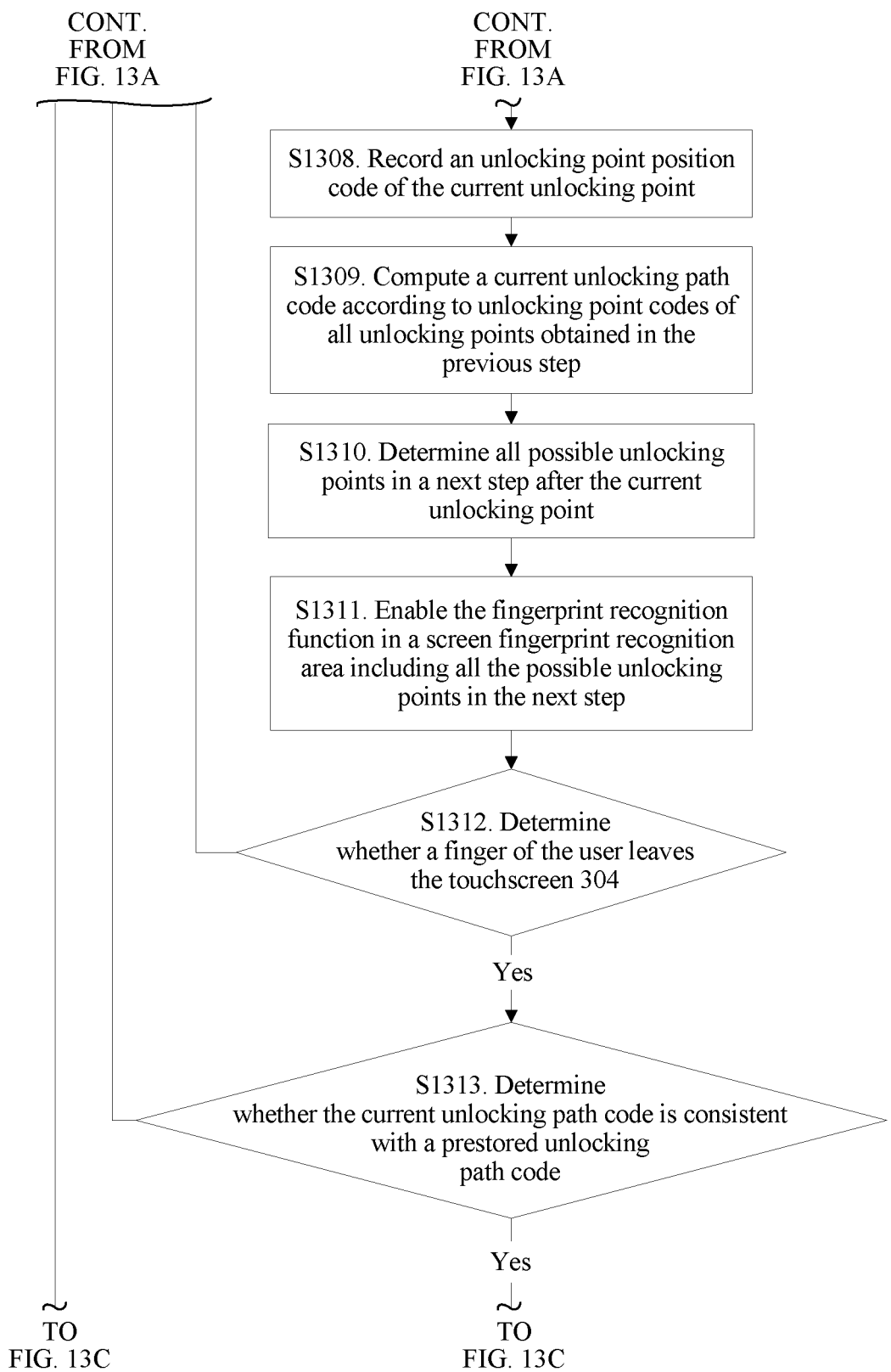
Figure 13C:
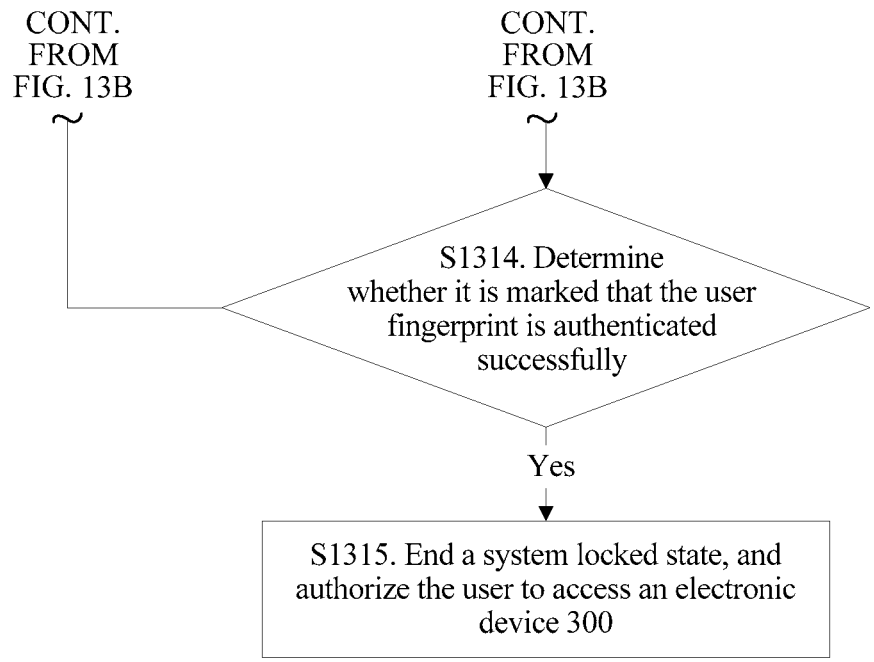

As shown in FIG. 13A, FIG. 13B, and FIG. 13C, an optional procedure of the second optional implementation includes the following steps.

S1301. Set a fingerprint recognition mode in a screen fingerprint recognition area including all unlocking points in a 9-point pattern lock, and enable a fingerprint recognition function in the screen fingerprint recognition area including all the unlocking points.

Optionally, a processor 302 in an electronic device 300 sets the fingerprint recognition mode in the screen fingerprint recognition area including all the unlocking points in the 9-point pattern lock, and controls a fingerprint recognition sensor 303 to enable the fingerprint recognition function in the screen fingerprint recognition area including all the unlocking points.

Herein a screen fingerprint recognition area including an unlocking point may be a circular display area using the unlocking point as a center on a touchscreen 304.

S1302. A touchscreen 304 detects an input operation of a user on the touchscreen 304, and determines a screen fingerprint recognition area including an unlocking point at which the input operation is performed.

S1303. Disable the fingerprint recognition function in a screen fingerprint recognition area including other unlocking points different from the determined unlocking point corresponding to the input operation.

S1304. A fingerprint recognition sensor 303 recognizes a user fingerprint according to a press-mode fingerprint recognition mode in the screen fingerprint recognition area including the determined unlocking point corresponding to the input operation.

The user fingerprint captured by the fingerprint recognition sensor 303 is matched with a fingerprint template.

S1305. Determine a fingerprint matching result, and if the matching is successful, perform step S1306, or else, perform step S1307.

S1306. Mark that the user fingerprint is authenticated successfully, and then perform step S1307.

S1307. Disable the fingerprint recognition function in the screen fingerprint recognition area including the current unlocking point.

S1308. Record an unlocking point position code of the current unlocking point.

The unlocking point position code is used to record a position of an unlocking point touched by a finger of the user. For the 9-point pattern lock, all nine unlocking points may be coded according to a sequence. For example, the unlocking points are sequentially coded A1, A2, A3, . . . , A9 from upper left to lower right.

S1309. Compute a current unlocking path code according to all unlocking point codes obtained in the previous step.

For example, unlocking points that the finger of the user slides through are unlocking points A1, A2, and A3 in sequence. In this case, the processor 302 performs a logical summation operation on the three unlocking points according to the following formula to obtain the current unlocking path code: A1+A2+A3=Result.

S1310. Determine all possible unlocking points in a next step after the current unlocking point.

For example, a current unlocking path already passes through the unlocking points A1, A2, and A3. In this case, when the current unlocking point is A3, because at the current unlocking point A3, unlocking points A7 and A9 are blocked by unlocking points A5 and A6, possible unlocking points in the next step are A4, A5, A6, and A8.

S1311. Enable the fingerprint recognition function in a screen fingerprint recognition area including all the possible unlocking points in the next step that are determined in step S1310.

S1312. Determine whether a finger of the user leaves the touchscreen 304, and notify a processor 302; and if the processor 302 determines that the finger of the user leaves the touchscreen 304, perform step S1313, or else return to step S1302.

Optionally, the touchscreen 304 determines whether the finger of the user leaves the touchscreen 304, and notifies the processor 302. If the processor 302 determines that the finger of the user leaves the touchscreen 304.

S1313. Determine whether the current unlocking path code is consistent with a preset unlocking path code, and if they are consistent, perform step S1314, or else, return to step S1302.

A hash operation may be performed on the current unlocking path code Result obtained in step S1309, namely, Hash (Result).

The Hash (Result) is compared with a hash value of a prestored unlocking pattern code; and if they are consistent, it is determined that the current unlocking path code is consistent with the preset unlocking path code.

For example, the preset unlocking path includes unlocking points A1, A2, A3, A5, A7, A8, and A9 in sequence.

If the current unlocking path already passes through the unlocking points A1, A2, and A3, the Hash (Result) is inconsistent with the hash value of the prestored unlocking pattern code.

If the current unlocking path already passes through the unlocking points A1, A2, A3, A5, A7, A8, and A9, the Hash (Result) is consistent with the hash value of the prestored unlocking pattern code.

S1314. Determine whether it is marked that the user fingerprint is authenticated successfully (marked in step S1306), and if it is marked, perform step S1315, or else return to step S1302.

S1315. End a system locked state, and authorize the user to access an electronic device 300.

Optionally, in the second optional implementation, as in Embodiment 4, an allowed quantity of times of incorrect fingerprint matching may also be set. If a quantity of user fingerprint identity authentication attempts reaches the allowed quantity of times of incorrect fingerprint matching, additional security measure may be taken.

For example, other unlocking modes are provided for the user; or the electronic device 300 is locked for preset duration, and within the preset duration, the user is not allowed to perform fingerprint recognition and other unlocking operations.

Optionally, an unlocking pattern of the 9-point pattern lock may be modified according to a fingerprint recognition result. The unlocking pattern of the 9-point pattern lock may vary each time, and the unlocking pattern is determined according to a fingerprint recognition result. Optionally, when the recognized finger is authenticated successfully, it may be determined that a user identity is authenticated successfully.

Optionally, it may be determined that the user identity is authenticated successfully only when the recognized fingerprint is authenticated successfully, or it may be determined that the user identity is authenticated successfully only when the current unlocking path code is consistent with the preset unlocking path code, or it is determined that the user identity is authenticated successfully when the recognized fingerprint is authenticated successfully and the current unlocking path code is consistent with the preset unlocking path code.

Optionally, prompt information may be provided when the recognized fingerprint fails to be authenticated, or prompt information may be provided when the current unlocking path code is inconsistent with the preset unlocking path code.

Figure 14:
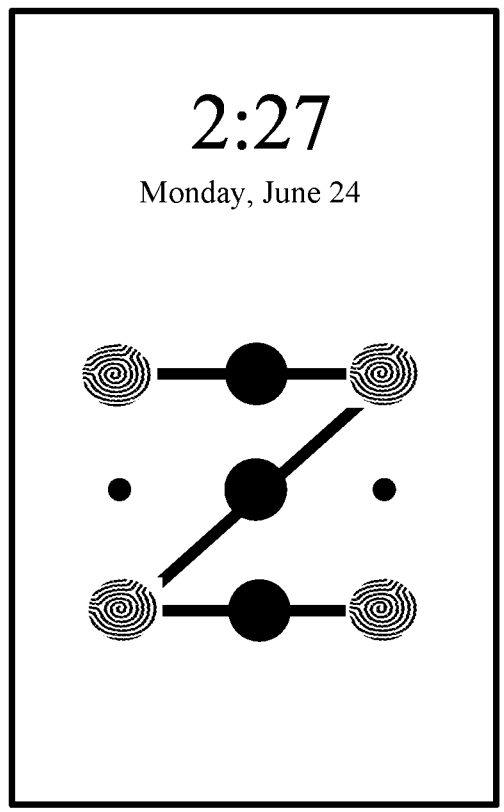
FIG. 14 is an effect diagram of implementing fingerprint recognition according to Embodiment 5 of the present invention.

A specific example of fingerprint recognition implemented by using the second optional implementation of Embodiment 5 may be shown in FIG. 14. For a 9-point pattern lock shown in FIG. 14, user fingerprint recognition may be performed in the press-mode fingerprint recognition mode in a screen fingerprint recognition area including an unlocking point, and when the finger of the user pauses, fingerprint recognition may also be performed in the press-mode fingerprint recognition mode in a screen fingerprint recognition area including a path between unlocking points. In addition, in a screen fingerprint recognition area including an unlocking path in which the user slides the finger from one unlocking point to a next unlocking point, fingerprint recognition may also be performed in the swipe-mode fingerprint recognition mode.

In the second optional implementation of Embodiment 5, the hash value of the unlocking pattern is prestored, the position and sequence information of the unlocking points is not stored, and every time the user connects the unlocking points on the touchscreen 304, whether unlocking is successful is determined according to hash computation.

In Embodiment 6 described hereinafter, the unlocking pattern is prestored; an unlocking pattern for sliding to unlock by the user on the 9-point pattern lock of the touchscreen 304 is compared with the prestored unlocking pattern, and if they are consistent, unlocking is successful.

Embodiment 6

In Embodiment 6, position and sequence information of unlocking points is prestored, that is, an unlocking pattern is prestored. The prestored unlocking pattern may be encrypted by using a key. The prestored unlocking pattern may be decrypted and read before a user performs an operation on a 9-point pattern lock.

Optionally, a fingerprint recognition function may be enabled in a screen fingerprint recognition area after it is determined that an unlocking pattern for sliding to unlock by the user on the 9-point pattern lock of a touchscreen 304 is consistent with the prestored unlocking pattern. After a recognized fingerprint is authenticated successfully, it is determined that a user identity is authenticated successfully.

Alternatively, fingerprint recognition may be performed in a screen fingerprint recognition area including an unlocking point or including an area between unlocking points, and after a recognized fingerprint is authenticated successfully, it is determined that a user identity is authenticated successfully. Even if an unlocking pattern for sliding to unlock by the user on the 9-point pattern lock of a touchscreen 304 is inconsistent with the prestored unlocking pattern, it is determined that the user identity is authenticated successfully.

Optionally, the fingerprint recognition function may be enabled only in a screen fingerprint recognition area including an unlocking point in a correct unlocking pattern.

Figure 15A:
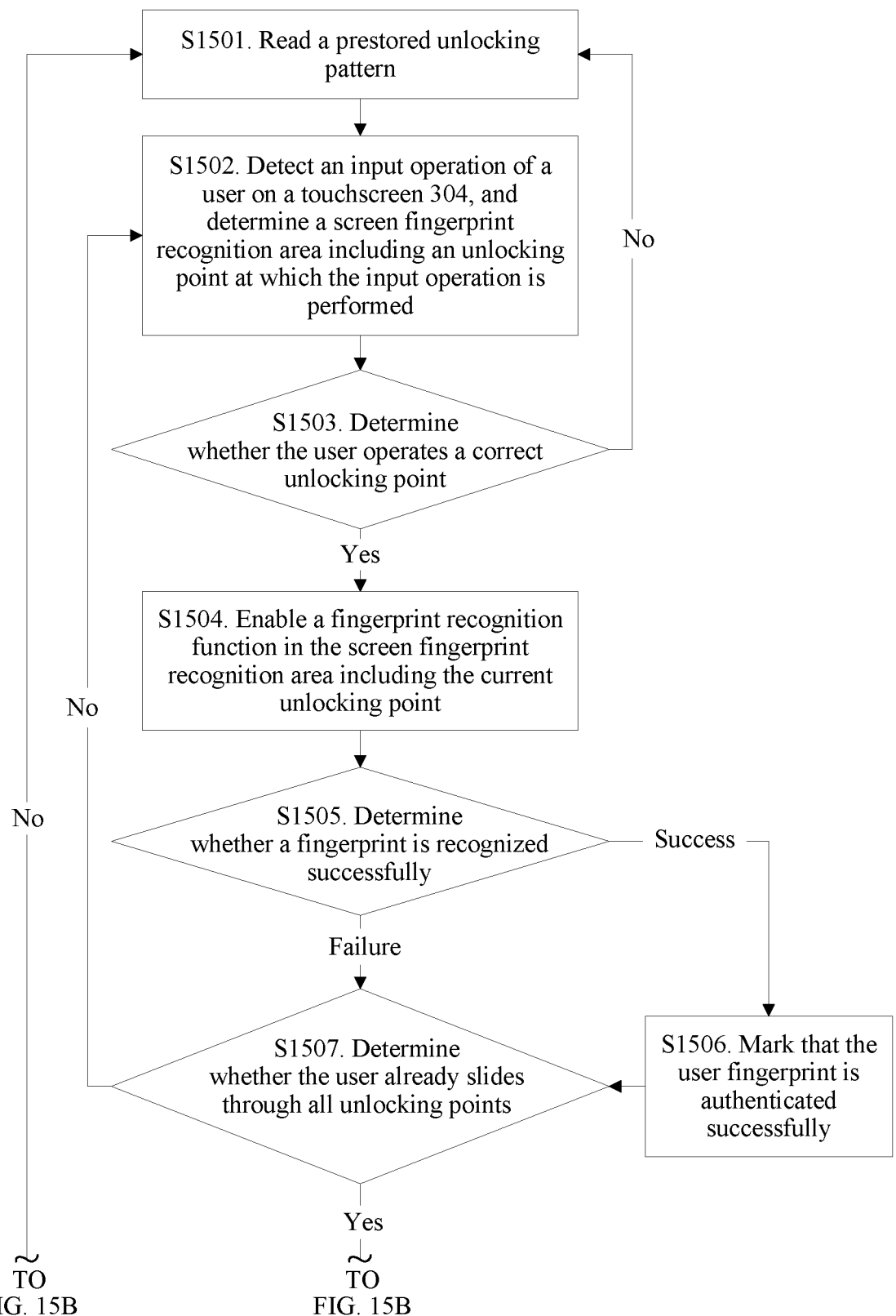
FIG. 15A and FIG. 15B are a flowchart of a fingerprint recognition procedure according to Embodiment 6 of the present invention.
Figure 15B:
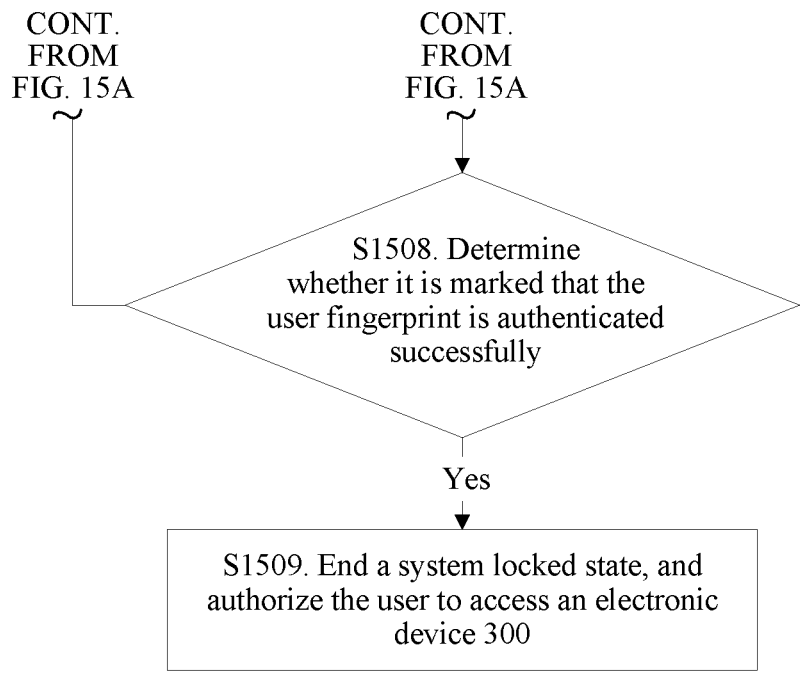

Referring to FIG. 15A and FIG. 15B, a fingerprint recognition procedure provided by Embodiment 6 may include the following steps.

S1501. Read a prestored unlocking pattern (the unlocking pattern may be preset by a user and stored in a memory 301 of an electronic device 300).

Optionally, a processor 302 of the electronic device 300 reads the unlocking pattern prestored in the memory 301. The unlocking pattern may be preset by the user and stored in the memory 301.

If the unlocking pattern is encrypted, the encrypted unlocking pattern needs to be decrypted first, so that all unlocking points and sequence information in the unlocking pattern are obtained. The unlocking points and the sequence information may be stored in any form, including forms such as codes of the unlocking points, coordinates of positions on a touchscreen 304, and an array of rows and columns of the unlocking points, so that whether a current unlocking point touched by a finger of the user is correct is determined.

S1502. A touchscreen 304 detects an input operation of the user on the touchscreen 304.

Optionally, the processor 302 determines a screen fingerprint recognition area including an unlocking point at which the input operation is performed.

S1503. Determine whether an unlocking point corresponding to the input operation is a correct unlocking point, and if yes, perform step S1504, or else, return to step S1501. Optionally, the user may be prompted of error information.

S1504. Enable a fingerprint recognition function in a screen fingerprint recognition area including the current unlocking point, and a fingerprint recognition sensor 303 performs fingerprint recognition.

User fingerprint recognition may be performed, according to a press-mode fingerprint recognition mode, in the screen fingerprint recognition area including the unlocking point.

Optionally, in step S1504, fingerprint recognition may also be performed in the press-mode fingerprint recognition mode when the finger of the user pauses slightly in a screen fingerprint recognition area including a path between unlocking points.

In addition, in a screen fingerprint recognition area including an unlocking path in which the user slides the finger from one unlocking point to a next unlocking point, fingerprint recognition may also be performed in a swipe-mode fingerprint recognition mode.

S1505. Determine whether a fingerprint is recognized successfully, and if yes, perform step S1506, or else perform step S1507.

S1506. Mark that the user fingerprint is authenticated successfully, and then perform step S1507.

S1507. Determine whether the user already slides through all unlocking points in the prestored unlocking pattern, and if yes, perform step S1508, or else return to step S1502.

S1508. Determine whether it is marked that the user fingerprint is authenticated successfully (marked in step S1506), and if it is marked, perform step S1509, or else return to step S1501.

S1509. End a system locked state, and authorize the user to access the electronic device 300.

Embodiment 7

Figure 16:
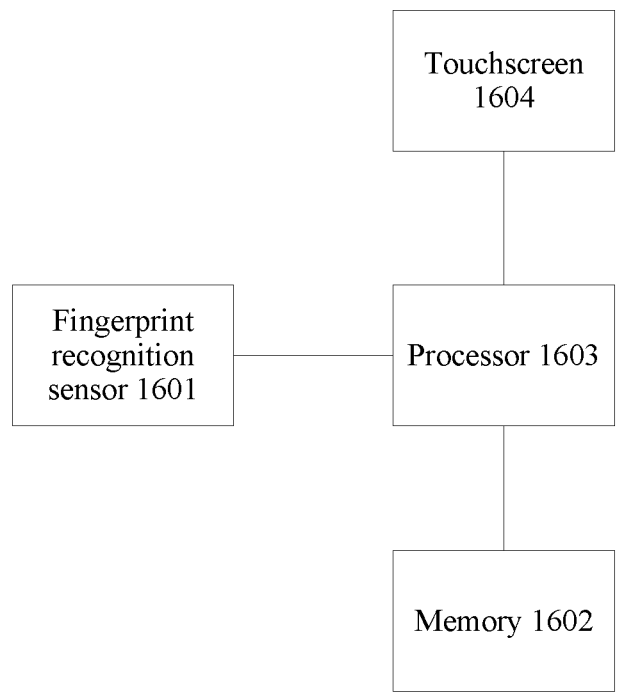
FIG. 16 is a schematic structural diagram of an electronic device according to Embodiment 7 of the present invention.

FIG. 16 is a schematic structural diagram of an electronic device according to Embodiment 7 of the present invention. As shown in FIG. 16, the electronic device includes:

a fingerprint recognition sensor 1601, configured to capture, according to a swipe mode or a press mode, a user fingerprint in an area displayed on a touchscreen 1604;

at least one memory 1602, configured to store a fingerprint template;

at least one processor 1603, configured to determine that a fingerprint recognition mode in a first display area is a first fingerprint recognition mode, where the first fingerprint recognition mode is the swipe mode or the press mode, and set the fingerprint recognition mode in the first display area to the first fingerprint recognition mode; and the touchscreen 1604, configured to display the first display area, and detect a first input of a user in the first display area; where the processor 1603 is further configured to: if the first fingerprint recognition mode is the swipe mode, instruct the fingerprint recognition sensor 1601 to capture a user fingerprint in the first display area according to the swipe mode, or if the first fingerprint recognition mode is the press mode, instruct the fingerprint recognition sensor 1601 to capture a user fingerprint in the first display area according to the press mode; and match the fingerprint corresponding to the first input and captured by the fingerprint recognition sensor 1601 with the fingerprint template.

As shown in FIG. 16, all of the fingerprint recognition sensor 1601, the at least one memory 1602, and the touchscreen 1604 may be connected to the at least one processor 1603. Alternatively, the electronic device provided by Embodiment 7 may use a bus architecture. All of the fingerprint recognition sensor 1601, the at least one memory 1602, the touchscreen 1604, and the at least one processor 1603 are connected to a bus, and communicate by using the bus.

For an optional implementation of the fingerprint recognition sensor 1601, refer to the foregoing fingerprint recognition sensor 303. For an optional implementation of the at least one processor 1603, refer to the foregoing processor 302. For an optional implementation of the at least one memory, refer to the foregoing memory 301. For an optional implementation of the touchscreen 304, refer to the foregoing touchscreen 304. For mutual interactions between components in FIG. 16, refer to modes of interactions between related components in FIG. 3.

For optional implementations in which the touchscreen 1604 displays the area, the processor 1603 sets the fingerprint recognition mode, the processor 1603 instructs the fingerprint recognition sensor 1601 to capture the user fingerprint in the area displayed by the touchscreen 1604, and the processor 1603 matches the fingerprint captured by the fingerprint recognition sensor 1601, refer to the foregoing Embodiment 1 to Embodiment 6.

Optionally, the at least one processor 1603 is specifically configured to:

if the first display area is an area including a press-mode user interface UI widget, determine that the first fingerprint recognition mode is the press mode, where the press-mode UI widget uses the press mode to interact with the user; or if the first display area is an area including a swipe-mode UI widget, determine that the fingerprint recognition mode in the first display area is the swipe mode, where the swipe-mode UI widget uses the swipe mode to interact with the user.

Optionally, the at least one processor 1603 is further configured to:

in a process of matching the fingerprint captured by the fingerprint recognition sensor 1601 with the fingerprint template, prompt the user with progress of matching the fingerprint corresponding to the first input on the touchscreen 1604, for example, as shown in FIG. 7.

Optionally, the at least one processor 1603 is further configured to: before the touchscreen 1604 detects the first input of the user in the first display area, enable a fingerprint recognition function only in the first display area, and keep the fingerprint recognition function disabled in areas different from the first display area.

Optionally, the at least one processor 1603 is further configured to: after matching the fingerprint corresponding to the first input and captured by the fingerprint recognition sensor 1601 with the fingerprint template, disable the fingerprint recognition function in the first display area.

Optionally, the at least one processor 1603 is further configured to: if it is determined that the first fingerprint recognition mode is the swipe mode, after the touchscreen 1604 detects the first input of the user in the first display area, determine a second display area according to the first input; and determine, according to the first input, that a fingerprint recognition mode in the second display area is a second fingerprint recognition mode, where the second fingerprint recognition mode is the swipe mode or the press mode;

the touchscreen 1604 is further configured to detect a second input of the user in the second display area; and the processor 1603 is further configured to: if the second fingerprint recognition mode is the swipe mode, instruct the fingerprint recognition sensor 1601 to capture, according to the swipe mode, a fingerprint corresponding to the second input in the second display area, or if the second fingerprint recognition mode is the press mode, instruct the fingerprint recognition sensor 1601 to capture, according to the press mode, a fingerprint corresponding to the second input in the second display area; and match the fingerprint corresponding to the second input and captured by the fingerprint recognition sensor 1601 with the fingerprint template.

Optionally, the at least one processor 1603 is specifically configured to:

predict at least one first track according to the first input, and use a display area that the at least one first track passes through, as the second display area.

Optionally, the at least one processor 1603 is specifically configured to determine the second display area according to operation information about the first operation, where the operation information about the first operation includes at least one of the following information:

force of the first input applied to the touchscreen 1604;

a moving speed of the first input;

a moving direction of the first input; or duration of the first input.

Optionally, the at least one processor 1603 is specifically configured to determine the second display area according to the operation information about the first operation and at least one of the following information:

habit information recorded by the memory 1602 about operations performed by the user of the electronic device on the electronic device;

a direction in which the user holds the electronic device; or a layout of UI widgets in the second display area.

In Embodiment 7, for the optional solution in which the electronic device determines the second display area according to the first input and determines the fingerprint recognition mode in the second display area, refer to the solution to determining the second display area and the fingerprint recognition mode according to the foregoing Embodiment 2. Details are not described again herein.

Optionally, the first display area includes an area including at least two unlocking points, the at least two unlocking points are unlocking points of a same UI widget, and the fingerprint recognition mode in the first display area is the press mode;

the touchscreen 1604 is specifically configured to detect the first input of the user in an area including a first unlocking point in the at least two unlocking points;

the at least one processor 1603 is further configured to: after the touchscreen 1604 detects the first input of the user in the area including the first unlocking point in the at least two unlocking points, disable the fingerprint recognition function in an area including another unlocking point, where the another unlocking point is an unlocking point different from the first unlocking point in the at least two unlocking points;

the at least one processor 1603 is specifically configured to: instruct the fingerprint recognition sensor 1601 to capture, according to the press mode, the fingerprint corresponding to the first input in the area including the first unlocking point, and match the fingerprint corresponding to the first input and captured by the fingerprint recognition sensor 1601 in the area including the first unlocking point, with the fingerprint template; and the at least one processor 1603 is further configured to: after matching the fingerprint corresponding to the first input and captured by the fingerprint recognition sensor 1601 with the fingerprint template, if the matching is successful, disable the fingerprint recognition function in the area including the first unlocking point.

Optionally, the at least one processor 1603 is further configured to: if the fingerprint corresponding to the first input and captured by the fingerprint recognition sensor 1601 in the area including the first unlocking point fails to match the fingerprint template, determine a next unlocking point after the first unlocking point according to a set unlocking sequence of the at least two unlocking points; and set a fingerprint recognition mode in an area including the determined next unlocking point to the press mode;

the touchscreen 1604 is further configured to detect a user input in the area including the next unlocking point; and the processor 1603 is further configured to: in the area including the next unlocking point, instruct the fingerprint recognition sensor 1601 to capture, according to the press mode, a fingerprint corresponding to the user input detected by the touchscreen 1604 in the area including the next unlocking point, and match the fingerprint corresponding to the user input in the area including the next unlocking point and captured by the fingerprint recognition sensor 1601 with the fingerprint template.

When the display area includes at least two unlocking points, for an optional solution to performing fingerprint recognition in the display area, refer to the procedure shown in FIG. 7.

In addition, the electronic device provided by Embodiment 7 may set the fingerprint recognition mode in the display area according to configuration description information of an application. For an optional implementation solution, refer to the foregoing Embodiment 3. When fingerprint recognition is performed in an area including a dynamic UI widget, for an optional implementation solution of the electronic device provided by Embodiment 7, refer to the foregoing Embodiment 4.

When the UI widget is a 9-point pattern lock, for an optional implementation solution in which the electronic device provided by Embodiment 7 performs fingerprint recognition, refer to the foregoing Embodiment 5 or Embodiment 6.

Embodiment 8

Figure 17:
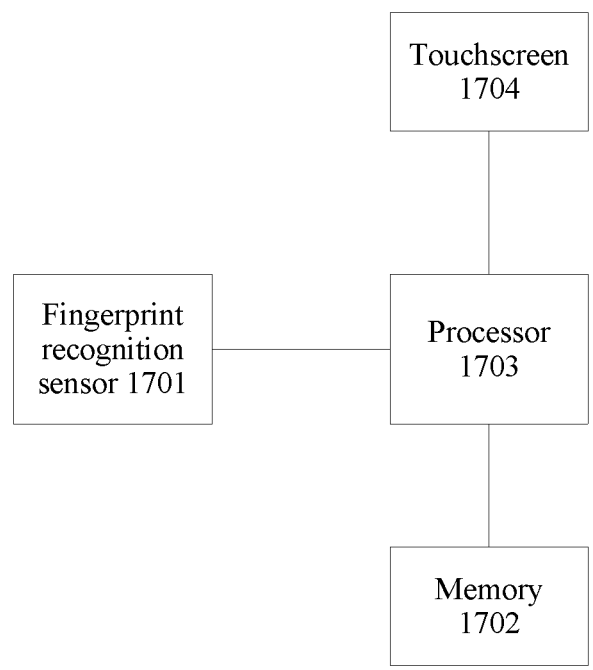
FIG. 17 is a schematic structural diagram of an electronic device according to Embodiment 8 of the present invention.

FIG. 17 is a schematic structural diagram of an electronic device according to Embodiment 8 of the present invention. As shown in FIG. 17, the electronic device includes:

a fingerprint recognition sensor 1701, configured to capture, according to a swipe mode or a press mode, a user fingerprint in an area displayed on a touchscreen;

at least one memory 1702, configured to store a fingerprint template;

the touchscreen 1704, configured to detect a third input of a user in a third display area; and at least one processor 1703, configured to determine a fourth display area according to the third input detected by the touchscreen, and determine, according to the third input, that a fingerprint recognition mode in the fourth display area is a third fingerprint recognition mode, where the third fingerprint recognition mode is the swipe mode or the press mode; where the touchscreen 1704 is further configured to detect a fourth input of the user in the fourth display area; and the at least one processor 1703 is further configured to: if the third fingerprint recognition mode is the swipe mode, instruct the fingerprint recognition sensor 1701 to capture, according to the swipe mode, a fingerprint corresponding to the fourth input in the fourth display area, or if the third fingerprint recognition mode is the press mode, instruct the fingerprint recognition sensor 1701 to capture, according to the press mode, a fingerprint corresponding to the fourth input in the fourth display area; and match the fingerprint corresponding to the fourth input and captured by the fingerprint recognition sensor 1701 with the fingerprint template.

Optionally, the at least one processor 1703 is specifically configured to:

predict at least one second track according to the third operation, and use a display area that the at least one second track passes through or points to, as the fourth display area.

As shown in FIG. 17, all of the fingerprint recognition sensor 1701, the at least one memory 1702, and the touchscreen 1704 may be connected to the at least one processor 1703. Alternatively, the electronic device provided by Embodiment 7 may use a bus architecture. All of the fingerprint recognition sensor 1701, the at least one memory 1702, the touchscreen 1704, and the at least one processor 1703 are connected to a bus, and communicate by using the bus.

For an optional implementation of the fingerprint recognition sensor 1701, refer to the foregoing fingerprint recognition sensor 303. For an optional implementation of the at least one processor 1703, refer to the foregoing processor 302. For an optional implementation of the at least one memory, refer to the foregoing memory 301. For an optional implementation of the touchscreen 304, refer to the foregoing touchscreen 304. For mutual interactions between components in FIG. 17, refer to modes of interactions between related components in FIG. 3.

For optional implementations in which the touchscreen 1704 displays the area, the processor 1703 sets the fingerprint recognition mode; the processor 1703 instructs the fingerprint recognition sensor 1701 to capture the user fingerprint in the area displayed by the touchscreen 1704, and the processor 1703 matches the fingerprint captured by the fingerprint recognition sensor 1701, refer to the foregoing Embodiment 1 to Embodiment 6.

In Embodiment 7, for the optional solution in which the electronic device determines the fourth display area according to the third input and determines the fingerprint recognition mode in the fourth display area, refer to the solution to determining the second display area and the fingerprint recognition mode according to the foregoing Embodiment 2. Details are not described again herein.

Embodiment 9

Figure 18:
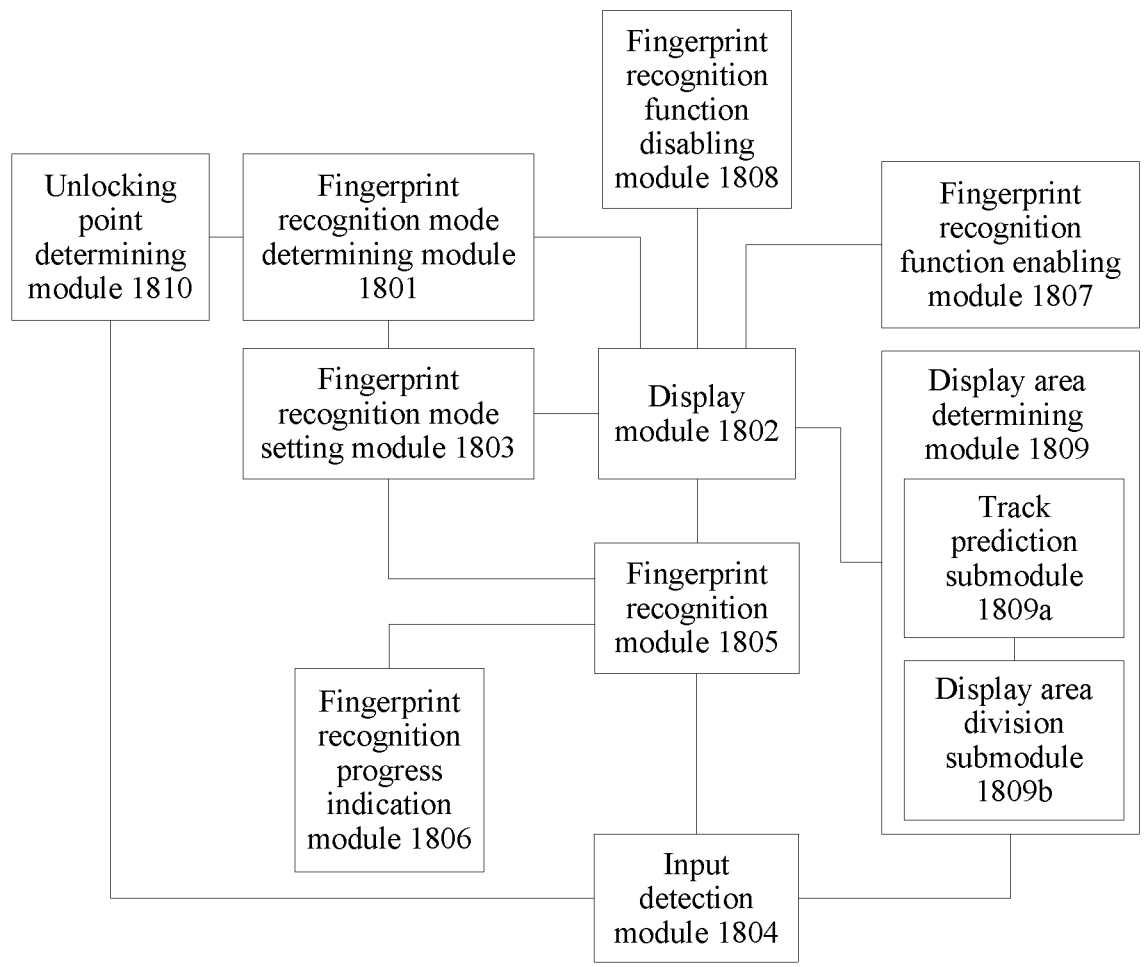
FIG. 18 is a schematic structural diagram of an electronic device according to Embodiment 9 of the present invention.

FIG. 18 is a schematic structural diagram of an electronic device according to Embodiment 9 of the present invention. As shown in FIG. 18, the electronic device includes:

a fingerprint recognition mode determining module 1801, configured to determine that a fingerprint recognition mode in a first display area is a first fingerprint recognition mode, where the first fingerprint recognition mode is a swipe mode or a press mode;

a display module 1802, configured to display the first display area;

a fingerprint recognition mode setting module 1803, configured to set the fingerprint recognition mode in the first display area displayed by the display module 1802 to the first fingerprint recognition mode determined by the fingerprint recognition mode determining module 1801;

an input detection module 1804, configured to detect a first input of a user in the first display area; and a fingerprint recognition module 1805, configured to: when the first fingerprint recognition mode is the swipe mode, recognize, according to the swipe mode set by the fingerprint recognition mode setting module 1803, a fingerprint corresponding to the first input in the first display area; and when the first fingerprint recognition mode is the press mode, recognize, according to the press mode set by the fingerprint recognition mode setting module 1803, a fingerprint corresponding to the first input in the first display area.

For implementations of hardware and software of the electronic device provided by Embodiment 9, refer to the electronic device shown in FIG. 3.

For the optional implementation of setting the fingerprint recognition mode, and recognizing the fingerprint in the display area by the electronic device provided by Embodiment 9, refer to the foregoing Embodiment 1 to Embodiment 6.

Optionally, the fingerprint recognition module 1801 is specifically configured to:

when the first display area is an area including a press-mode user interface UI widget, determine that the first fingerprint recognition mode is the press mode, where the press-mode UI widget uses the press mode to interact with the user; or when the first display area is an area including a swipe-mode UI widget, determine that the fingerprint recognition mode in the first display area is the swipe mode, where the swipe-mode UI widget uses the swipe mode to interact with the user.

Optionally, the electronic device further includes:

a fingerprint recognition progress indication module 1806, configured to: in a process in which the fingerprint recognition module 1805 recognizes the fingerprint corresponding to the first input, prompt the user with progress of recognizing the fingerprint corresponding to the first input.

Optionally, the electronic device provided by Embodiment 9 further includes:

a fingerprint recognition function enabling module 1807, configured to: before the input detection module 1804 detects the first input of the user in the first display area, enable a fingerprint recognition function only in the first display area, and keep the fingerprint recognition function disabled in areas different from the first display area.

Optionally, the electronic device provided by Embodiment 9 further includes:

a fingerprint recognition function disabling module 1808, configured to disable the fingerprint recognition function in the first display area after the fingerprint recognition module 1805 recognizes the fingerprint corresponding to the first input.

Optionally, the electronic device provided by Embodiment 9 further includes:

a display area determining module 1809, configured to: if the fingerprint recognition mode determining module 1801 determines that the first fingerprint recognition mode is the swipe mode, after the input detection module 1804 detects the first input of the user in the first display area, determine a second display area according to the first input; where the display module 1802 is configured to display the second display area;

the fingerprint recognition mode determining module 1801 is configured to determine, according to the first input, that a fingerprint recognition mode in the second display area is a second fingerprint recognition mode, where the second fingerprint recognition mode is the swipe mode or the press mode;

the input detection module 1804 is configured to detect a second input of the user in the second display area; and the fingerprint recognition module 1805 is configured to: when the second fingerprint recognition mode is the swipe mode, recognize, according to the swipe mode, a fingerprint corresponding to the second input in the second display area; and when the second fingerprint recognition mode is the press mode, recognize, according to the press mode, a fingerprint corresponding to the second input in the second display area.

Optionally, the display area determining module 1809 includes:

a track prediction submodule 1809*a*, configured to predict at least one first track according to the first input; and a display area division submodule 1809*b*, configured to use a display area that the at least one first track predicted by the track prediction submodule 1809*a* passes through, as the second display area.

Optionally, the display area determining module 1809 is specifically configured to determine the second display area according to operation information about the first operation, where the operation information about the first operation includes at least one of the following information:

force of the first input applied to a touchscreen;

a moving speed of the first input;

a moving direction of the first input; or duration of the first input.

Optionally, the display area determining module 1809 is specifically configured to determine the second display area according to the operation information about the first operation and at least one of the following information:

recorded habit information about operations performed by the user of the electronic device on the electronic device;

a direction in which the user holds the electronic device; or a layout of UI widgets in the second display area.

In Embodiment 9, for the optional solution in which the electronic device determines the second display area according to the first input and determines the fingerprint recognition mode in the second display area, refer to the solution to determining the second display area and the fingerprint recognition mode according to the foregoing Embodiment 2. Details are not described again herein.

Optionally, the first display area includes an area including at least two unlocking points, the at least two unlocking points are unlocking points of a same UI widget, and the fingerprint recognition mode in the first display area is the press mode;

the input detection module 1804 is specifically configured to detect the first input of the user in an area including a first unlocking point in the at least two unlocking points;

the fingerprint recognition function disabling module 1808 is configured to: after the input detection module 1804 detects the first input of the user in the area including the first unlocking point in the at least two unlocking points, disable the fingerprint recognition function in an area including another unlocking point, where the another unlocking point is an unlocking point different from the first unlocking point in the at least two unlocking points;

the fingerprint recognition module 1805 is specifically configured to recognize, according to the press mode, the fingerprint corresponding to the first input in the area including the first unlocking point; and the fingerprint recognition function disabling module 1808 is configured to: after the fingerprint recognition module 1805 recognizes, according to the press mode, the fingerprint corresponding to the first input in the area including the first unlocking point, if the fingerprint recognized by the fingerprint recognition module 1805 is authenticated successfully, disable the fingerprint recognition function in the area including the first unlocking point.

Optionally, the electronic device provided by Embodiment 9 further includes an unlocking point determining module 1810, configured to determine a next unlocking point after the first unlocking point according to a set unlocking sequence of the at least two unlocking points if the fingerprint corresponding to the first input in the area including the first unlocking point is recognized according to the press mode but fails to be authenticated; where the fingerprint recognition mode determining module 1801 is configured to determine that a fingerprint recognition mode in an area including the next unlocking point determined by the unlocking point determining module 1810 is set to the press mode;

the fingerprint recognition mode setting module 1803 is configured to set the fingerprint recognition mode in the area including the next unlocking point to the press mode determined by the fingerprint recognition mode determining module 1801;

the input detection module 1804 is configured to detect a user input in the area including the next unlocking point; and the fingerprint recognition module 1805 is configured to recognize, in the area including the next unlocking point, according to the press mode, a fingerprint corresponding to the detected user input in the area including the next unlocking point.

When the display area includes at least two unlocking points, for an optional solution to performing fingerprint recognition in the display area, refer to the procedure shown in FIG. 7.

In addition, the electronic device provided by Embodiment 9 may set the fingerprint recognition mode in the display area according to configuration description information of an application. For an optional implementation solution, refer to the foregoing Embodiment 3. When fingerprint recognition is performed in an area including a dynamic UI widget, for an optional implementation solution of the electronic device provided by Embodiment 9, refer to the foregoing Embodiment 4.

When the UI widget is a 9-point pattern lock, for an optional implementation solution in which the electronic device provided by Embodiment 9 performs fingerprint recognition, refer to the foregoing Embodiment 5 or Embodiment 6.

Embodiment 10

Figure 19:
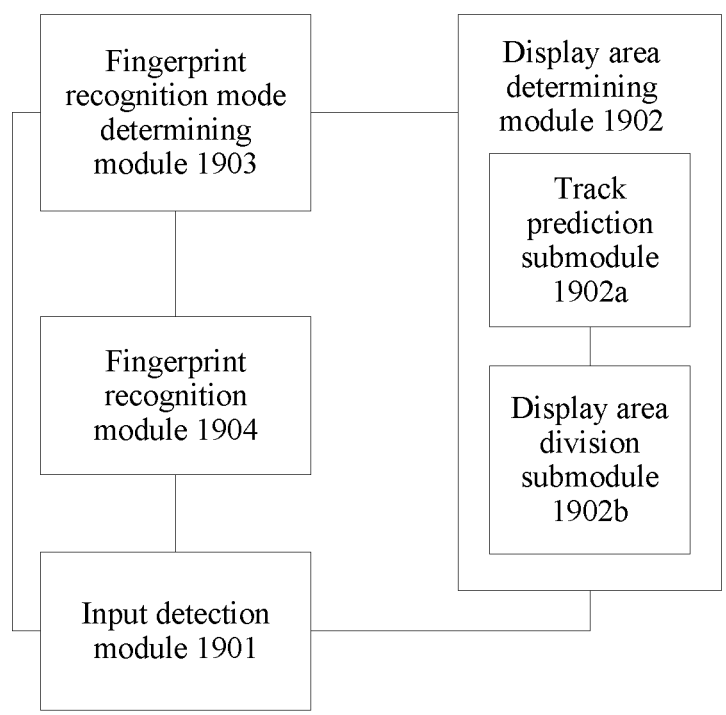
FIG. 19 is a schematic structural diagram of an electronic device according to Embodiment 10 of the present invention.

FIG. 19 is a schematic structural diagram of an electronic device according to Embodiment 10. As shown in FIG. 19, the electronic device includes:

an input detection module 1901, configured to detect a third input of a user in a third display area;

a display area determining module 1902, configured to determine a fourth display area according to the third input detected by the input detection module 1901;

a fingerprint recognition mode determining module 1903, configured to determine, according to the third input detected by the input detection module 1901, that a fingerprint recognition mode in the fourth display area is a third fingerprint recognition mode, where the third fingerprint recognition mode is a swipe mode or a press mode; where the input detection module 1901 is further configured to detect a fourth input of the user in the fourth display area; and a fingerprint recognition module 1904, configured to: when the third fingerprint recognition mode is the swipe mode, recognize, according to the swipe mode, a fingerprint corresponding to the fourth input in the fourth display area, or when the third fingerprint recognition mode is the press mode, recognize, according to the press mode, a fingerprint corresponding to the fourth input in the fourth display area.

Optionally, the display area determining module 1902 includes:

a track prediction submodule 1902*a*, configured to predict at least one second track according to the third operation; and a display area division submodule 1902*b*, configured to use a display area that the at least one second track predicted by the track prediction submodule passes through or points to, as the fourth display area.

For implementations of hardware and software of the electronic device provided by Embodiment 10, refer to the electronic device 300 shown in FIG. 3.

In Embodiment 10, for the optional solution in which the electronic device determines the fourth display area according to the third input and determines the fingerprint recognition mode in the fourth display area, refer to the solution to determining the second display area and the fingerprint recognition mode according to the foregoing Embodiment 2. Details are not described again herein.

Embodiment 11

Figure 20:
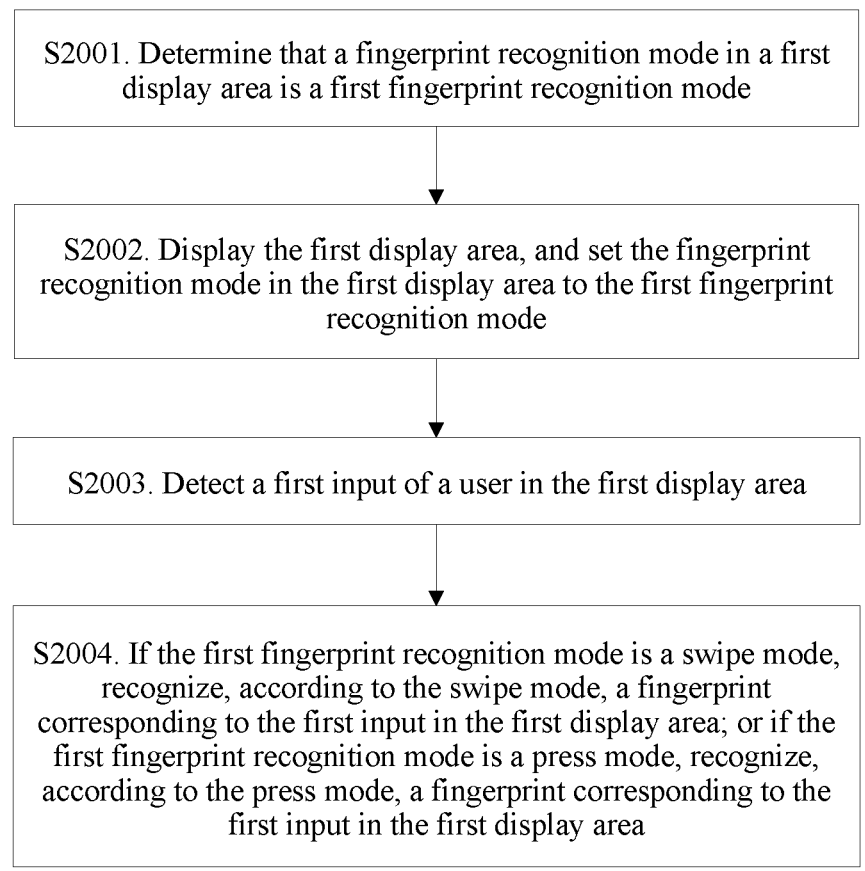
FIG. 20 is a flowchart of a fingerprint recognition method according to Embodiment 11 of the present invention.

FIG. 20 is a flowchart of a fingerprint recognition method according to Embodiment 11. As shown in FIG. 20, the method includes the following steps.

S2001. Determine that a fingerprint recognition mode in a first display area is a first fingerprint recognition mode, where the first fingerprint recognition mode is a swipe mode or a press mode.

S2002. Display the first display area, and set the fingerprint recognition mode in the first display area to the first fingerprint recognition mode.

S2003. Detect a first input of a user in the first display area.

S2004. If the first fingerprint recognition mode is the swipe mode, recognize, according to the swipe mode, a fingerprint corresponding to the first input in the first display area; or if the first fingerprint recognition mode is the press mode, recognize, according to the press mode, a fingerprint corresponding to the first input in the first display area.

Optionally, the determining that a fingerprint recognition mode in a first display area is a first fingerprint recognition mode in step S2001 includes:

if the first display area is an area including a press-mode user interface UI widget, determining that the first fingerprint recognition mode is the press mode, where the press-mode UI widget uses the press mode to interact with the user; or if the first display area is an area including a swipe-mode UI widget, determining that the fingerprint recognition mode in the first display area is the swipe mode, where the swipe-mode UI widget uses the swipe mode to interact with the user.

Optionally, the method further includes:

in a process of recognizing the fingerprint corresponding to the first input, prompting the user with progress of recognizing the fingerprint corresponding to the first input.

Optionally, before the detecting a first input of a user in the first display area in step S2003, the method further includes:

enabling a fingerprint recognition function only in the first display area, and keeping the fingerprint recognition function disabled in areas different from the first display area.

Optionally, after the recognizing a fingerprint corresponding to the first input in step S2004, the method further includes:

disabling the fingerprint recognition function in the first display area.

Optionally, if it is determined that the first fingerprint recognition mode is the swipe mode, after the detecting a first input of a user in the first display area in step S2003, the method further includes:

determining a second display area according to the first input;

determining, according to the first input, that a fingerprint recognition mode in the second display area is a second fingerprint recognition mode, where the second fingerprint recognition mode is the swipe mode or the press mode;

detecting a second input of the user in the second display area; and if the second fingerprint recognition mode is the swipe mode, recognizing, according to the swipe mode, a fingerprint corresponding to the second input in the second display area; or if the second fingerprint recognition mode is the press mode, recognizing, according to the press mode, a fingerprint corresponding to the second input in the second display area.

Optionally, the determining a second display area according to the first input includes:

predicting at least one first track according to the first input, and using a display area that the at least one first track passes through, as the second display area.

Optionally, the determining a second display area according to the first input includes: determining the second display area according to operation information about the first operation, where the operation information about the first operation includes at least one of the following information:

force of the first input applied to the touchscreen;
a moving speed of the first input;
a moving direction of the first input; or
duration of the first input.

Optionally, the second display area is determined according to the operation information about the first operation and at least one of the following information:

recorded habit information about operations performed by the user of the electronic device on the electronic device;
a direction in which the user holds the electronic device; or
a layout of UI widgets in the second display area.

Optionally, the first display area includes an area including at least two unlocking points, the at least two unlocking points are unlocking points of a same UI widget, and the fingerprint recognition mode in the first display area is the press mode;

the detecting a first input of a user in the first display area in step S2003 includes: detecting the first input of the user in an area including a first unlocking point in the at least two unlocking points;

after the detecting the first input of the user in an area including a first unlocking point in the at least two unlocking points in step S2003, the method further includes: disabling the fingerprint recognition function in an area including another unlocking point, where the another unlocking point is an unlocking point different from the first unlocking point in the at least two unlocking points;

the recognizing a fingerprint corresponding to the first input in the first display area in step S2004 includes: recognizing, according to the press mode, the fingerprint corresponding to the first input in the area including the first unlocking point; and after the recognizing, according to the press mode, a fingerprint corresponding to the first input in the area including the first unlocking point in step S2004, the method further includes: if the recognized fingerprint is authenticated successfully, disabling the fingerprint recognition function in the area including the first unlocking point.

Optionally, if the fingerprint corresponding to the first input in the area including the first unlocking point is recognized according to the press mode in step S2004 but fails to be authenticated, the method further includes:

determining a next unlocking point after the first unlocking point according to a set unlocking sequence of the at least two unlocking points; and setting a fingerprint recognition mode in an area including the determined next unlocking point to the press mode;

detecting a user input in the area including the next unlocking point; and recognizing, in the area including the next unlocking point, according to the press mode, a fingerprint corresponding to the detected user input in the area including the next unlocking point.

For the electronic device to which the method may be applied, refer to the electronic device 300 shown in FIG. 3. In this method, for optional implementations of determining the fingerprint recognition mode in the display area and recognizing the user fingerprint according to the determined fingerprint recognition mode, refer to the foregoing Embodiment to Embodiment 6.

Embodiment 12

Figure 21:
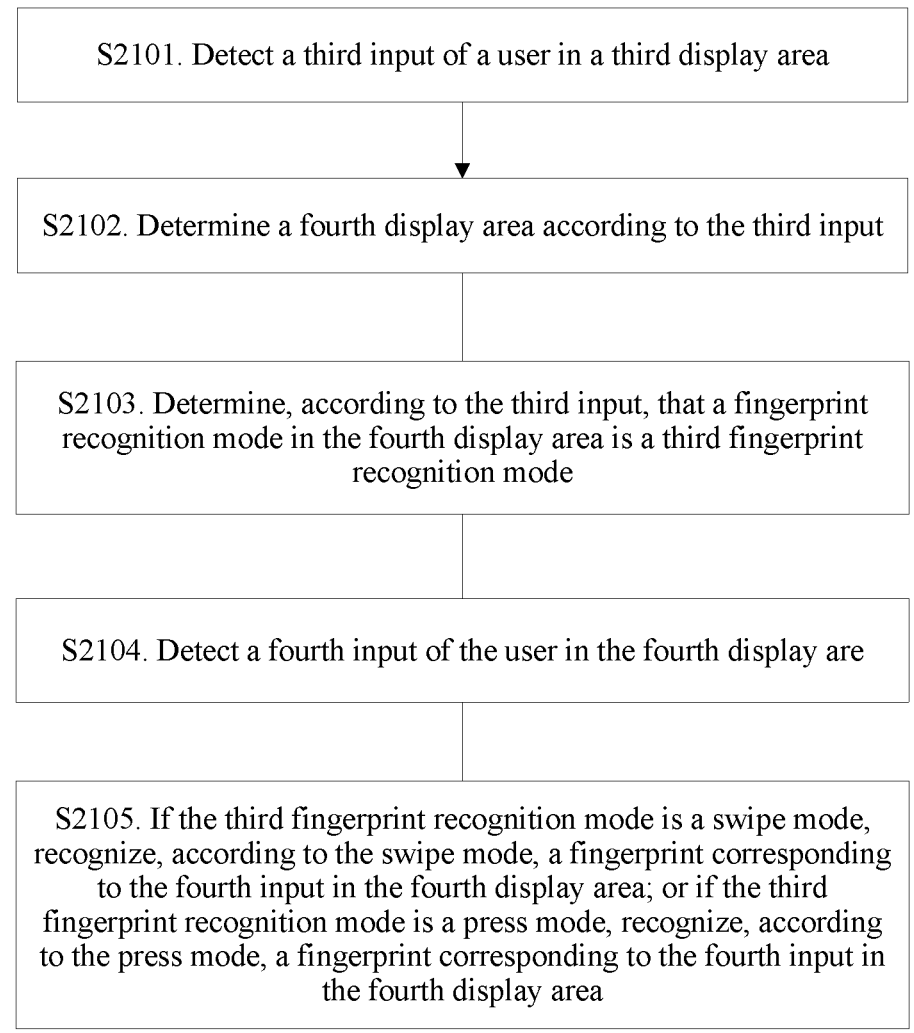
FIG. 21 is a flowchart of a fingerprint recognition method according to Embodiment 12 of the present invention.

FIG. 21 is a flowchart of a fingerprint recognition method according to Embodiment 12. As shown in FIG. 21, the method includes the following steps.

S2101. Detect a third input of a user in a third display area.

S2102. Determine a fourth display area according to the third input.

S2103. Determine, according to the third input, that a fingerprint recognition mode in the fourth display area is a third fingerprint recognition mode, where the third fingerprint recognition mode is a swipe mode or a press mode.

S2104. Detect a fourth input of the user in the fourth display area.

S2105. If the third fingerprint recognition mode is the swipe mode, recognize, according to the swipe mode, a fingerprint corresponding to the fourth input in the fourth display area; or if the third fingerprint recognition mode is the press mode, recognize, according to the press mode, a fingerprint corresponding to the fourth input in the fourth display area.

Optionally, the determining a fourth display area according to the third input in step S2102 includes:

predicting at least one second track according to the third operation, and using a display area that the at least one second track passes through or points to, as the fourth display area.

For an electronic device to which the method may be applied, refer to the electronic device 300 shown in FIG. 3.

In this method, for the optional solution to determining the fourth display area according to the third input and determining the fingerprint recognition mode in the fourth display area, refer to the solution to determining the second display area and the fingerprint recognition mode according to the foregoing Embodiment 2. Details are not described again herein.

In summary, the embodiments of the present invention provide an electronic device and a fingerprint recognition method. According to the embodiments of the present invention, the electronic device may flexibly set a fingerprint recognition mode, so that when different UIs are displayed on a touchscreen, the electronic device can capture a fingerprint successfully.

Persons skilled in the art should understand that the embodiments of the present invention may be provided as a method, a system, or a computer program product. Therefore, the present invention may use a form of hardware only embodiments, software only embodiments, or embodiments with a combination of software and hardware.

Moreover, the present invention may use a form of a computer program product that is implemented on at least one computer-usable storage medium (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention.

It should be understood that computer program instructions may be used to implement each process and/or each block in the flowcharts and/or the block diagrams and a combination of a process and/or a block in the flowcharts and/or the block diagrams.

These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention.

The present invention is intended to cover these modifications and variations provided that they fall within the scope of protection defined by the following claims and their equivalent technologies.

What is claimed is:

1. A fingerprint recognition method, comprising:
determining that a fingerprint recognition mode in a first display area of a touchscreen is a first fingerprint recognition mode, wherein the first fingerprint recognition mode comprises a swipe mode or a press mode;
displaying the first display area;
setting the fingerprint recognition mode in the first display area to the first fingerprint recognition mode;
detecting a first input in the first display area;
when the first fingerprint recognition mode is the swipe mode,
recognizing, according to the swipe mode, the fingerprint corresponding to the first input in the first display area;
determining a second display area according to the first input;
displaying the second display area; and
determining, according to the first input, that a second fingerprint recognition mode in the second display area is the second fingerprint recognition mode, wherein the second fingerprint recognition mode comprises the swipe mode or the press mode; and
when the first fingerprint recognition mode is the press mode, recognizing, according to the press mode, the fingerprint corresponding to the first input in the first display area.

2. The fingerprint recognition method according to claim 1, wherein determining that the fingerprint recognition mode in the first display area is the first fingerprint recognition mode comprises:
when the first display area is an area comprising a press-mode user interface UI widget, determining that the first fingerprint recognition mode is the press mode, wherein the press-mode UI widget uses the press mode to recognize the fingerprint; or
when the first display area is an area comprising a swipe-mode UI widget, determining that the fingerprint recognition mode in the first display area is the swipe mode, wherein the swipe-mode UI widget uses the swipe mode to recognize the fingerprint.

3. The fingerprint recognition method according to claim 1, wherein when recognizing that the fingerprint corresponds to the first input, the finger recognition method further comprises displaying progress of recognizing the fingerprint corresponding to the first input.

4. The fingerprint recognition method according to claim 1, wherein before detecting the first input in the first display area, the fingerprint recognition method further comprises:
    enabling a fingerprint recognition function only in the first display area; and
    keeping the fingerprint recognition function disabled in areas that are different from the first display area.

5. The fingerprint recognition method according to claim 1, wherein after recognizing the fingerprint corresponding to the first input in the first display area, the fingerprint recognition method further comprises disabling a fingerprint recognition function in the first display area.

6. The fingerprint recognition method according to claim 1, further comprising:
    detecting a second input in the second display area;
    when the second fingerprint recognition mode is the swipe mode, recognizing, according to the swipe mode, the fingerprint corresponding to the second input in the second display area; and
    when the second fingerprint recognition mode is the press mode, recognizing, according to the press mode, the fingerprint corresponding to the second input in the second display area.

7. The fingerprint recognition method according to claim 1, wherein determining the second display area according to the first input comprises:
    predicting at least one first track according to the first input; and
    using a display area that the at least one first track passes through as the second display area.

8. The fingerprint recognition method according to claim 1, wherein determining the second display area according to the first input comprises determining the second display area according to operation information for the first input, and wherein the operation information for the first input comprises at least one of:
    force of the first input applied to the touchscreen;
    a moving speed of the first input;
    a moving direction of the first input; or
    duration of the first input.

9. The fingerprint recognition method according to claim 8, wherein the second display area is determined according to the operation information for the first input and at least one of:
    recorded habit information about inputs of an electronic device on the electronic device;
    a direction in which the electronic device is held; or
    a layout of UI widgets in the second display area.

10. The fingerprint recognition method according to claim 1, wherein the first display area comprises an area comprising at least two unlocking points, wherein the at least two unlocking points are unlocking points of a same UI widget, wherein the fingerprint recognition mode in the first display area is the press mode, wherein detecting the first input in the first display area comprises detecting the first input in an area comprising a first unlocking point of the at least two unlocking points, wherein after detecting the first input in an area comprising the first unlocking point of the at least two unlocking points, the method further comprises disabling the fingerprint recognition function in an area comprising another unlocking point, wherein the other unlocking point is an unlocking point that is different from the first unlocking point of the at least two unlocking points, wherein recognizing the fingerprint corresponding to the first input in the first display area comprises recognizing, according to the press mode, the fingerprint corresponding to the first input in the area comprising the first unlocking point and wherein after recognizing, according to the press mode, the fingerprint corresponding to the first input in the area comprising the first unlocking point, the method further comprises disabling the fingerprint recognition function in the area comprising the first unlocking point, when the recognized fingerprint is authenticated successfully.

11. The fingerprint recognition method according to claim 10, wherein when the fingerprint corresponding to the first input in the area comprising the first unlocking point is recognized according to the press mode but fails to be authenticated, the fingerprint recognition method further comprises:
    determining a next unlocking point after the first unlocking point according to a set unlocking sequence of the at least two unlocking points;
    determining that a fingerprint recognition mode in an area comprising the next unlocking point is set to the press mode;
    setting the fingerprint recognition mode in the area comprising the next unlocking point to the press mode;
    detecting a user input in the area comprising the next unlocking point; and
    recognizing, in the area comprising the next unlocking point, according to the press mode, the fingerprint corresponding to the detected user input in the area comprising the next unlocking point.

12. An electronic device, comprising:
    a touchscreen configured to:
        display a first display area; and
        detect a first input in the first display area;
    a fingerprint recognition sensor configured to capture, according to a swipe mode or a press mode, a user fingerprint in the first display area displayed on the touchscreen;
    at least one memory configured to store a fingerprint template; and
    at least one processor coupled to touchscreen, the fingerprint recognition sensor and the memory, wherein the processor is configured to:
        determine that a fingerprint recognition mode in the first display area is a first fingerprint recognition mode, wherein the first fingerprint recognition mode comprises the swipe mode or the press mode; and
        set the fingerprint recognition mode in the first display area to be the first fingerprint recognition mode;
        when the first fingerprint recognition mode is the swipe mode:
            instruct the fingerprint recognition sensor to capture a user fingerprint in the first display area according to the swipe mode;
            determine a second display area according to the first input; and
            determine, according to the first input, that a fingerprint recognition mode in the second display area is a second fingerprint recognition mode, wherein the second fingerprint recognition mode comprises the swipe mode or the press mode; and
        when the first fingerprint recognition mode is the press mode:
            instruct the fingerprint recognition sensor to capture the user fingerprint in the first display area according to the press mode; and
            match the fingerprint corresponding to the first input captured by the fingerprint recognition sensor with the fingerprint template.

13. The electronic device according to claim 12, the at least one processor is further configured to:
- when the first display area is an area comprising a press-mode user interface UI widget, determine that the first fingerprint recognition mode is the press mode, wherein the press-mode UI widget uses the press mode to recognize the fingerprint; or
- when the first display area is an area comprising a swipe-mode UI widget, determine that the fingerprint recognition mode in the first display area is the swipe mode, wherein the swipe-mode UI widget uses the swipe mode to recognize the fingerprint.

14. The electronic device according to claim 12, wherein the touchscreen is further configured to detect a second input in the second display area, and wherein the processor is further configured to:
- when the second fingerprint recognition mode is the swipe mode, instruct the fingerprint recognition sensor to capture, according to the swipe mode, a fingerprint corresponding to the second input in the second display area, and when the second fingerprint recognition mode is the press mode, instruct the fingerprint recognition sensor to capture, according to the press mode, the fingerprint corresponding to the second input in the second display area; and
- match the fingerprint corresponding to the second input captured by the fingerprint recognition sensor with the fingerprint template.

15. The electronic device according to claim 12, wherein the at least one processor is further configured to:
- predict at least one first track according to the first input; and
- use a display area that the at least one first track passes through as the second display area.

16. The electronic device according to claim 12, wherein the at least one processor is further configured to determine the second display area according to operation information for the first input, and wherein the operation information for the first input comprises at least one of:
- force of the first input applied to the touchscreen;
- a moving speed of the first input;
- a moving direction of the first input; or
- duration of the first input.

17. The electronic device according to claim 16, wherein the at least one processor is further configured to determine the second display area according to the operation information for the first input and at least one of:
- habit information recorded by the memory about inputs of the electronic device on the electronic device;
- a direction in which the electronic device is held; or
- a layout of UI widgets in the second display area.

18. The electronic device according to claim 12, wherein the first display area comprises an area comprising at least two unlocking points, wherein the at least two unlocking points are unlocking points of a same UI widget, wherein the fingerprint recognition mode in the first display area is the press mode, wherein the touchscreen is configured to detect the first input in an area comprising a first unlocking point of the at least two unlocking points, wherein the at least one processor is further configured to: after the touchscreen detects the first input in the area comprising the first unlocking point of the at least two unlocking points, disable the fingerprint recognition function in an area comprising another unlocking point, wherein the other unlocking point is an unlocking point that is different from the first unlocking point of the at least two unlocking points, instruct the fingerprint recognition sensor to capture, according to the press mode, the fingerprint corresponding to the first input in the area comprising the first unlocking point, and match the fingerprint corresponding to the first input captured by the fingerprint recognition sensor in the area comprising the first unlocking point with the fingerprint template, and wherein after matching the fingerprint corresponding to the first input captured by the fingerprint recognition sensor with the fingerprint template, disable the fingerprint recognition function in the area comprising the first unlocking point, when matching is successful.

19. The electronic device according to claim 18, wherein when the fingerprint corresponding to the first input captured by the fingerprint recognition sensor in the area comprising the first unlocking point fails to match the fingerprint template, the at least one processor is further configured to:
- determine a next unlocking point after the first unlocking point according to a set unlocking sequence of the at least two unlocking points; and
- set a fingerprint recognition mode in an area comprising the determined next unlocking point to the press mode,
- wherein the touchscreen is further configured to detect a user input in the area comprising the next unlocking point, and
- wherein the processor is further configured to:
  - instruct the fingerprint recognition sensor to capture, according to the press mode, the fingerprint corresponding to the user input detected by the touchscreen in the area comprising the next unlocking point; and
  - match the fingerprint corresponding to the user input in the area comprising the next unlocking point captured by the fingerprint recognition sensor with the fingerprint template.

20. A method of recognizing a fingerprint comprising:
- determining that a fingerprint recognition mode in a first display area of a touchscreen is a first fingerprint recognition mode, wherein the first fingerprint recognition mode comprises a swipe mode or a press mode;
- setting the fingerprint recognition mode in the first display area to the first fingerprint recognition mode;
- detecting a first input in the first display area;
- when the first fingerprint recognition mode is the swipe mode, recognizing the fingerprint corresponding to the first input in the first display area according to the swipe mode;
- when the first fingerprint recognition mode is the press mode, recognizing the fingerprint corresponding to the first input in the first display area according to the press mode;
- determining a second display area of the touchscreen according to the first input;
- determining, according to the first input, that a second fingerprint recognition mode in the second display area is the second fingerprint recognition mode, wherein the second fingerprint recognition mode comprises the swipe mode or the press mode;
- detecting a second input in the second display area;
- when the second fingerprint recognition mode is the swipe mode, recognizing the fingerprint corresponding to the second input in the second display area according to the swipe mode; and
- when the second fingerprint recognition mode is the press mode, recognizing the fingerprint corresponding to the second input in the second display area according to the press mode.

* * * * *